United States Patent
Hou et al.

(10) Patent No.: US 8,406,695 B2
(45) Date of Patent: *Mar. 26, 2013

(54) JOINT INTERFERENCE CANCELLATION OF PILOT, OVERHEAD AND TRAFFIC CHANNELS

(75) Inventors: Jilei Hou, Carlsbad, CA (US); Henry David Pfister, San Diego, CA (US); John Edward Smee, San Diego, CA (US); Stefano Tomasin, Venice (IT)

(73) Assignee: QUALCOMM Incorporated, San Diego, CA (US)

( * ) Notice: Subject to any disclaimer, the term of this patent is extended or adjusted under 35 U.S.C. 154(b) by 427 days.

This patent is subject to a terminal disclaimer.

(21) Appl. No.: 11/193,546

(22) Filed: Jul. 29, 2005

(65) Prior Publication Data

US 2006/0141935 A1    Jun. 29, 2006

Related U.S. Application Data

(60) Provisional application No. 60/638,666, filed on Dec. 23, 2004.

(51) Int. Cl.
*H04B 1/00* (2006.01)
*H04B 15/00* (2006.01)

(52) U.S. Cl. ............... 455/63.1; 455/450; 455/67.13; 455/114.2; 455/501; 455/509; 455/452.1; 370/335; 370/342; 370/329; 370/441; 370/209; 375/148; 375/144; 375/346; 375/348

(58) Field of Classification Search ............... 455/63.1, 455/450, 452.1, 67.13, 114.2, 509, 501, 506; 375/144, 148, 348, 346, 136; 370/329, 441, 370/342, 209, 203
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,490,165 A | 2/1996 | Blakeney, II et al. | |
| 5,506,865 A | 4/1996 | Weaver, Jr. | |
| 5,644,591 A | 7/1997 | Sutton | |
| 5,703,905 A * | 12/1997 | Langberg | 375/232 |
| 5,764,687 A | 6/1998 | Easton | |
| 5,781,543 A | 7/1998 | Ault et al. | |
| 5,789,973 A | 8/1998 | Barrett, Jr. et al. | |
| 5,805,648 A | 9/1998 | Sutton | |
| 5,812,600 A | 9/1998 | Hess et al. | |

(Continued)

FOREIGN PATENT DOCUMENTS

| | | |
|---|---|---|
| CN | 1397112 | 2/2003 |
| CN | 1554156 A | 12/2004 |

(Continued)

OTHER PUBLICATIONS

Iwakiri, N., "Interference Reduction Efficiency of a Turbo Coded CDMA Multilayer System Equipped with a Pilot Canceler", VTC 1999-Fall. IEEE VTS 50th. Vehicular Technology Conference, Gateway to the 21st Century Communications Village. Amsterdam, Sep. 19-22, 1999, IEEE Vehicular Technology Conference, New York, NY: IEEE, US, Vol. 1 Conf. 50, Sep. 1999, pp. 391-395, XP000929078.

(Continued)

*Primary Examiner* — Marceau Milord
(74) *Attorney, Agent, or Firm* — Rupit M. Patel

(57) ABSTRACT

A method and system for interference cancellation (IC). One aspect relates to traffic interference cancellation. Another aspect relates to joint IC for pilot, overhead and data. Another aspect relates to improved channel estimation. Another aspect relates to adaptation of transmit subchannel gains.

53 Claims, 33 Drawing Sheets

U.S. PATENT DOCUMENTS

| | | | |
|---|---|---|---|
| 5,953,369 | A | 9/1999 | Suzuki |
| 6,002,715 | A * | 12/1999 | Brailean et al. ............... 375/227 |
| 6,009,089 | A * | 12/1999 | Huang et al. ................. 370/342 |
| 6,032,026 | A | 2/2000 | Seki et al. |
| 6,034,986 | A | 3/2000 | Yellin |
| 6,067,292 | A * | 5/2000 | Huang et al. ................. 370/342 |
| 6,067,333 | A | 5/2000 | Kim et al. |
| 6,122,309 | A * | 9/2000 | Bergstrom et al. ........... 375/130 |
| 6,131,013 | A * | 10/2000 | Bergstrom et al. ........... 455/63.1 |
| 6,137,788 | A | 10/2000 | Sawahashi et al. |
| 6,137,843 | A | 10/2000 | Chennakeshu et al. |
| 6,154,443 | A | 11/2000 | Huang et al. |
| 6,175,587 | B1 | 1/2001 | Madhow et al. |
| 6,201,799 | B1 | 3/2001 | Huang et al. |
| 6,233,229 | B1 | 5/2001 | Ranta et al. |
| 6,259,724 | B1 | 7/2001 | Esmailzadeh |
| 6,295,289 | B1 * | 9/2001 | Ionescu et al. ................ 370/342 |
| 6,333,947 | B1 * | 12/2001 | van Heeswyk et al. ....... 375/148 |
| 6,393,302 | B1 | 5/2002 | O'Byrne |
| 6,459,693 | B1 | 10/2002 | Park et al. |
| 6,459,694 | B1 | 10/2002 | Sari et al. |
| 6,493,541 | B1 * | 12/2002 | Gunnarsson et al. ........... 455/69 |
| 6,496,706 | B1 | 12/2002 | Jouu et al. |
| 6,498,784 | B1 | 12/2002 | Ozluturk et al. |
| 6,570,909 | B1 * | 5/2003 | Kansakoski et al. ........... 375/148 |
| 6,574,211 | B2 * | 6/2003 | Padovani et al. ............... 370/347 |
| 6,580,899 | B1 | 6/2003 | Dalgleish et al. |
| 6,603,743 | B2 | 8/2003 | Ozluturk et al. |
| 6,618,429 | B2 | 9/2003 | Gilhousen et al. |
| 6,621,804 | B1 | 9/2003 | Holtzman et al. |
| 6,642,883 | B2 | 11/2003 | Jacomb-Hood et al. |
| 6,654,408 | B1 * | 11/2003 | Kadous et al. ................. 375/148 |
| 6,661,835 | B1 | 12/2003 | Sugimoto et al. |
| 6,680,727 | B2 * | 1/2004 | Butler et al. ................... 375/144 |
| 6,683,908 | B1 * | 1/2004 | Cleveland ..................... 375/148 |
| 6,690,712 | B2 * | 2/2004 | Kim et al. ..................... 375/146 |
| 6,691,362 | B1 | 2/2004 | Phillipson et al. |
| 6,697,347 | B2 * | 2/2004 | Ostman et al. ................. 370/335 |
| 6,788,733 | B1 * | 9/2004 | Whang et al. .................. 375/148 |
| 6,832,073 | B2 | 12/2004 | Jang et al. |
| 6,850,506 | B1 | 2/2005 | Holtzman et al. |
| 6,865,218 | B1 | 3/2005 | Sourour |
| 6,917,642 | B1 * | 7/2005 | Rouphael et al. .............. 375/140 |
| 6,940,827 | B2 * | 9/2005 | Li et al. .......................... 370/278 |
| 6,950,411 | B2 * | 9/2005 | Ozluturk et al. ................ 370/286 |
| 6,961,362 | B2 | 11/2005 | Ariyoshi et al. |
| 6,975,666 | B2 | 12/2005 | Affes et al. |
| 6,996,069 | B2 | 2/2006 | Willenegger |
| 6,999,430 | B2 | 2/2006 | Holtzman et al. |
| 6,999,794 | B1 * | 2/2006 | Lindskog et al. ............ 455/562.1 |
| 7,016,327 | B2 | 3/2006 | Grilli et al. |
| 7,020,109 | B2 | 3/2006 | Grilli et al. |
| 7,035,284 | B2 * | 4/2006 | Willenegger et al. .......... 370/470 |
| 7,042,968 | B1 * | 5/2006 | Jansen et al. ................... 375/347 |
| 7,061,967 | B2 | 6/2006 | Schelm et al. |
| 7,068,637 | B2 | 6/2006 | Saito et al. |
| 7,069,034 | B1 | 6/2006 | Sourour |
| 7,072,321 | B2 | 7/2006 | Holtzman et al. |
| 7,072,322 | B2 | 7/2006 | Holtzman et al. |
| 7,099,378 | B2 * | 8/2006 | Dunyak et al. ................. 375/148 |
| 7,103,094 | B2 * | 9/2006 | Lotter et al. .................... 375/148 |
| 7,120,447 | B1 | 10/2006 | Chheda et al. |
| 7,126,928 | B2 * | 10/2006 | Tiedemann et al. ........... 370/329 |
| 7,139,306 | B2 * | 11/2006 | Oates .............................. 375/148 |
| 7,158,560 | B2 * | 1/2007 | Cleveland ..................... 375/148 |
| 7,164,739 | B1 * | 1/2007 | Trott ............................... 375/347 |
| 7,177,344 | B2 * | 2/2007 | Oates .............................. 375/143 |
| 7,177,658 | B2 | 2/2007 | Willenegger et al. |
| 7,190,749 | B2 * | 3/2007 | Levin et al. .................... 375/346 |
| 7,197,282 | B2 | 3/2007 | Dent et al. |
| 7,203,220 | B2 * | 4/2007 | Baltersee et al. ............... 375/145 |
| 7,206,554 | B1 * | 4/2007 | Lindskog ........................ 455/101 |
| 7,209,515 | B2 * | 4/2007 | Kilfoyle et al. ................ 375/152 |
| 7,221,699 | B1 * | 5/2007 | Lindskog ........................ 375/147 |
| 7,245,600 | B2 * | 7/2007 | Chen ............................... 370/335 |
| 7,254,171 | B2 * | 8/2007 | Hudson .......................... 375/229 |
| 7,254,197 | B2 | 8/2007 | Heo et al. |
| 7,257,101 | B2 * | 8/2007 | Petrus et al. ................... 370/332 |
| 7,263,082 | B1 * | 8/2007 | Lindskog ........................ 370/335 |
| 7,269,389 | B2 * | 9/2007 | Petrus et al. ..................... 455/69 |
| 7,292,552 | B2 * | 11/2007 | Willenegger et al. ......... 370/333 |
| 7,295,597 | B2 | 11/2007 | Fitton et al. |
| 7,299,402 | B2 * | 11/2007 | Soong et al. ................... 714/807 |
| 7,317,750 | B2 | 1/2008 | Shattil |
| 7,318,187 | B2 | 1/2008 | Vayanos et al. |
| 7,321,780 | B2 | 1/2008 | Love et al. |
| 7,333,420 | B2 * | 2/2008 | Higuchi et al. ................. 370/208 |
| 7,336,930 | B2 | 2/2008 | Larsson et al. |
| 7,352,725 | B2 | 4/2008 | Tiirola et al. |
| 7,391,803 | B2 | 6/2008 | Hess et al. |
| 7,394,792 | B1 | 7/2008 | Von Der Embse |
| 7,394,879 | B2 | 7/2008 | Narayan et al. |
| 7,406,065 | B2 * | 7/2008 | Willenegger et al. ......... 370/335 |
| 7,437,135 | B2 | 10/2008 | Pan et al. |
| 7,450,536 | B2 | 11/2008 | Li et al. |
| 7,486,726 | B2 | 2/2009 | Alexander et al. |
| 7,486,750 | B1 | 2/2009 | Baier et al. |
| 7,515,877 | B2 * | 4/2009 | Chen et al. ....................... 455/69 |
| 7,583,977 | B2 | 9/2009 | Willenegger et al. |
| 7,593,746 | B2 | 9/2009 | Willenegger et al. |
| 7,623,553 | B2 | 11/2009 | Bhushan et al. |
| 7,643,452 | B2 | 1/2010 | Grilli et al. |
| 7,675,944 | B2 | 3/2010 | Grilli et al. |
| 7,787,389 | B2 | 8/2010 | Chen et al. |
| 8,010,111 | B2 | 8/2011 | Grilli et al. |
| 8,171,381 | B2 | 5/2012 | Vayanos et al. |
| 8,175,090 | B2 | 5/2012 | Vayanos et al. |
| 2001/0019961 | A1 | 9/2001 | Nakahara et al. |
| 2001/0040874 | A1 | 11/2001 | Saito et al. |
| 2002/0021682 | A1 | 2/2002 | Ariyoshi et al. |
| 2002/0051433 | A1 | 5/2002 | Affes et al. |
| 2002/0118727 | A1 | 8/2002 | Kim et al. |
| 2002/0154717 | A1 | 10/2002 | Shima et al. |
| 2002/0186755 | A1 | 12/2002 | Kim et al. |
| 2003/0021334 | A1 | 1/2003 | Levin et al. |
| 2003/0035404 | A1 | 2/2003 | Ozluturk et al. |
| 2003/0052819 | A1 | 3/2003 | Jacomb-Hood et al. |
| 2003/0142655 | A1 | 7/2003 | Higuchi et al. |
| 2003/0202568 | A1 | 10/2003 | Choi et al. |
| 2003/0227962 | A1 | 12/2003 | Hintz-Madsen |
| 2003/0235238 | A1 | 12/2003 | Schelm et al. |
| 2004/0001429 | A1 | 1/2004 | Ma et al. |
| 2004/0062302 | A1 | 4/2004 | Fujii et al. |
| 2004/0077322 | A1 | 4/2004 | Garmonov et al. |
| 2004/0120282 | A1 | 6/2004 | Ozluturk et al. |
| 2004/0146024 | A1 | 7/2004 | Li et al. |
| 2004/0160924 | A1 | 8/2004 | Narayan et al. |
| 2004/0184570 | A1 | 9/2004 | Thomas et al. |
| 2004/0192208 | A1 | 9/2004 | Kong et al. |
| 2004/0202104 | A1 | 10/2004 | Ishii et al. |
| 2004/0219920 | A1 | 11/2004 | Love et al. |
| 2004/0252753 | A1 | 12/2004 | Li et al. |
| 2005/0002445 | A1 | 1/2005 | Dunyak et al. |
| 2005/0013350 | A1 | 1/2005 | Coralli et al. |
| 2005/0041626 | A1 | 2/2005 | Tiirola et al. |
| 2005/0047484 | A1 | 3/2005 | He et al. |
| 2005/0063332 | A1 | 3/2005 | Holtzman et al. |
| 2005/0094675 | A1 | 5/2005 | Bhushan et al. |
| 2005/0169205 | A1 | 8/2005 | Grilli et al. |
| 2005/0185701 | A1 | 8/2005 | George |
| 2005/0192042 | A1 | 9/2005 | Au et al. |
| 2005/0193309 | A1 | 9/2005 | Grilli et al. |
| 2005/0243898 | A1 | 11/2005 | Reznik et al. |
| 2006/0007895 | A1 | 1/2006 | Coralli et al. |
| 2006/0034218 | A1 | 2/2006 | Ozluturk et al. |
| 2006/0062283 | A1 | 3/2006 | Zhang et al. |
| 2006/0115014 | A1 | 6/2006 | Jeong et al. |
| 2006/0141933 | A1 | 6/2006 | Smee et al. |
| 2006/0141934 | A1 | 6/2006 | Pfister et al. |
| 2006/0142041 | A1 | 6/2006 | Tomasin et al. |
| 2006/0229017 | A1 | 10/2006 | Larssonn et al. |
| 2007/0002724 | A1 | 1/2007 | Khan |
| 2007/0004337 | A1 | 1/2007 | Biswas et al. |
| 2007/0093261 | A1 | 4/2007 | Hou et al. |
| 2007/0111664 | A1 | 5/2007 | Levin et al. |
| 2007/0115890 | A1 | 5/2007 | Yi et al. |
| 2007/0127558 | A1 | 6/2007 | Banister |

| | | | |
|---|---|---|---|
| 2007/0135051 | A1 | 6/2007 | Zheng et al. |
| 2007/0147329 | A1 | 6/2007 | Soriagaa et al. |
| 2007/0165704 | A1 | 7/2007 | Yang et al. |
| 2008/0032630 | A1 | 2/2008 | Kim et al. |
| 2008/0130714 | A1 | 6/2008 | Wilborn et al. |
| 2008/0141094 | A1 | 6/2008 | Vayanos et al. |
| 2008/0141097 | A1 | 6/2008 | Vayanos et al. |
| 2010/0172279 | A1 | 7/2010 | Chen et al. |
| 2011/0069736 | A1 | 3/2011 | Coralli et al. |

FOREIGN PATENT DOCUMENTS

| | | |
|---|---|---|
| EP | 0954112 | 11/1999 |
| EP | 0980149 | 2/2000 |
| EP | 1229668 | 8/2002 |
| EP | 1365518 A1 | 11/2003 |
| GB | 2 384 660 A | 7/2003 |
| JP | 10247894 A | 9/1998 |
| JP | 11317725 A | 11/1999 |
| JP | 2000115131 A | 4/2000 |
| JP | 2000278204 A | 10/2000 |
| JP | 2001186106 A | 7/2001 |
| JP | 2001211104 A | 8/2001 |
| JP | 2001251242 A | 9/2001 |
| JP | 2002044017 A | 2/2002 |
| JP | 2002044053 A | 2/2002 |
| JP | 2002217871 A | 8/2002 |
| JP | 2002535915 | 10/2002 |
| JP | 2003264501 A | 9/2003 |
| JP | 2004535083 T | 11/2004 |
| JP | 2005519567 A | 6/2005 |
| JP | 2005198223 A | 7/2005 |
| KR | 19980081861 | 11/1998 |
| KR | 0326183 | 6/2002 |
| KR | 2004-28772 | 4/2004 |
| KR | 1020040045102 | 6/2004 |
| RU | 2216851 | 11/2003 |
| RU | 2002115625 | 2/2004 |
| WO | WO9642146 A1 | 12/1996 |
| WO | 0025442 | 5/2000 |
| WO | WO0049724 A1 | 8/2000 |
| WO | 0158046 | 8/2001 |
| WO | WO 02/033840 A2 | 4/2002 |
| WO | WO 02/39597 | 5/2002 |
| WO | 0245288 | 6/2002 |
| WO | 02082681 | 10/2002 |
| WO | WO02080432 A2 | 10/2002 |
| WO | WO 02/099992 A1 | 12/2002 |
| WO | 2004045239 | 5/2004 |
| WO | 2004064304 | 7/2004 |
| WO | 2004070958 | 8/2004 |
| WO | WO2004100416 A1 | 11/2004 |
| WO | WO2004114535 A1 | 12/2004 |
| WO | WO2005025118 A1 | 3/2005 |

OTHER PUBLICATIONS

Song et al., "Optimum Partial Interference Cancelling Factor in Pilot Assistant Coherent OFDM System with Partial Power Training Sequence Synchronization" 14th IEEE 2003 International Symposium on Personal Indoor and Mobile Radio Communication Proceedings.

Tinnakornsrisuphap et al., "On the Fairness and Stability of the Reverse-Link MAC Layer in CDMA2000 1XEV-Do" Communications, 2004 IEEE International Conference on Paris France Jun. 20-24, 2004, Piscataway NJ, USA, IEEE Jun. 20, 2004, pp. 144-148, XP0107103.

3GPP2, TSG-C: "CDMA2000 High Rate Packet Data Air Interface Specification" (online) Mar. 2004, Ver., 1.0 pp. 14-65, XP002382113.

International Search Report—PCT/US05/046744 International Search Authority—European Patent Office—Jun. 2, 2006.

Written Opinion - PCT/US05/046744, International Search Authority—European Patent Office—Jun. 2, 2006.

International Preliminary Report on Patentability—PCT/US05/046744, International Bureau of WIPO, Geneva, Switzerland Jun. 26, 2007.

cdma2000 High Rate Packet Data Air Interface Specification, 3GPP2C. S0024-A V1.0, Mar. 2004, p. 14-1 to p. 14-65.

Daisuke Takeda, Takashi Wakutsu, and Mutsumu Serizawa, "Performance of Feedback Parallel Canceller Using Turbo Code in Multipath Fading Channel," Technical Report of IEICE. RCS, Radio Communications System, The Institute of Electronics, Information and Communication Engineers, Oct. 12, 2001, 101 (370), pp. 63-68.

Miki, et al.,. "Multipath Interference Canceller Using Sofidecision Replica Combined with Hybrid ARQ in W-CDMA Forward Link," IEEE 54th Vehicular Technology Conference, Proceedings, Atlantic City, NJ, USA Oct. 7-11, 2001, pp. 1992-1926, vol. 1 of 4, IEEE Vehicular Technology Conference, Conf. 54, New York, NY, USA, XP010562300.

"Multipath Intereference Cancellation Scheme for Multicode CDMA Systems in Multipath Fading Channels", Mar. 2004.

Shousei Yoshida, and Akihisa USHiROKAWA, "CDMA Multi-Stage Interference Canceller with Recursive Channel Estimation Based on Symbol Replica Processing,". Technical Report of IEICE. RCS, Radio Communications System. The Institute of Electronics, Information and Communication Engineers, Feb. 20, 1997, 96(530), pp. 57-62.

Yoshihisa Kishiyama, Koichi Okawa, and Mamoru Sawahashi, "Experiments on Parallel-type Coherent Multi-stage Interference Canceller with Channel Estimation Using Pilot and Decision-feedback Data Symbols in W-CDMA Reverse Link, " Technical Report of IEICE. RCS, Radio Communications System. The Institute of Electronics, Information and Communication Engineers, Oct. 6, 2000, 100(346), pp. 13-19.

Han. B., "OFDM systems iterative joint channel estimation and symbol detection algorithm", Communications Technology, vol. 24, No. 8, section 2-3, Aug. 2003.

Taiwan Search Report—TW094146427—TIPO—Jan. 3, 2012.

Andrew J. Viterbi , "CDMA: Principles of Spread Spectrum Communications", Chapter 4, Addison Wesley Longman, Reading, MA., pp. 77-121, 1995.

Jakes W. C., "Microwave Mobile Communications", IEEE, 1974, pp. 11-78, Chapter 1, John Wiley & Sons, New York.

TIA/EIA Interim Standard; Mobile Station-Base Station Compatibility Standard for Dual-Mode Wideband Spread Spectrum Cellular System; TIA/EIA/IS-95-A Revision of TIA/EIA/IS-95, May 1995. (Part 1 pp.1-351).

TIA/EIA Interim Standard; Mobile Station-Base Station Compatibility Standard for Dual-Mode Wideband Spread Spectrum Cellular System; TIA/EIA/IS-95-A Revision of TIA/EIA/IS-95-A Revision of TIA/EIA/IS-95. May 1995. (Part 2 pp. 352-744).

Pilot and Decision-feedback Data Symbols in W-CDMA Reverse Link, Technical Report of IEICE. RCS, Radio Communications System. The Institute of Electronics, Information and Communication Engineers, Oct. 6, 2000, 100(346), pp. 13-19.

* cited by examiner

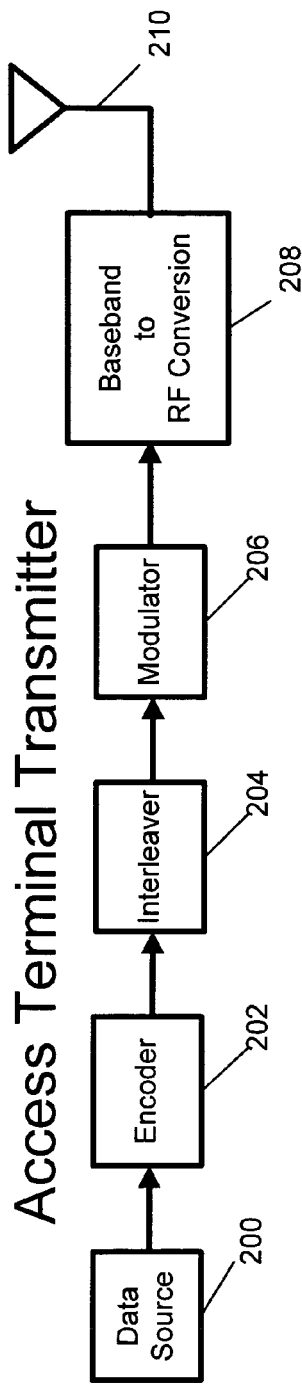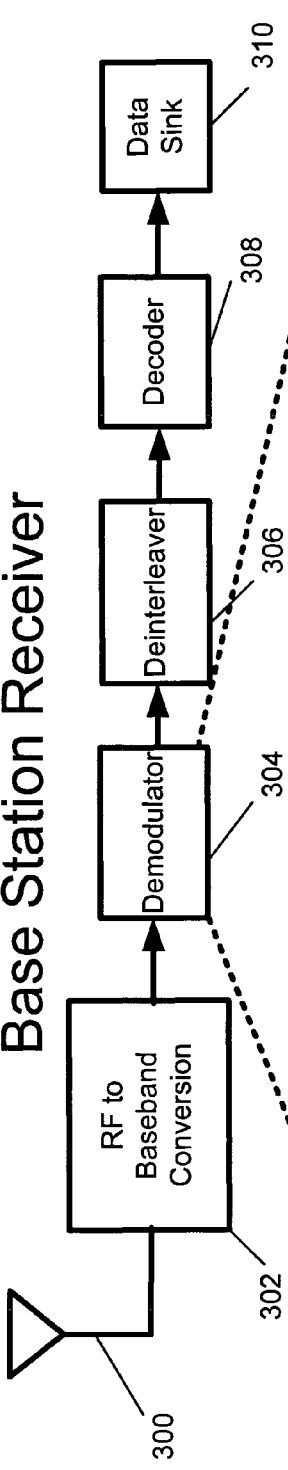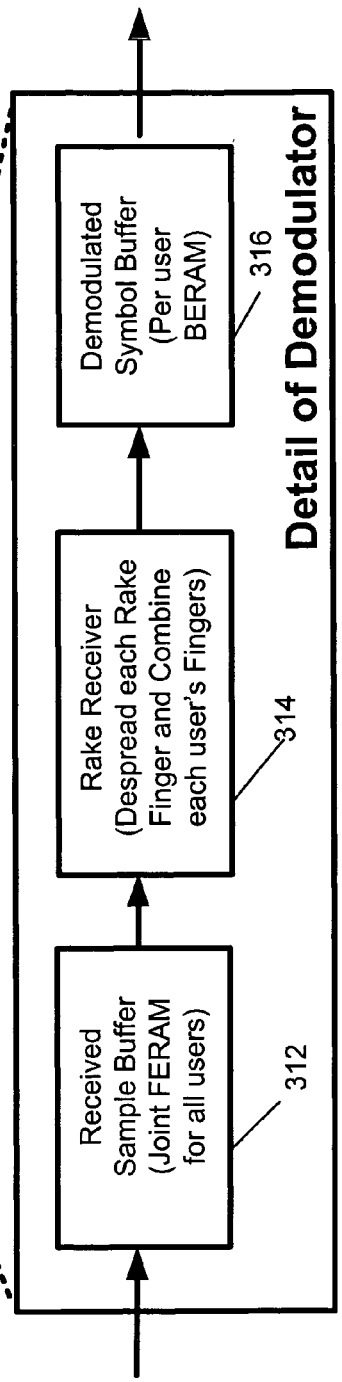
FIG. 2
FIG. 3

JOINT INTERFERENCE CANCELLATION OF PILOT, OVERHEAD AND TRAFFIC CHANNELS

CLAIM OF PRIORITY UNDER 35 U.S.C. §119

The present application claims priority to co-assigned U.S. Provisional Application No. 60/638,666, entitled "TRAFFIC INTERFERENCE CANCELLATION AT THE BTS ON A CDMA REVERSE LINK," filed on Dec. 23, 2004, which is incorporated by reference.

BACKGROUND

1. Field

The present invention relates to wireless communication systems generally, and specifically to traffic interference cancellation in wireless communication systems.

2. Background

A communication system may provide communication between base stations and access terminals. Forward link or downlink refers to transmission from a base station to an access terminal. Reverse link or uplink refers to transmission from an access terminal to a base station. Each access terminal may communicate with one or more base stations on the forward and reverse links at a given moment, depending on whether the access terminal is active and whether the access terminal is in soft handoff.

BRIEF DESCRIPTION OF DRAWINGS

The features, nature, and advantages of the present application may be more apparent from the detailed description set forth below with the drawings. Like reference numerals and characters may identify the same or similar objects.

FIG. 2 illustrates an example of transmitter structure and/or process, which may be implemented at an access terminal of FIG. 1.

FIG. 3 illustrates an example of a receiver process and/or structure, which may be implemented at a base station of FIG. 1.

DETAILED DESCRIPTION

Any embodiment described herein is not necessarily preferable or advantageous over other embodiments. While various aspects of the present disclosure are presented in drawings, the drawings are not necessarily drawn to scale or drawn to be all-inclusive.

Figure 1:
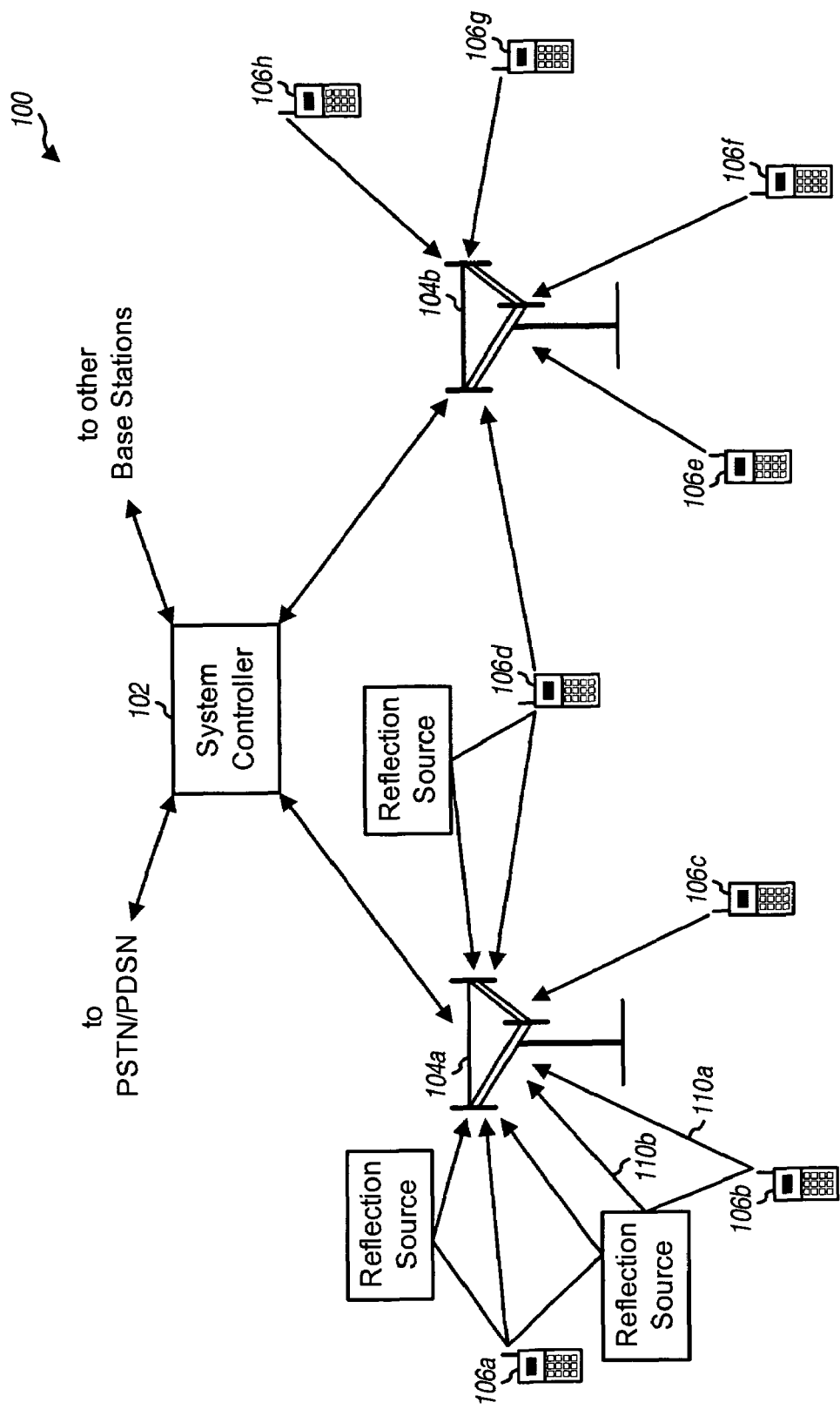
FIG. 1 illustrates a wireless communication system with base stations and access terminals.

FIG. 1 illustrates a wireless communication system 100, which includes a system controller 102, base stations 104a-104b, and a plurality of access terminals 106a-106h. The system 100 may have any number of controllers 102, base stations 104 and access terminals 106. Various aspects and embodiments of the present disclosure described below may be implemented in the system 100.

Access terminals 106 may be mobile or stationary and may be dispersed throughout the communication system 100 of FIG. 1. An access terminal 106 may be connected to or implemented in a computing device, such as a laptop personal computer. Alternatively, an access terminal may be a self-contained data device, such as a personal digital assistant (PDA). An access terminal 106 may refer to various types of devices, such as a wired phone, a wireless phone, a cellular phone, a lap top computer, a wireless communication personal computer (PC) card, a PDA, an external or internal modem, etc. An access terminal may be any device that provides data connectivity to a user by communicating through a wireless channel or through a wired channel, for example using fiber optic or coaxial cables. An access terminal may have various names, such as mobile station, access unit, subscriber unit, mobile device, mobile terminal, mobile unit, mobile phone, mobile, remote station, remote terminal, remote unit, user device, user equipment, handheld device, etc.

The system 100 provides communication for a number of cells, where each cell is serviced by one or more base stations 104. A base station 104 may also be referred to as a base station transceiver system (BTS), an access point, a part of an access network, a modem pool transceiver (MPT), or a Node B. Access network refers to network equipment providing data connectivity between a packet switched data network (e.g., the Internet) and the access terminals 106.

Forward link (FL) or downlink refers to transmission from a base station 104 to an access terminal 106. Reverse link (RL) or uplink refers to transmission from an access terminal 106 to a base station 104.

A base station 104 may transmit data to an access terminal 106 using a data rate selected from a set of different data rates. An access terminal 106 may measure a signal-to-noise-and-interference ratio (SINR) of a pilot signal sent by the base station 104 and determine a desired data rate for the base station 104 to transmit data to the access terminal 106. The access terminal 106 may send data request channel or Data rate control (DRC) messages to the base station 104 to inform the base station 104 of the desired data rate.

The system controller 102 (also referred to as a base station controller (BSC)) may provide coordination and control for base stations 104, and may further control routing of calls to access terminals 106 via the base stations 104. The system controller 102 may be further coupled to a public switched telephone network (PSTN) via a mobile switching center (MSC), and to a packet data network via a packet data serving node (PDSN).

The communication system 100 may use one or more communication techniques, such as code division multiple access (CDMA), IS-95, High Rate Packet Data (HRPD), also referred to as High Data Rate (HDR), as specified in "cdma2000 High Rate Packet Data Air Interface Specification," TIA/EIA/IS-856, CDMA 1× Evolution Data Optimized (EV-DO), 1×EV-DV, Wideband CDMA (WCDMA), Universal Mobile Telecommunications System (UMTS), Time Division Synchronous CDMA (TD-SCDMA), Orthogonal Frequency Division Multiplexing (OFDM), etc. The examples described below provide details for clarity of understanding. The ideas presented herein are applicable to other systems as well, and the present examples are not meant to limit the present application.

FIG. 2 illustrates an example of transmitter structure and/or process, which may be implemented at an access terminal 106 of FIG. 1. The functions and components shown in FIG. 2 may be implemented by software, hardware, or a combination of software and hardware. Other functions may be added to FIG. 2 in addition to or instead of the functions shown in FIG. 2.

A data source 200 provides data to an encoder 202, which encodes data bits using one or more coding schemes to provide coded data chips. Each coding scheme may include one or more types of coding, such as cyclic redundancy check (CRC), convolutional coding, Turbo coding, block coding, other types of coding, or no coding at all. Other coding schemes may include automatic repeat request (ARQ), hybrid ARQ (H-ARQ), and incremental redundancy repeat techniques. Different types of data may be coded with different coding schemes. An interleaver 204 interleaves the coded data bits to combat fading.

A modulator 206 modulates coded, interleaved data to generate modulated data. Examples of modulation techniques include binary phase shift keying (BPSK) and quadrature phase shift keying (QPSK). The modulator 206 may also repeat a sequence of modulated data or a symbol puncture unit may puncture bits of a symbol. The modulator 206 may also spread the modulated data with a Walsh cover (i.e., Walsh code) to form data chips. The modulator 206 may also time-division multiplex the data chips with pilot chips and MAC chips to form a stream of chips. The modulator 206 may also use a pseudo random noise (PN) spreader to spread the stream of chips with one or more PN codes (e.g., short code, long code).

A baseband-to-radio-frequency (RF) conversion unit 208 may convert baseband signals to RF signals for transmission via an antenna 210 over a wireless communication link to one or more base stations 104.

FIG. 3 illustrates an example of a receiver process and/or structure, which may be implemented at a base station 104 of FIG. 1. The functions and components shown in FIG. 3 may be implemented by software, hardware, or a combination of software and hardware. Other functions may be added to FIG. 3 in addition to or instead of the functions shown in FIG. 3.

One or more antennas 300 receive the reverse link modulated signals from one or more access terminals 106. Multiple antennas may provide spatial diversity against deleterious path effects such as fading. Each received signal is provided to a respective receiver or RF-to-baseband conversion unit 302, which conditions (e.g., filters, amplifies, downconverts) and digitizes the received signal to generate data samples for that received signal.

A demodulator 304 may demodulate the received signals to provide recovered symbols. For CDMA2000, demodulation tries to recover a data transmission by (1) channelizing the despread samples to isolate or channelize the received data and pilot onto their respective code channels, and (2) coherently demodulating the channelized data with a recovered pilot to provide demodulated data. Demodulator 304 may include a received sample buffer 312 (also called joint front-end RAM (FERAM) or sample RAM) to store samples of received signals for all users/access terminals, a rake receiver 314 to despread and process multiple signal instances, and a demodulated symbol buffer 316 (also called back-end RAM (BERAM) or demodulated symbol RAM). There may be a plurality demodulated symbol buffers 316 to correspond to the plurality of users/access terminals.

A deinterleaver 306 deinterleaves data from the demodulator 304.

A decoder 308 may decode the demodulated data to recover decoded data bits transmitted by the access terminal 106. The decoded data may be provided to a data sink 310.

Figure 4:
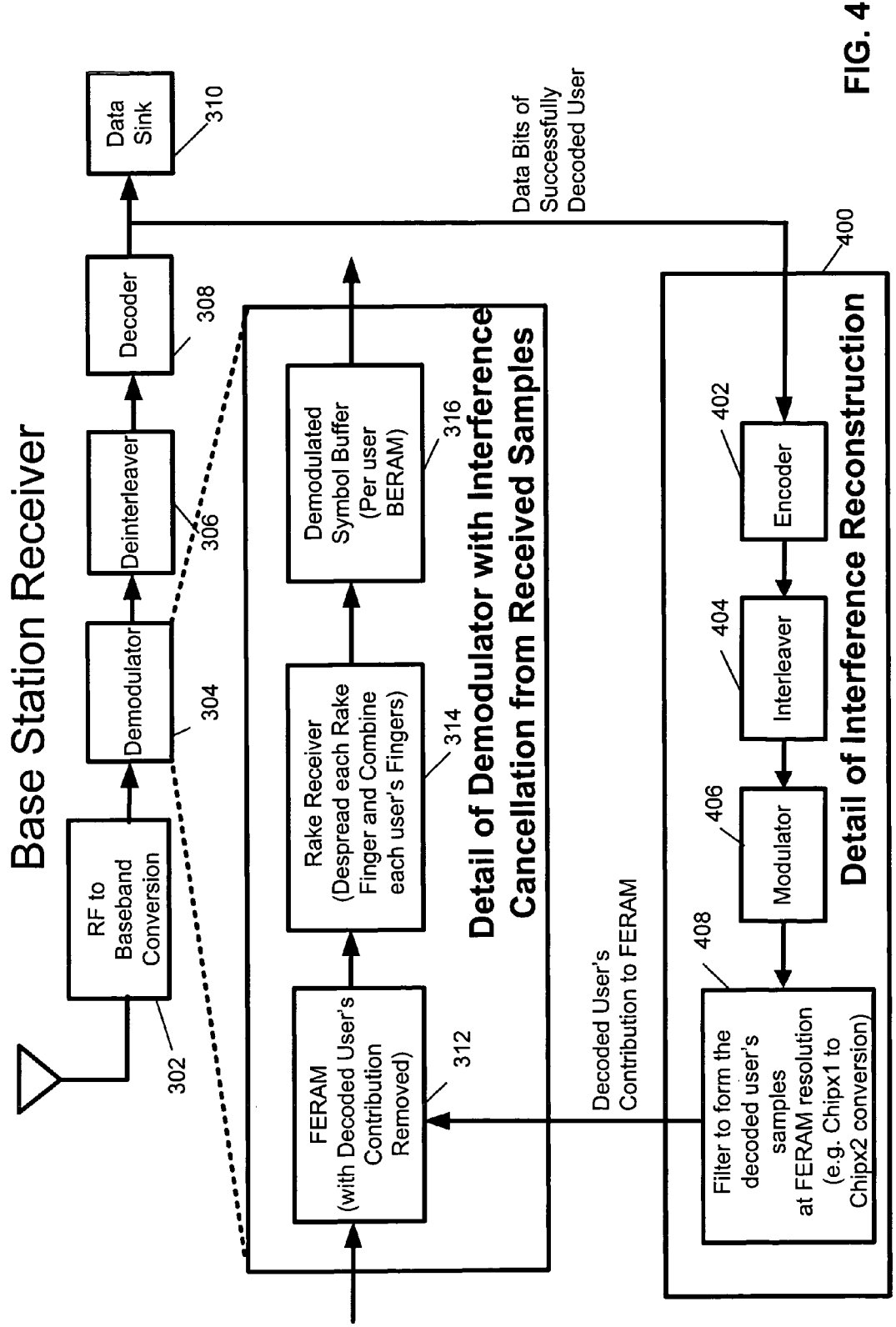
FIG. 4 illustrates another embodiment of a base station receiver process or structure.

FIG. 4 illustrates another embodiment of a base station receiver process or structure. In FIG. 4, data bits of successfully decoded user are input to an interference reconstruction unit 400, which includes an encoder 402, interleaver 404, modulator 406 and filter 408. The encoder 402, interleaver 404, and modulator 406 may be similar to the encoder 202, interleaver 204, and modulator 206 of FIG. 2. The filter 408 forms the decoded user's samples at FERAM resolution, e.g., change from chip rate to 2× chip rate. The decoder user's contribution to the FERAM is them removed or canceled from the FERAM 312.

Although interference cancellation at a base station 104 is described below, the concepts herein may be applied to an access terminal 106 or any other component of a communication system.

Traffic Interference Cancellation

The capacity of a CDMA reverse link may be limited by the interference between users since the signals transmitted by different users are not orthogonal at the BTS 104. Therefore, techniques that decrease the interference between users will improve the system performance of a CDMA reverse link. Techniques are described herein for the efficient implementation of interference cancellation for advanced CDMA systems such as CDMA2000 1×EV-DO RevA.

Each DO RevA user transmits traffic, pilot, and overhead signals, all of which may cause interference to other users. As FIG. 4 shows, signals may be reconstructed and subtracted from the front-end RAM 312 at the BTS 104. The transmitted pilot signal is known at the BTS 104 and may be reconstructed based on knowledge about the channel. However, the overhead signals (such as reverse rate indicator (RRI), data request channel or data rate control (DRC), data source channel (DSC), acknowledgement (ACK)) are first demodulated and detected, and the transmitted data signals are demodulated, de-interleaved, and decoded at the BTS 104 in order to determine the transmitted overhead and traffic chips. Based on determining the transmitted chips for a given signal, the reconstruction unit 400 may then reconstruct the contribution to the FERAM 312 based on channel knowledge.

Bits of a data packet from the data source 200 may be repeated and processed by the encoder 202, interleaver 204 and/or modulator 206 into a plurality of corresponding "subpackets" for transmitting to the base station 104. If the base station 104 receives a high signal-to-noise-ratio signal, the first subpacket may contain sufficient information for the base station 104 to decode and derive the original data packet. For example, a data packet from the data source 200 may be repeated and processed into four subpackets. The user terminal 106 sends a first subpacket to the base station 104. The base station 104 may have a relatively low probability of correctly decoding and deriving the original data packet from the first received subpacket. But as the base station 104 receives the second, third and fourth subpackets and combines information derived from each received subpacket, the probability of decoding and deriving the original data packet increases. As soon as the base station 104 correctly decodes the original packet (e.g., using a cyclic redundancy check (CRC) or other error detection techniques), the base station 104 sends an acknowledgement signal to the user terminal 106 to stop sending subpackets. The user terminal 106 may then send a first subpacket of a new packet.

The reverse link of DO-RevA employs H-ARQ (FIG. 7), where each 16-slot packet is broken into 4 subpackets and transmitted in an interlaced structure with 8 slots between subpackets of the same interlace. Furthermore, different users/access terminals 106 may begin their transmissions on different slot boundaries, and therefore the 4-slot subpackets of different users arrive at the BTS asynchronously. The effects of asynchronism and an efficient design of interference cancellation receivers for H-ARQ and CDMA are described below.

The gains from interference cancellation depend on the order in which signals are removed from the FERAM 312. Techniques are disclosed herein related to decoding (and subtracting if CRC passes) users based on traffic-to-pilot (T2P) ratios, effective SINR, or probability of decoding. Various approaches are disclosed herein for re-attempting the demodulation and decoding of users after others have been removed from the FERAM 312. Interference cancellation from the BTS FERAM 312 may be efficiently implemented to account for asynchronous CDMA systems, such as EV-DO RevA, where users transmit pilot signals, control signals, and traffic signals using Hybrid-ARQ. This disclosure may also apply to EV-DV Rel D, W-CDMA EUL, and cdma2000.

Traffic interference cancellation (TIC) may be defined as subtractive interference cancellation which removes the contribution of a user's data to the FERAM 312 after that user has decoded correctly (FIG. 4). Some of the practical problems associated with TIC on actual CDMA systems such as CDMA2000, EV-DO, EV-DV, and WCDMA are addressed herein. Many of these problems are caused by the fact that real systems have user asynchrony and Hybrid ARQ. For example, CDMA2000 intentionally spreads user data frames uniformly in time to prevent excess delay in the backhaul network. RevA of EV-DO, Rel D of EV-DV, and EUL of WCDMA also use Hybrid ARQ which introduces more than one possible data length.

Multi-user detection is the main category of algorithms under which TIC falls, and refers to any algorithm which attempts to improve performance by allowing the detection of two different users to interact. A TIC method may involve a hybrid of successive interference cancellation (also called sequential interference cancellation or SIC) and parallel interference cancellation. "Successive interference cancellation" refers to any algorithm which decodes users sequentially and uses the data of previously decoded users to improve performance. "Parallel interference cancellation" refers broadly to decoding users at the same time and subtracting all decoded users at the same time.

TIC may be different than pilot interference cancellation (PIC). One difference between TIC and PIC is that the transmitted pilot signal is known perfectly by the receiver in advance. Therefore, PIC may subtract the pilot contribution to the received signal using only channel estimates. A second major difference is that the transmitter and the receiver interact closely on the traffic channel through the H-ARQ mechanism. The receiver does not know the transmitted data sequence until a user is successfully decoded.

Similarly, it is desirable to remove overhead channels from the front-end RAM, in a technique called overhead interference cancellation (OIC). Overhead channels cannot be removed until the BTS 104 knows the transmitted overhead data, and this is determined by decoding and then reforming the overhead messages.

Successive interference cancellation defines a class of methods. The chain rule of mutual information shows that, under ideal conditions, successive interference cancellation may achieve the capacity of a multiple access channel. The main conditions for this are that all users are frame synchronous and each user's channel may be estimated with negligible error.

Figure 5:
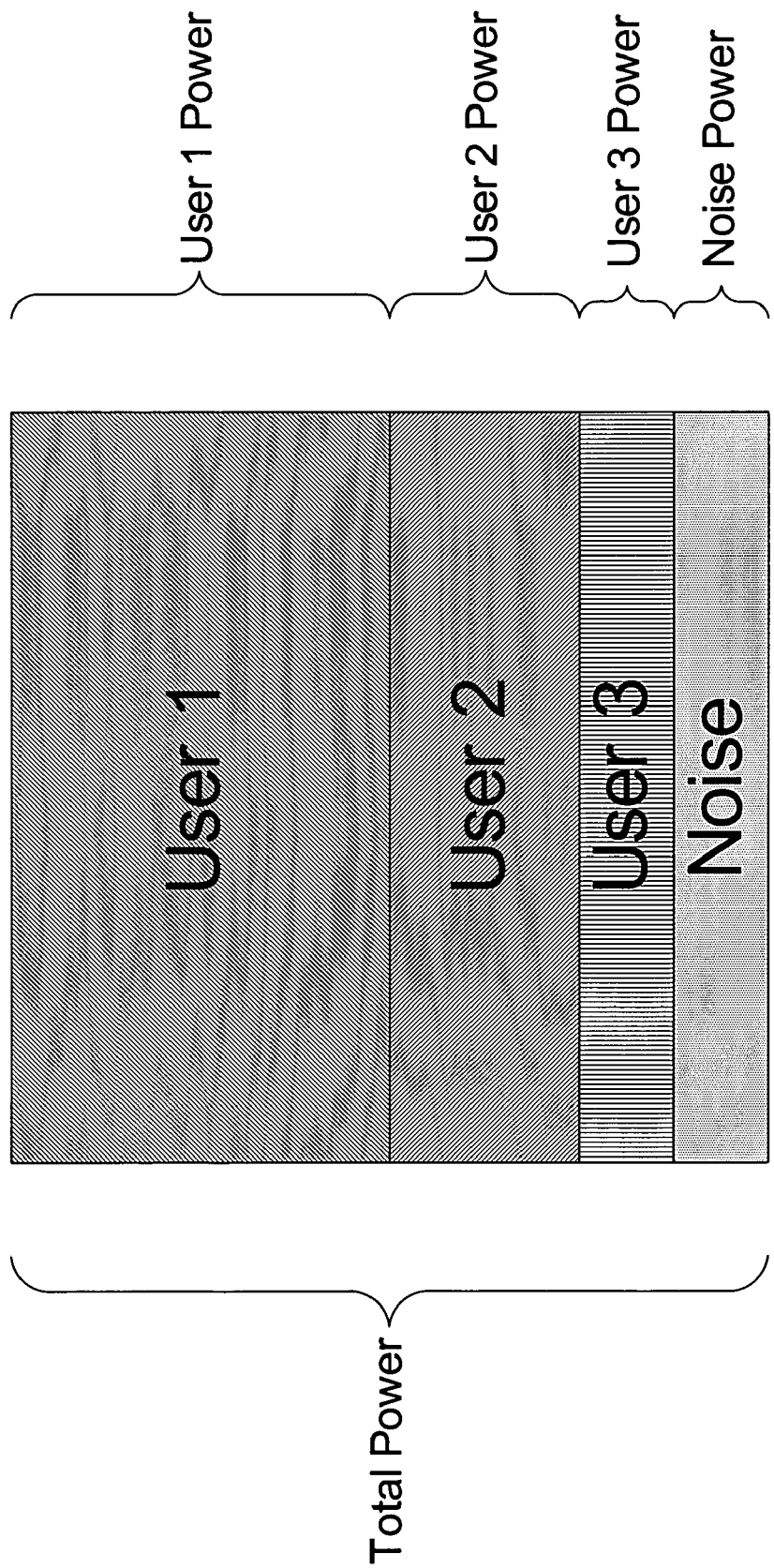
FIG. 5 illustrates a general example of power distribution of three users in the system of FIG. 1.

FIG. 5 illustrates a general example of power distribution of three users (user 1, user 2, user 3), where the users transmit frames synchronously (frames from all users are received at the same time), and each user is transmitting at the same data rate. Each user is instructed to use a particular transmit power, e.g., user 3 transmits at a power substantially equal to noise; user 2 transmits at a power substantially equal to user 3's power plus noise; and user 1 transmits at a power substantially equal to user 2 plus user 3 plus noise.

The receiver process signals from the users in decreasing order by transmit power. Starting with k=1 (user 1 with highest power), the receiver attempts to decode for user 1. If decoding is successful, then user 1's contribution to the received signal is formed and subtracted based on his channel estimate. This may be called frame synchronous sequential interference cancellation. The receiver continues until decoding has been attempted for all users. Each user has the same SINR after interference cancellation of the previously decoded users' successive interference cancellation.

Unfortunately, this approach may be very sensitive to decoding errors. If a single large power user, such as user 1, does not decode correctly, the signal-to-interference-plus-noise ratio (SINR) of all following users may be severely degraded. This may prevent all users after that point from decoding. Another drawback of this approach is that it requires users to have particular relative powers at the receiver, which is difficult to ensure in fading channels.

Frame Asynchronism and Interference Cancellation, e.g. cdma2000

Suppose that user frame offsets are intentionally staggered with respect to each other. This frame asynchronous operation has a number of benefits to the system as a whole. For example, processing power and network bandwidth at the receiver would then have a more uniform usage profile in time. In contrast, frame synchronism among users requires a burst of processing power and network resources at the end of each frame boundary since all users would finish a packet at the same time. With frame asynchronism, the BTS 104 may decode the user with the earliest arrival time first rather than the user with the largest power.

Figure 6:
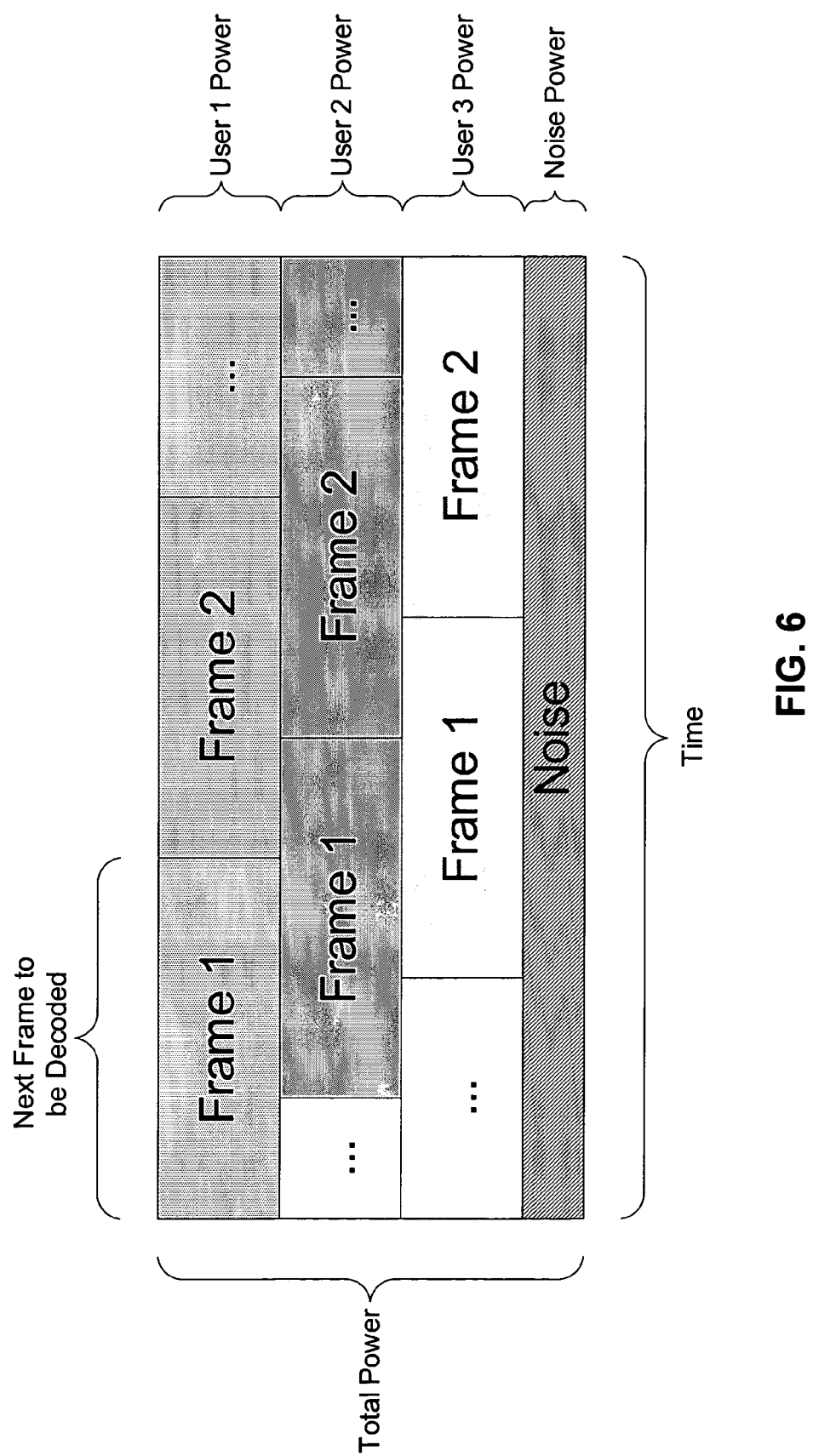
FIG. 6 shows an example of a uniform time-offset distribution for frame asynchronous traffic interference cancellation for users with equal transmit power.

FIG. 6 shows an example of a uniform time-offset distribution for frame asynchronous TIC for users with equal transmit power. FIG. 6 depicts a snapshot of a time instant right before frame 1 of user 1 is to be decoded. Since frame 0 has already been decoded and canceled for all users, its contribution to the interference is shown crosshatched (users 2 and 3). In general, this approach reduces the interference by a factor of 2. Half of the interference has been removed by TIC before decoding Frame 1 of User 1.

In another embodiment, the users in FIG. 6 may refer to groups of users, e.g., user group 1, user group 2, user group 3.

A benefit of asynchronism and interference cancellation is the relative symmetry between users in terms of power levels and error statistics if they want similar data rates. In general sequential interference cancellation with equal user data rates, the last user is received with very low power and is also quite dependent of the successful decoding of all prior users.

Asynchronism, Hybrid ARQ and Interlacing, e.g. EV-DO RevA

Figure 7:
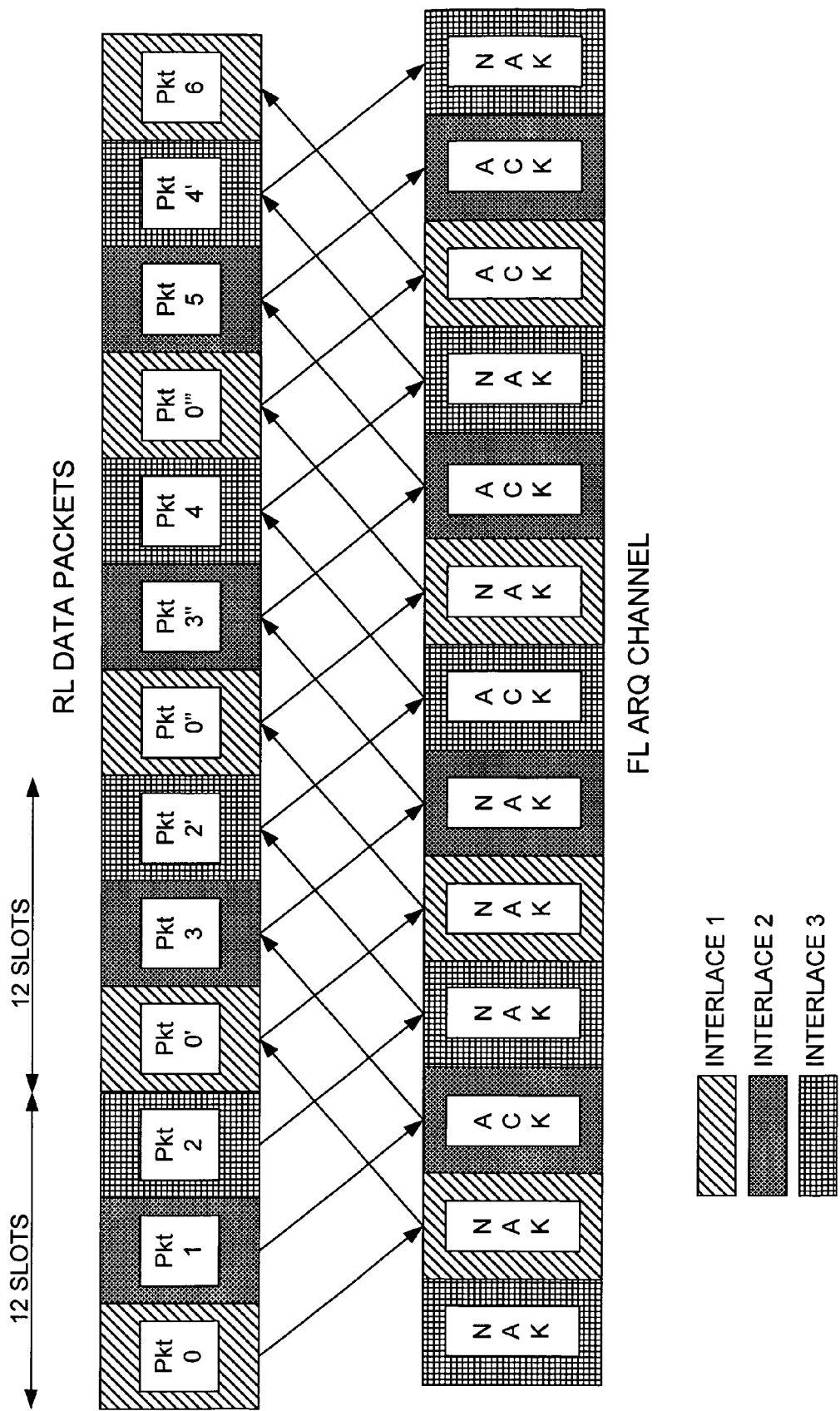
FIG. 7 illustrates an interlacing structure used for the reverse link data packets and a forward link automatic repeat request channel.

FIG. 7 illustrates an interlacing structure (e.g., in 1×EV-DO RevA) used for RL data packets and a FL ARQ channel. Each interlace (interlace 1, interlace 2, interlace 3) comprises a set of time-staggered segments. In this example, each segment is four time slots long. During each segment, a user terminal may transmit a subpacket to the base station. There are three interlaces, and each segment is four time slots long. Thus, there are eight time slots between the end of a subpacket of a given interlace and the beginning of the next subpacket of the same interlace. This gives enough time for the receiver to decode the subpacket and relay an ACK or negative acknowledgement (NAK) to the transmitter.

Hybrid ARQ takes advantage of the time-varying nature of fading channels. If the channel conditions are good for the first 1, 2 or 3 subpackets, then the data frame may be decoded using only those subpackets, and the receiver sends an ACK to the transmitter. The ACK instructs the transmitter not to send the remaining subpacket(s), but rather to start a new packet if desired.

Receiver Architectures for Interference Cancellation

With TIC, the data of decoded users is reconstructed and subtracted (FIG. 4) so the BTS 104 may remove the interference the data of decoded users causes to other users. A TIC receiver may be equipped with two circular memories: the FERAM 312 and the BERAM 316.

The FERAM 312 stores received samples (e.g., at 2× chip rate) and is common to all users. A non-TIC receiver would only use a FERAM of about 1-2 slots (to accommodate delays in the demodulation process) since no subtraction of traffic or overhead interference takes place. In a TIC receiver for a system with H-ARQ, the FERAM may span many slots, e.g., 40 slots, and is updated by TIC through the subtraction of interference of decoded users. In another configuration, the FERAM 312 may have a length that spans less than a full packet, such as a length that spans a time period from a beginning of a subpacket of a packet to an end of a subsequent subpacket of the packet.

The BERAM 316 stores demodulated symbols of the received bits as generated by the demodulator's rake receiver 314. Each user may have a different BERAM, since the demodulated symbols are obtained by despreading with the user-specific PN sequence, and combining across RAKE fingers. Both a TIC and non-TIC receiver may use a BERAM 316. The BERAM 316 in TIC is used to store demodulated symbols of previous subpackets that are no longer stored in a FERAM 312 when the FERAM 312 does not span all subpackets. The BERAM 316 may be updated either whenever an attempt to decode takes place or whenever a slot exists from the FERAM 312.

Methods for Choosing the FERAM Length

The size of the BERAM 316 and FERAM 312 may be chosen according to various trade-offs between required processing power, transfer bandwidth from the memories to the processors, delays and performance of the system. In general, by using a shorter FERAM 312 the benefits of TIC will be limited, since the oldest subpacket will not be updated. On the other hand, a shorter FERAM 312 yields a reduced number of demodulations, subtractions and a lower transfer bandwidth.

With the RevA interlacing, a 16-slot packet (four subpackets, each subpacket transmitted in 4 slots) would span 40 slots. Therefore, a 40-slot FERAM may be used to ensure removal of a user from all affected slots.

Figure 8:
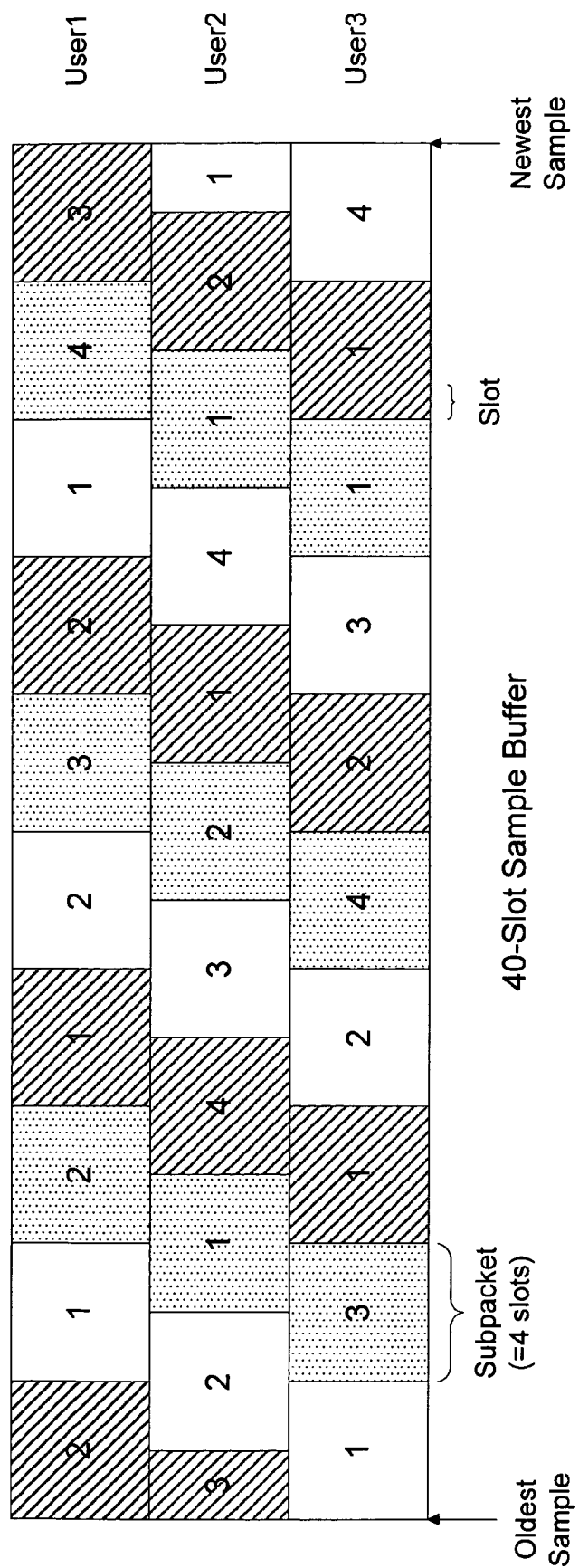
FIG. 8 illustrates a memory that spans a complete 16-slot packet.

FIG. 8 illustrates a 40-slot FERAM 312 that spans a complete 16-slot packet for EV-DO RevA. Whenever a new subpacket is received, decoding is attempted for that packet using all the available subpackets stored in the FERAM 312. If decoding is successful, then the contribution of that packet is canceled from the FERAM 312 by reconstructing and subtracting the contribution of all component subpackets (1, 2, 3, or 4). For DO-RevA FERAM lengths of 4, 16, 28, or 40 slots would span 1, 2, 3, or 4 subpackets, respectively. The length of the FERAM implemented at the receiver may depend on complexity considerations, the need to support various user arrival times, and the capability of re-doing the demodulation and decoding of users on previous frame offsets.

Figure 9A:
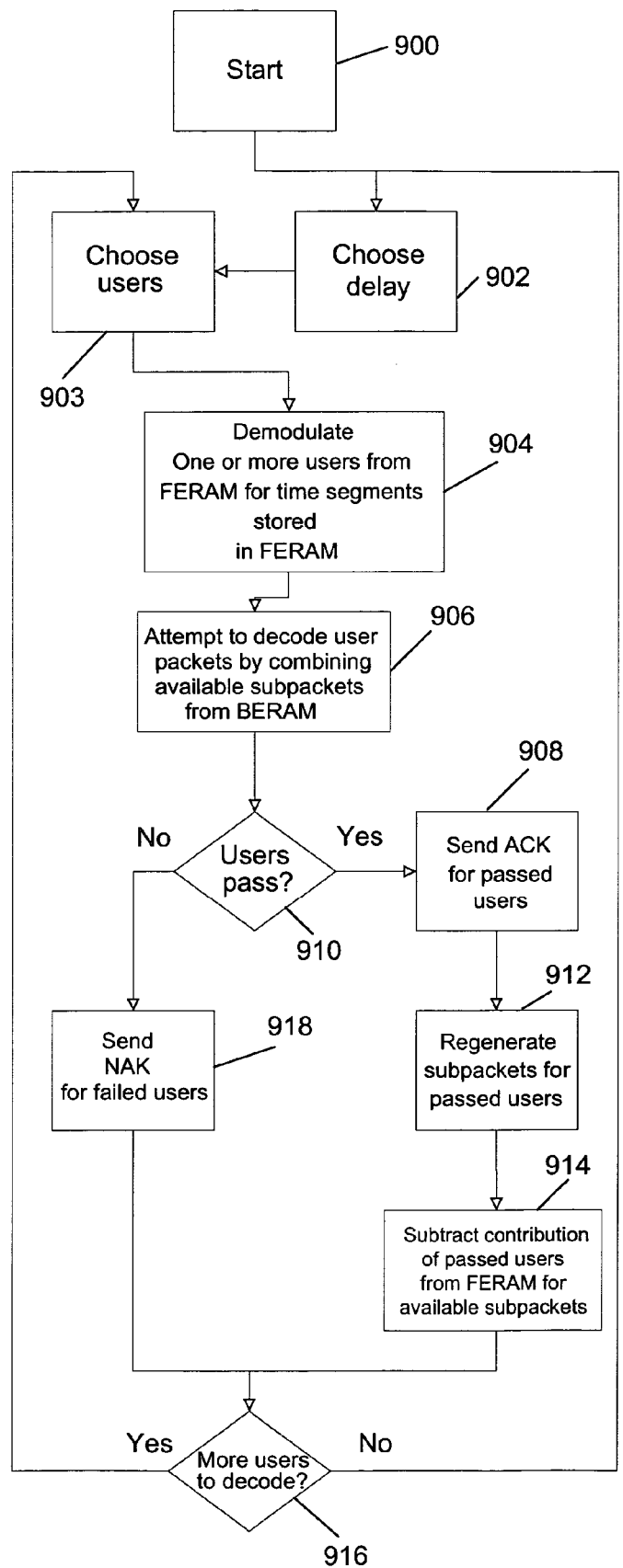
FIG. 9A illustrates a method of traffic interference cancellation for an example of sequential interference cancellation (SIC) with no delayed decoding.

FIG. 9A illustrates a general method of TIC for an example of sequential interference cancellation (SIC) with no delayed decoding. Other enhancements will be described below. The process starts at a start block 900 and proceeds to a choose delay block 902. In SIC, the choose delay block 902 may be omitted. In block 903, the BTS 104 chooses one user (or a group of users) among those users that terminate a subpacket in the current slot.

In block 904, demodulator 304 demodulates samples of the chosen user's subpackets for some or all time segments stored in the FERAM 312 according to the user's spreading and scrambling sequence, as well as to its constellation size. In block 906, the decoder 308 attempts to decode the user packet using the previously demodulated symbols stored in BERAM 316 and the demodulated FERAM samples.

In block 910, the decoder 308 or another unit may determine whether the user(s)'s packet was successfully decoded, i.e., passes an error check, such as using a cyclic redundancy code (CRC).

If the user packet fails to decode, a NAK is sent back to the access terminal 106 in block 918. If the user packet is correctly decoded, an ACK is sent to the access terminal 106 in block 908 and interference cancellation (IC) is performed in blocks 912-914. Block 912 regenerates the user signal according to the decoded signal, the channel impulse response and the transmit/receive filters. Block 914 subtracts the contribution of the user from the FERAM 312, thus reducing its interference on users that have not yet been decoded.

Upon both failure and success in the decoding, the receiver moves to the next user to be decoded in block 916. When an attempt to decode has been performed on all users, a new slot is inserted into the FERAM 312 and the entire process is repeated on the next slot. Samples may be written into the FERAM 312 in real time, i.e., the 2× chip rate samples may be written in every ½ chip.

Figure 9B:
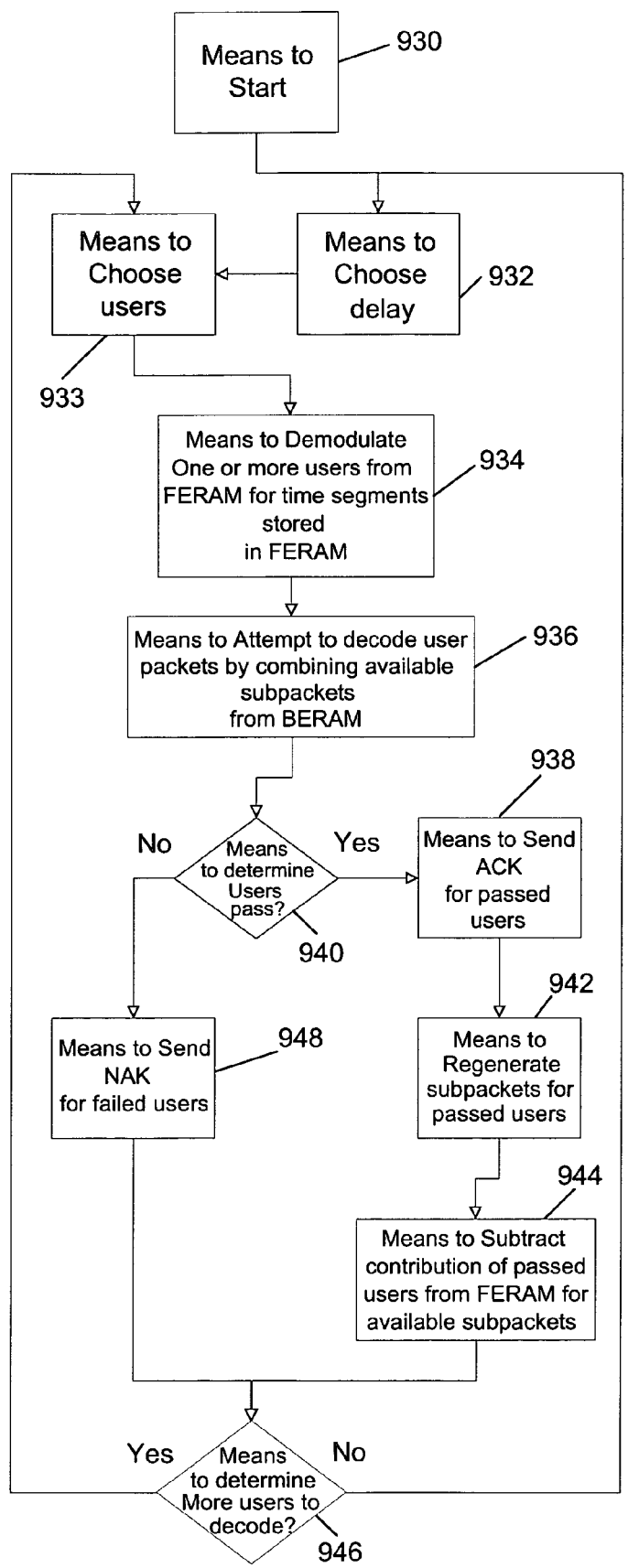
FIG. 9B illustrates an apparatus to perform the method of FIG. 9A.

FIG. 9B illustrates an apparatus comprising means 930-946 to perform the method of FIG. 9A. The means 930-946 in FIG. 9B may be implemented in hardware, software or a combination of hardware and software.

Methods for Choosing a Decoding Order

Block 903 indicates TIC may be applied either sequentially to each user or parallel to groups of users. As groups grow larger, the implementation complexity may decrease but the benefits of TIC may decrease unless TIC is iterated as described below.

The criteria according to which users are grouped and/or ordered may vary according to the rate of channel variation, the type of traffic and the available processing power. Good decoding orders may include first decoding users who are most useful to remove and who are most likely to decode. The criteria for achieving the largest gains from TIC may include:

A. Payload Size and T2P: The BTS 104 may group or order users according to the payload size, and decode in order starting from those with highest transmit power, i.e., highest T2P to those with lowest T2P. Decoding and removing high T2P users from the FERAM 312 has the greatest benefit since they cause the most interference to other users.

B. SINR: The BTS 104 may decode users with higher SINR before users with lower SINR since users with higher SINR have a higher probability of decoding. Also, users with similar SINR may be grouped together. In case of fading channels, the SINR is time varying throughout the packet, and so an equivalent SINR may be computed in order to determine an appropriate ordering.

C. Time: The BTS 104 may decode "older" packets (i.e., those for which more subpackets have been received at the BTS 104) before "newer" packets. This choice reflects the assumption that for a given T2P ratio and ARQ termination goal, packets are more likely to decode with each incremental subpacket.

Methods for Re-Attempting Decoding

Whenever a user is correctly decoded, its interference contribution is subtracted from the FERAM 312, thus increasing the potential of correctly decoding all users that share some slots. It is advantageous to repeat the attempt to decode users that previously failed, since the interference they see may have dropped significantly. The choose delay block 902 selects the slot (current or in the past) used as reference for decoding and IC. The choose users block 903 will select users that terminate a subpacket in the slot of the chosen delay. The choice of delay may be based on the following options:

A. Current decoding indicates a choice of moving to the next (future) slot once all users have been attempted for decoding, and the next slot is available in the FERAM 312. In this case, each user is attempted to be decoded once per processed slot, and this would correspond to successive interference cancellation.

B. Iterative decoding attempts to decode users more than once per processed slot. The second and subsequent decoding iteration will benefit from the canceled interference of decoded users on previous iterations. Iterative decoding yields gains when multiple users are decoded in parallel without intervening IC. With pure iterative decoding on the current slot, the choose delay block 902 would simply select the same slot (i.e., delay) multiple times.

C. Backward decoding: The receiver demodulates subpackets and attempts to decode a packet based on demodulating all available subpackets in the FERAM corresponding to that packet. After attempting to decode packets with a subpacket that terminates in the current time slot (i.e., users on the current frame offset), the receiver may attempt to decode packets that failed decoding in the previous slot (i.e., users on the previous frame offset). Due to the partial overlap among asynchronous users, the removed interference of subpackets that terminate in the current slot will improve the chances of decoding past subpackets. The process may be iterated by going back more slots. The maximum delay in the forward link ACK/NAK transmission may limit backward decoding.

D. Forward decoding: After having attempted to decode all packets with subpackets that terminate in the current slot, the receiver may also attempt to decode the latest users before their full subpacket is written into the FERAM. For example, the receiver could attempt to decode users after 3 of their 4 slots of the latest subpacket have been received.

Methods for Updating the BERAM

In a non-TIC BTS receiver, packets are decoded based solely on the demodulated symbols stored in the BERAM, and the FERAM is used only to demodulate users from the most recent time segments. With TIC, the FERAM 312 is still accessed whenever the receiver attempts to demodulate a new user. However, with TIC, the FERAM 312 is updated after a user is correctly decoded based on reconstructing and subtracting out that user's contribution. Due to complexity considerations, it may be desirable to choose the FERAM buffer length to be less than the span of a packet (e.g., 40 slots are required to span a 16-slot packet in EV-DO RevA). As new slots are written into the FERAM 312, they would overwrite the oldest samples in the circular buffer. Therefore, as new slots are received the oldest slots are overwritten and the decoder 308 will use BERAM 316 for these old slots. It should be noted that even if a given subpacket is located in the FERAM 312, the BERAM 316 may be used to store the demodulator's latest demodulated symbols (determined from the FERAM 312) for that subpacket as an intermediate step in the interleaving and decoding process. There are two main options for the update of the BERAM 316:

A. User-based update: The BERAM 316 for a user is updated only in conjunction with a decoding attempted for that user. In this case, the update of the older FERAM slots might not benefit the BERAM 316 for a given user if that user is not decoded at an opportune time (i.e., the updated FERAM slots might slide out of the FERAM 312 before that user is attempted to be decoded).

B. Slot-based update: In order to fully exploit the benefits of TIC, the BERAM 316 for all affected users may be updated whenever a slot exits FERAM 312. In this case, the content of BERAM 316 includes all the interference subtraction done on the FERAM 312.

Methods for Canceling Interference from Subpackets that Arrive Due to a Missed ACK Deadline In general, the extra processing used by TIC introduces a delay in the decoding process, which is particularly relevant when either iterative or backward schemes are used. This delay may exceed the maximum delay at which the ACK may be sent to the transmitter in order to stop the transmission of subpackets related to the same packet. In this case, the receiver may still take advantage of successful decoding by using the decoded data to subtract not only the past subpackets but also those which will be received in the near future due to the missing ACK.

With TIC, the data of decoded users is reconstructed and subtracted so that the base station 104 may remove the interference it causes to other users' subpackets. With H-ARQ, whenever a new subpacket is received, decoding is attempted for the original packet. If decoding is successful, then for H-ARQ with TIC, the contribution of that packet may be canceled from the received samples by reconstructing and subtracting out the component subpackets. Depending on complexity considerations, it is possible to cancel interference from 1, 2, 3 or 4 subpackets by storing a longer history of samples. In general, IC may be applied either sequentially to each user or to groups of users.

Figure 10:
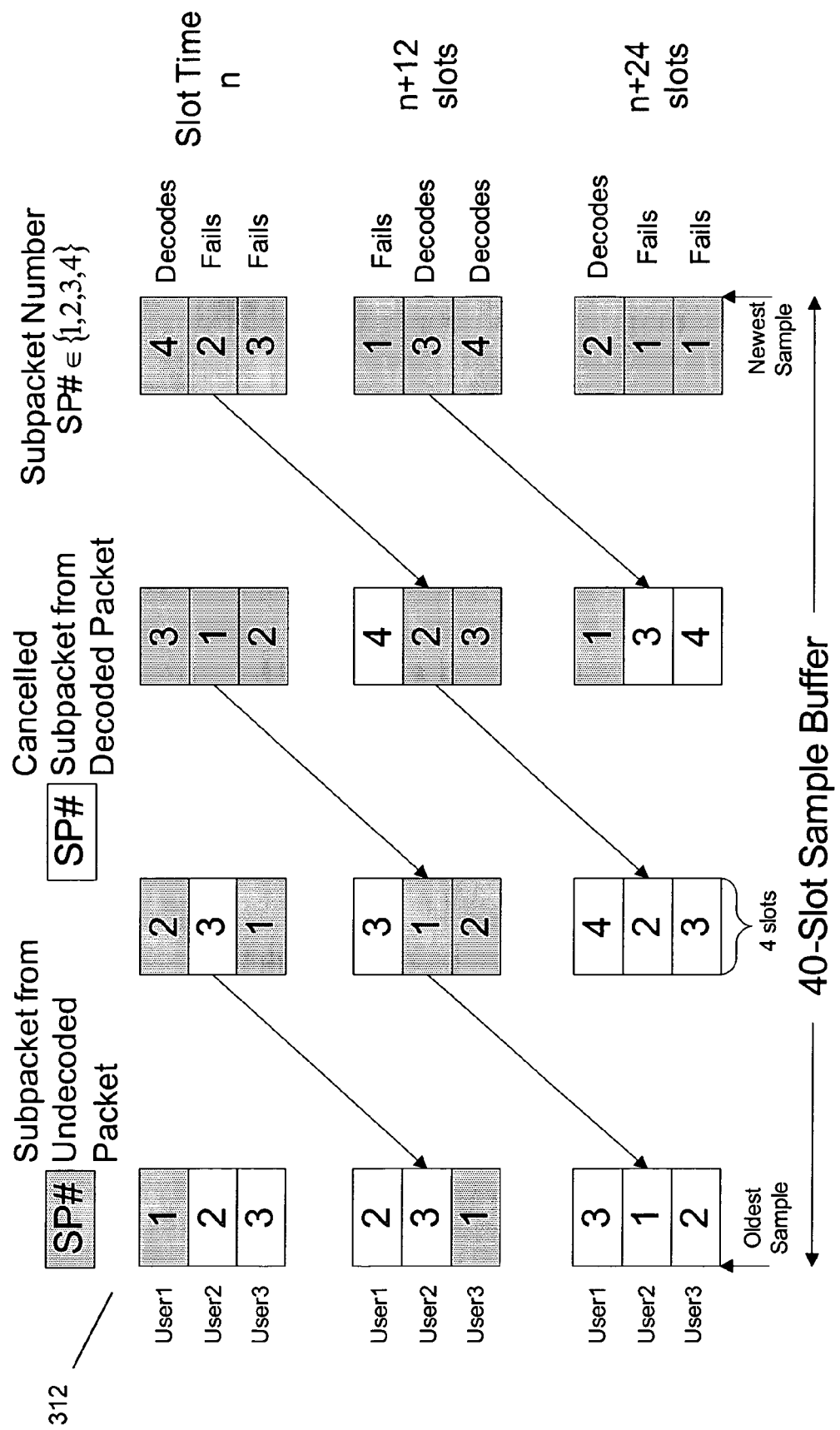
FIG. 10 illustrates a receiver sample buffer after arrival of successive subpackets of an interlace with interference cancellation of decoded subpackets.

FIG. 10 illustrates a receiver sample buffer 312 at three time instances: slot time n, n+12 slots and n+24 slots. For illustrative purposes, FIG. 10 shows a single interlace with subpackets from three Users who are on the same frame offset to highlight the interference cancellation operation with H-ARQ. The receiver sample buffer 312 in FIG. 10 spans all 4 subpackets (which may be achieved for EV-DO RevA by a 40-slot buffer since there are 8 slots between each 4-slot subpacket). Undecoded subpackets are shown as shaded. Decoded subpackets are shown as unshaded in the 40-slot buffer and are canceled. Each time instance corresponds to the arrival of another subpacket on the interlace. At slot time n, User 1's four stored subpackets are correctly decoded while the latest subpackets from Users 2 and 3 fail to decode.

At time instance n+12 slots, successive subpackets of the interlace arrive with interference cancellation of Users 1's decoded (unshaded) subpackets 2, 3 and 4. During time instance n+12 slots, packets from Users 2 and 3 successfully decode.

FIG. 10 applies IC to groups of users who are on the same frame offset, but does not perform successive interference cancellation within the group. In classical group IC, users in the same group do not see mutual interference cancellation. Therefore, as the number of users in a group grows larger, the implementation complexity decreases but there is a loss due to the lack of cancellation between users of the same group for the same decoding attempt. However, with H-ARQ, the receiver would attempt to decode all users in the group after each new subpacket arrives, allowing users in the same group to achieve mutual interference cancellation. For example, when the packet of User 1 decodes at time n, this helps the packets of Users 2 and 3 decode at time n+12, which further helps User 1 decode at time n+24. All subpackets of a previously decoded packet may be canceled before reattempting decode for the other users when their next subpackets arrive. A key point is that although particular users may always be in the same group, their subpackets see the IC gain when other group members decode.

Joint Interference Cancellation of Pilot, Overhead, and Traffic Channels

A problem addressed by this section is related to improving system capacity of a CDMA RL by efficiently estimating and canceling multi-user interference at the base station receiver. In general, a RL user's signal consists of pilot, overhead and traffic channels. This section describes a joint pilot, overhead, and traffic IC scheme for all users.

There two aspects described. First, overhead IC (OIC) is introduced. On the reverse link, overhead from each user acts as interference to signals of all other users. For each user, the aggregate interference due to overheads by all other users may be a large percentage of the total interference experienced by this user. Removing this aggregate overhead interference may further improve system performance (e.g., for a CDMA2000 1×EV-DO RevA system) and increase reverse link capacity beyond performance and capacity achieved by PIC and TIC.

Second, important interactions among PIC, OIC, and TIC are demonstrated through system performance and hardware (HW) design tradeoffs. A few schemes are described on how to best combine all three cancellation procedures. Some may have more performance gain, and some may have more complexity advantage. For example, one of the described schemes removes all the pilot signals before decoding any overhead and traffic channels, then decodes and cancels the users' overhead and traffic channels in a sequential manner.

This section is based on CDMA2000 1× EV-DO RevA systems and in general applies to other CDMA systems, such as W-CDMA, CDMA2000 1×, and CDMA2000 1× EV-DV.

Methods for Overhead Channels Cancellation

Figure 11:
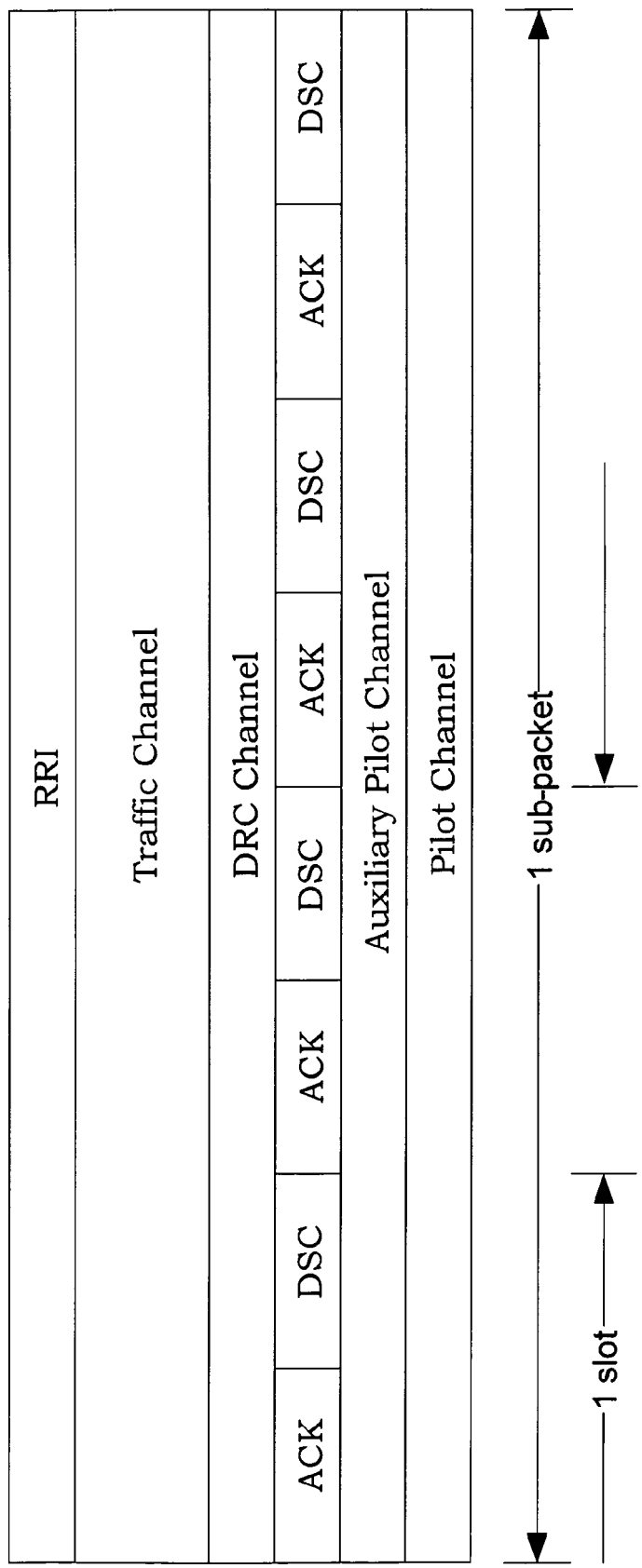
FIG. 11 illustrates an overhead channels structure.

FIG. 11 illustrates a RL overhead channels structure, such as for EV-DO RevA. There are two types of overhead channels: one type is to assist the RL demodulation/decoding which includes the RRI (reverse rate indicator) channel and the auxiliary pilot channel (used when payload size is 3072 bits or higher); the other type is to facilitate the forward link (FL) functioning which includes DRC (data rate control) channel, DSC (data source control), and ACK (acknowledge) channel. As shown in FIG. 11, ACK and DSC channels are time-multiplexed on a slot base. ACK channel is only transmitted when acknowledging a packet transmitted to the same user on FL.

Among the overhead channels, the data of the auxiliary pilot channel is known a priori at the receiver. Therefore, similar to primary pilot channel, no demodulation and decoding are necessary for this channel, and the auxiliary pilot channel may be reconstructed based on knowledge about the channel. The reconstructed auxiliary pilot may be at 2× chip rate resolution and may be represented as (over one segment)

$$p_f[2n + \delta_f] = \sum_{\mu=-M}^{M} c_f[n - \mu]w_{f,aux}[n - \mu] \cdot G_{aux} \cdot (h_f\phi[8\mu - \alpha_f]),$$

$$n = 0, \ldots, 511$$

$$p_f[2n + \delta_f + 1] =$$

$$\sum_{\mu=-M}^{M} c_f[n - \mu]w_{f,aux}[n - \mu] \cdot G_{aux} \cdot (h_f\phi[8\mu + 4 - \alpha_f]),$$

$$n = 0, \ldots, 511$$

Equation 1 Reconstructed auxiliary pilot signals where n corresponds to chipx1 sampling rate, f is the finger number, $c_f$ is the PN sequence, $w_{f,aux}$ is the Walsh code assigned to the auxiliary pilot channel, $G_{aux}$ is the relative gain of this channel to the primary pilot, $h_f$ is the estimated channel coefficient (or channel response) which is assumed to be a constant over one segment, $\phi$ is the filter function or convolution of the transmit pulse and the receiver low-pass filter of chipx8 resolution ($\phi$ is assumed non-negligible in $[-MT_c, MT_c]$), $\gamma_f$ is the chipx8 time offset of this finger with $\alpha_f = \gamma_f \bmod 4$ and $\delta_f = \lfloor \gamma_f/4 \rfloor$.

The second group of overhead channels, which includes DRC, DSC, and RRI channels, are encoded by either bi-orthogonal codes or simplex codes. On the receiver side, for each channel, the demodulated outputs are first compared with a threshold. If the output is below the threshold, an erasure is declared and no reconstruction is attempted for this signal. Otherwise, they are decoded by a symbol-based maximum-likelihood (ML) detector, which may be inside the decoder 308 in FIG. 4. The decoded output bits are used for reconstruction of the corresponding channel, as shown in FIG. 4. The reconstructed signals for these channels are given as:

$$o_f[2n+\delta_f] = \sum_{\mu=-M}^{M} c_f[n-\mu]w_{f,o}[n-\mu] \cdot d_o G_o \cdot (h_f \phi[8\mu - \alpha_f]),$$

$$n = 0, \ldots, 511$$

$$o_f[2n+\delta_f+1] = \sum_{\mu=-M}^{M} c_f[n-\mu]w_{f,o}[n-\mu] \cdot d_o G_o \cdot (h_f \phi[8\mu + 4 - \alpha_f]),$$

$$n = 0, \ldots, 511$$

Equation 2 Reconstructed Overhead (DRC, DSC, and RRI) Signals

Compared with Eq. 1, there is one new term $d_o$ which is the overhead channel data, $w_{f,o}$ is the Walsh cover, and $G_{aux}$ represents the overhead channel gain relative to the primary pilot.

The remaining overhead channel is the 1-bit ACK channel. It may be BPSK modulated, un-coded and repeated over half a slot. The receiver may demodulate the signal and make a hard-decision on the ACK channel data. The reconstruction signal model may be the same as Eq. 2.

Another approach to reconstruct the ACK channel signal assumes the demodulated and accumulated ACK signal, after normalization, may be represented as:

$$y = x + z,$$

where x is the transmitted signal, and z is the scaled noise term with variance of $\sigma^2$. Then, the log-likelihood ratio (LLR) of y is given as $$L = \ln \frac{Pr(x=1|y)}{Pr(x=-1|y)} = \frac{2}{\sigma^2} y.$$

Then, for the reconstruction purpose, a soft estimate of the transmitted bit may be:

$$\hat{x} = Pr(x=1) \cdot 1 + Pr(x=-1) \cdot (-1)$$

$$= \frac{\exp(L) - 1}{\exp(L) + 1}$$

$$= \tanh(L)$$

$$= \tanh\left(\frac{2}{\sigma^2} y\right),$$

where the tanh function may be tabulated. The reconstructed ACK signal is very similar to Eq. 2 but with the exception of replacing $d_o$ by $\hat{x}$. In general, the soft estimate and cancellation approach should give a better cancellation performance since the receiver does not know the data for sure and this method brings the confidence level into picture. This approach in general may be extended to overhead channels mentioned above. However, the complexity of the maximum aposteriori probability (MAP) detector to obtain the LLR for each bit grows exponentially with the number of information bits in one code symbol.

One efficient way to implement overhead channel reconstruction is one finger, may scale each decoded overhead signal by its relative gain, cover it by the Walsh code, and sum them together, then spread by one PN sequence and filter through the channel-scaled filter $h\phi$ all at once. This method may save both computation complexity and memory bandwidth for subtraction purpose.

$$\sum_f c_f d_f \cdot h_f \phi \text{ becomes } \left(\sum_f c_f d_f \cdot h_f\right) \phi$$

Joint PIC, OIC, and TIC

Joint PIC, OIC and TIC may be performed to achieve high performance and increase system capacity. Different decoding and cancellation orders of PIC, OIC and TIC may yield different system performance and different impacts on hardware design complexity.

PIC First Then OIC and TIC Together (First Scheme)

Figure 12A:
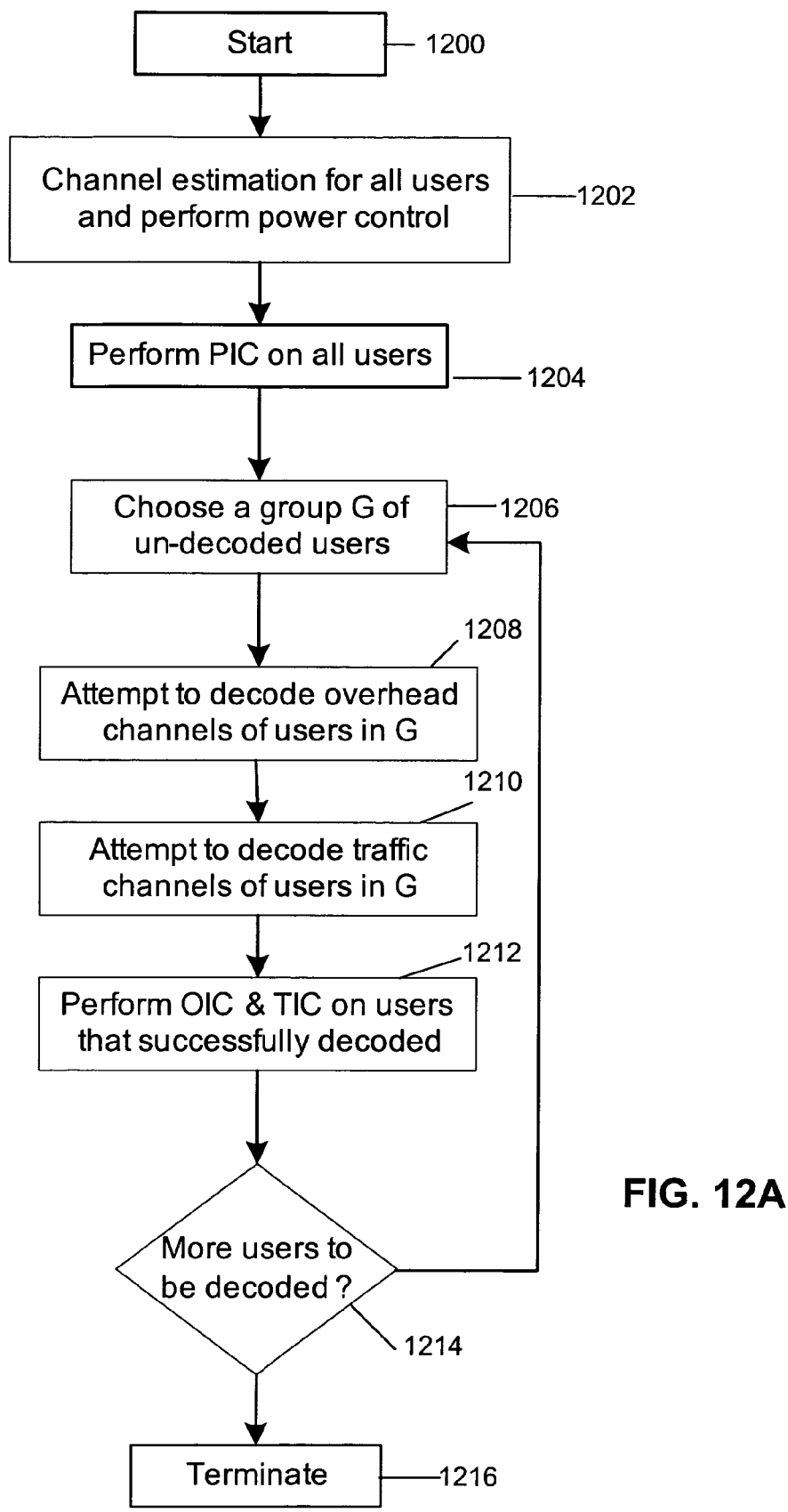
FIG. 12A illustrates a method to first perform pilot IC (PIC) and then perform overhead IC (OIC) and traffic IC (TIC) together.

FIG. 12A illustrates a method to first perform PIC and then perform OIC and TIC together. After a start block 1200, the receiver derives channel estimation for all users and performs power control in block 1202. Since the pilot data for all users are known at BTS, they may be subtracted once their channels are estimated in PIC block 1204. Therefore, all users' traffic channels and certain overhead channels observe less interference and are able to benefit from the in-front pilot cancellation.

Block 1206 chooses a group G of undecoded users, e.g., whose packets or subpackets terminate at current slot boundary. Blocks 1208-1210 perform overhead/traffic channel demodulation and decoding. In block 1212, only the successfully decoded channel data will be reconstructed and subtracted from the front-end RAM (FERAM) 312 shared by all users. Block 1214 checks whether there are more users to decode. Block 1216 terminates the process.

The decoding/reconstruction/cancellation may be in a sequential fashion from one user in a group to the next user in the group, which may be called successive interference cancellation. In this approach, users in late decoding order of the same group benefits from the cancellations of users in earlier decoding order. A simplified approach is to decode all users in the same group first, and then subtract their interference contributions all at once. The second approach or scheme (described below) allows both lower memory bandwidth and more efficient pipeline architecture. In both cases, the users' packets which do not terminate at the same slot boundary but overlap with this group of packets benefit from this cancellation. This cancellation may account for a majority of the cancellation gain in an asynchronous CDMA system.

Figure 12B:
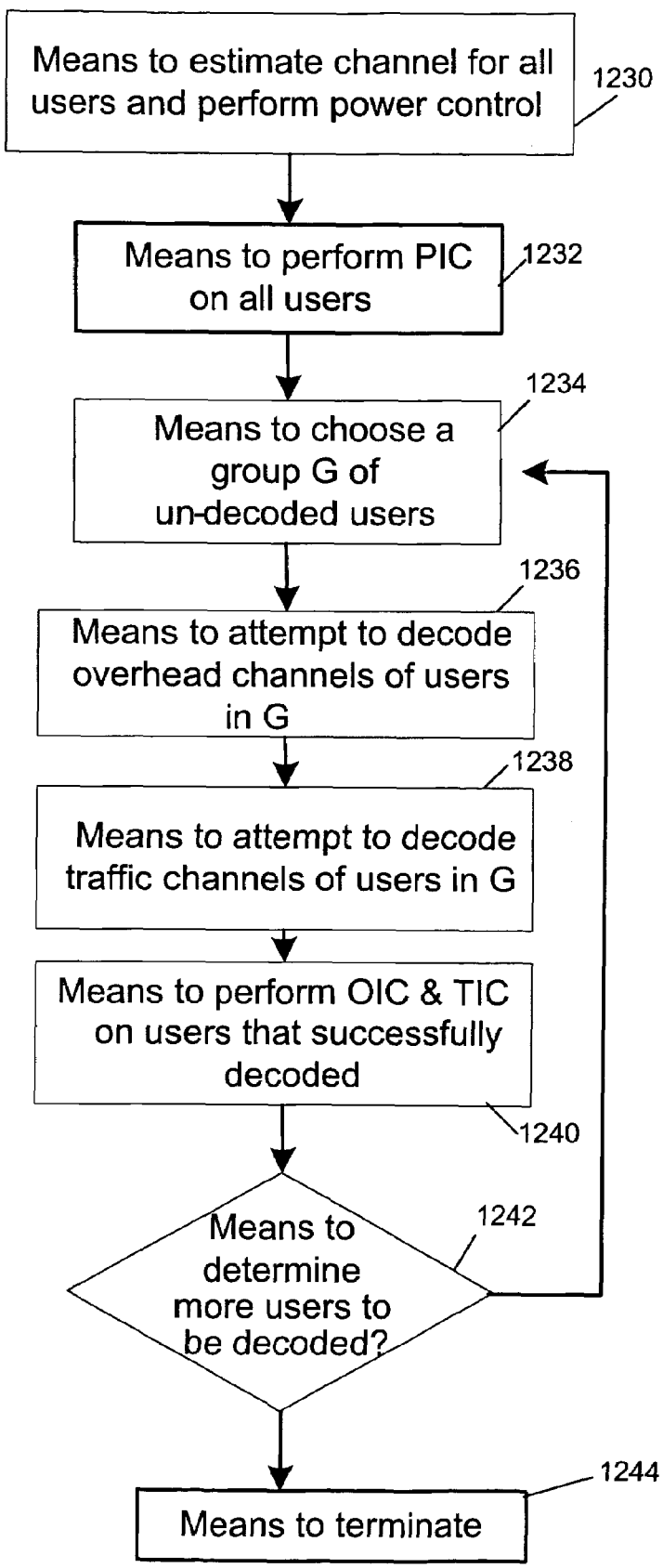
FIG. 12B illustrates an apparatus to perform the method of FIG. 12A.

FIG. 12B illustrates an apparatus comprising means 1230-1244 to perform the method of FIG. 12A. The means 1230-1244 in FIG. 12B may be implemented in hardware, software or a combination of hardware and software.

Figure 13A:
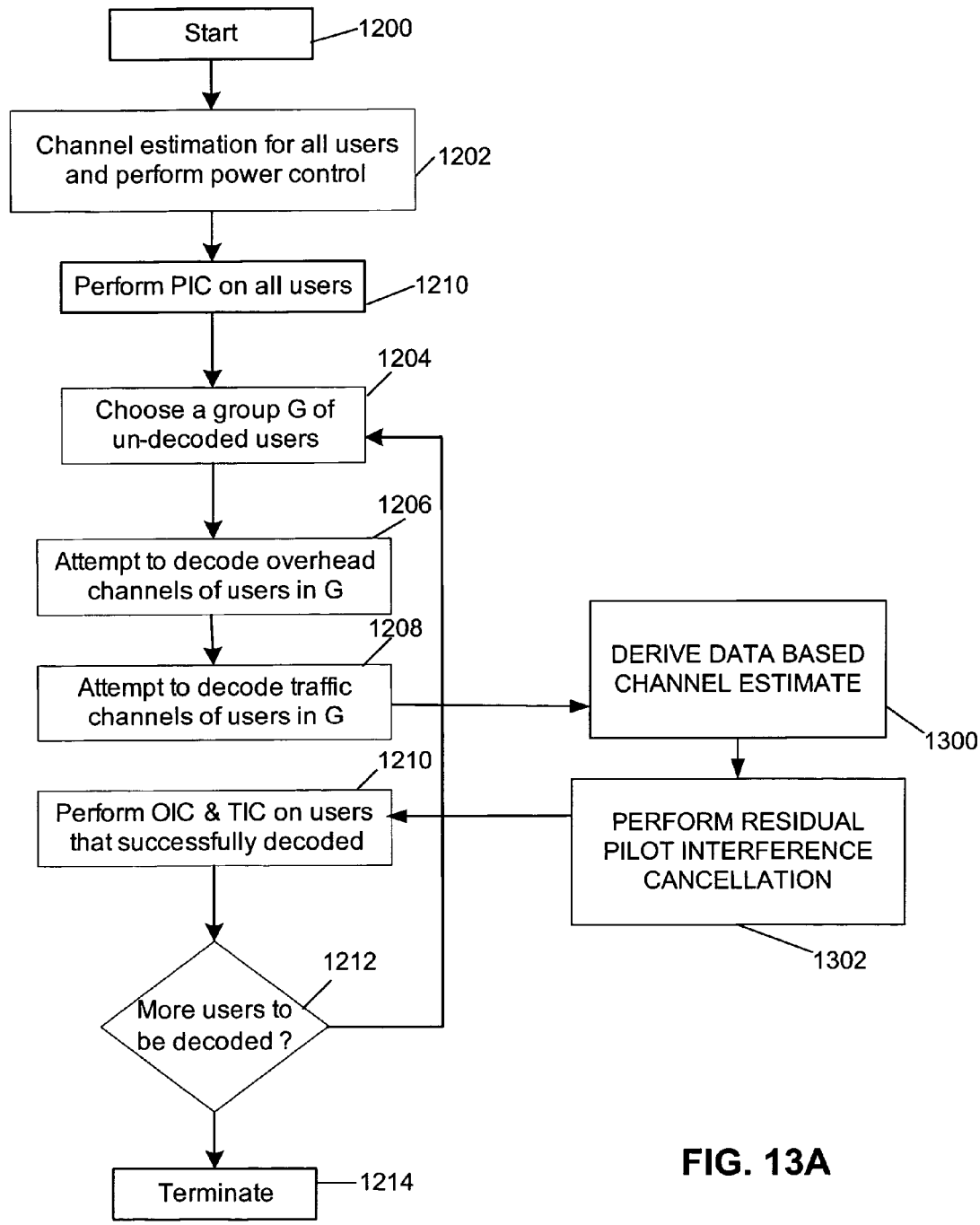
FIG. 13A illustrates a variation of the method in FIG. 12A.

FIG. 13A illustrates a variation of the method in FIG. 12A. Blocks 1204-1210 remove a signal based on an initial channel estimate in block 1202. Block 1300 derives a data-based channel estimate or a refined channel estimate. Data-based channel estimate may provide a better channel estimate, as described below. Block 1302 performs residual PIC, i.e., removes a revised estimate of the signal based on a refinement of the channel estimate in block 1300.

For example, consider that blocks 1204-1210 resulted in removing an initial signal estimate (e.g., pilot signal) P1[n] from the received samples. Then, based on a better channel estimate derived in block 1300, the method forms the revised signal estimate P2[n]. The method may then remove the incremental P2[n]−P1[n] difference from the sample locations in the RAM 312.

Figure 13B:
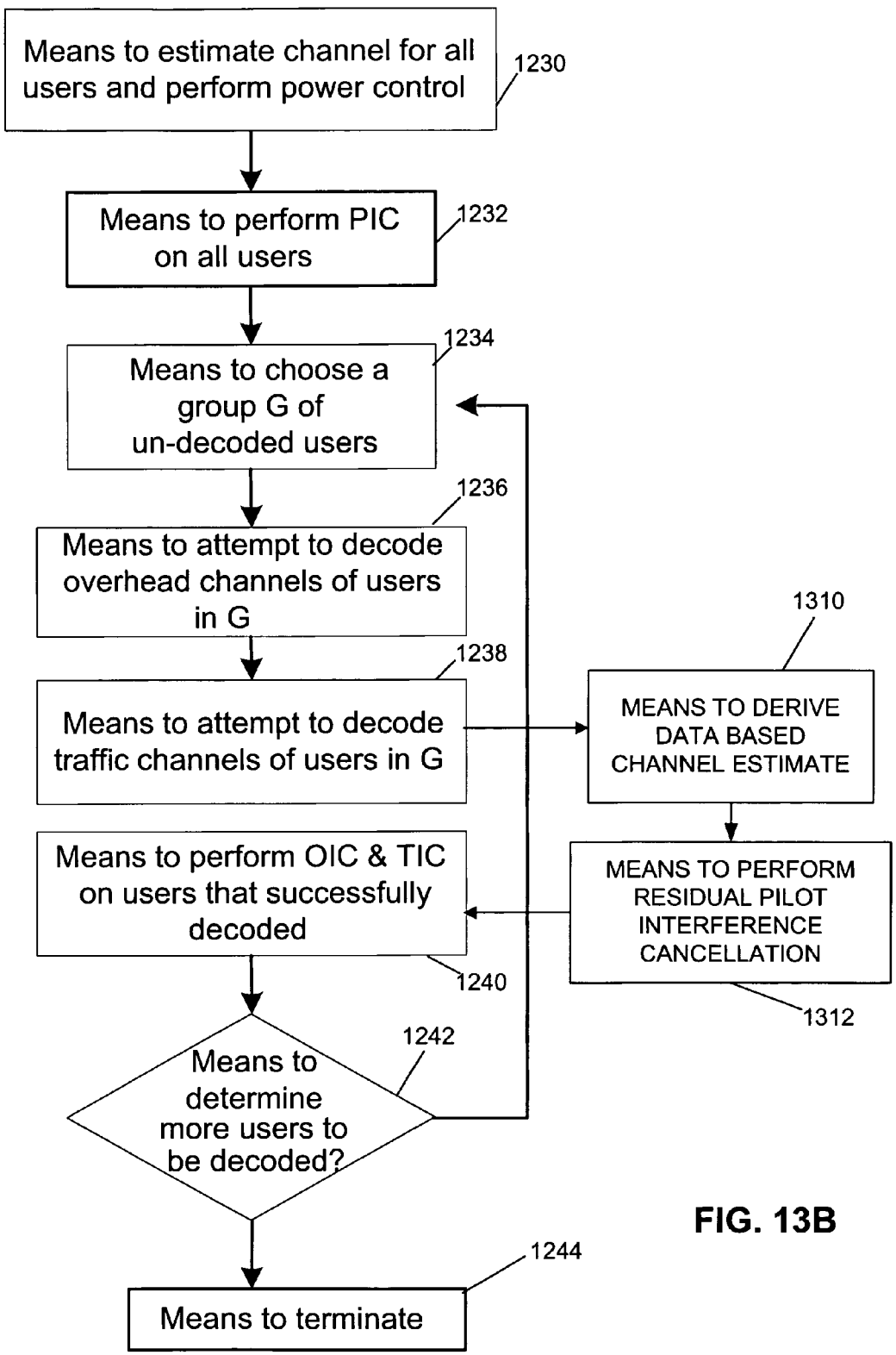
FIG. 13B illustrates an apparatus to perform the method of FIG. 13A.

FIG. 13B illustrates an apparatus comprising means 1230-1244, 1310, 1312 to perform the method of FIG. 13A. The means 1230-1244, 1310, 1312 in FIG. 13B may be implemented in hardware, software or a combination of hardware and software.

PIC First, Then OIC, and Then TIC (Second Scheme)

This second scheme is similar to FIG. 12A described above with the exception that overhead channels of the same group of users are demodulated and decoded before any traffic channels are demodulated and decoded. This scheme is suitable for a non-interlaced system since no strict ACK deadline is imposed. For an interlaced system, e.g., DO Rev. A, since ACK/NAK signals respond to the traffic channel subpackets, the tolerable decoding delay for traffic channel subpackets in general are limited to within a couple slots (1 slot=1.67 ms). Therefore, if certain overhead channels spread over more than this time scale, this scheme may become unfeasible. In particular, on DO RevA, auxiliary pilot channel and ACK channel are in a short-duration format and may be subtracted before TIC.

Joint Pilot/Overhead/Traffic Channel Cancellation (The Third Scheme)

Figure 14A:
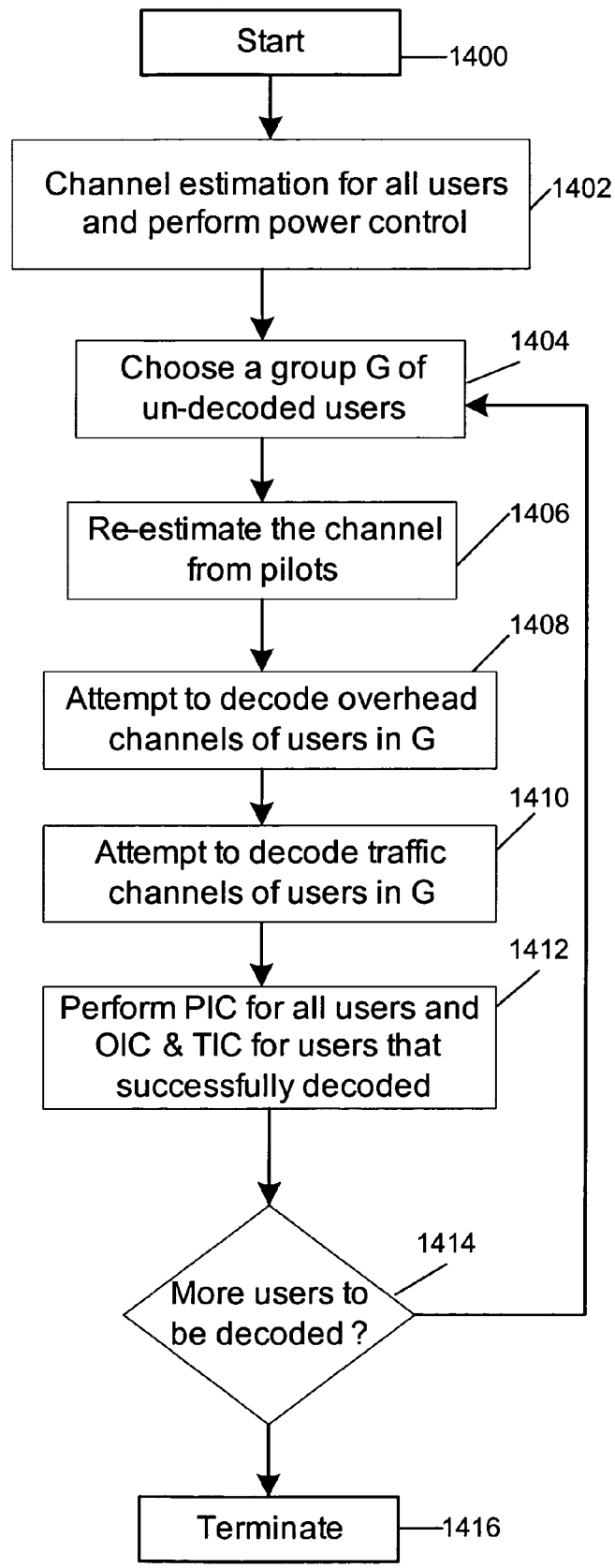
FIG. 14A illustrates a method to perform joint PIC, OIC and TIC.

FIG. 14A illustrates a method to perform joint PIC, OIC and TIC. After a start block 1400, the receiver derives channel estimation for all users and performs power control in block 1402. Block 1404 chooses a group G of undecoded users. Block 1406 re-estimates the channel from pilots. Blocks 1408-1410 attempt to perform overhead/traffic channel demodulation and decoding. Block 1412 performs PIC for all users and OIC and TIC for only users with successfully decoded channel data.

Different from the first scheme (FIG. 12A) discussed above, after the channel estimation for all users (block 1402), the pilots are not subtracted from FERAM 312 right away and the channel estimation is used for power control as the non-IC scheme. Then, for a group of users who terminated at the same packet/subpacket boundary, the method performs sequential decoding (blocks 1408 and 1410) in a given order.

For an attempted decoding user, the method first re-estimates the channel from the pilot (block 1402). The pilot sees less interference compared to the time (block 1402) when it was demodulated for power control due to interference cancellation of previously decoded packets which overlap with the to-be-decoded traffic packet. Therefore, the channel estimation quality is improved, which benefits both traffic channel decoding and cancellation performance. This new channel estimation is used for traffic channel decoding (block 1410) as well as certain overhead channel decoding (block 1408) (e.g., RRI channel in EV-DO). Once the decoding process is finished for one user at block 1412, the method will subtract this user's interference contribution from the FERAM 312, which includes its pilot channel and any decoded overhead/traffic channel.

Block 1414 checks whether there are more users to decode. Block 1416 terminates the process.

Figure 14B:
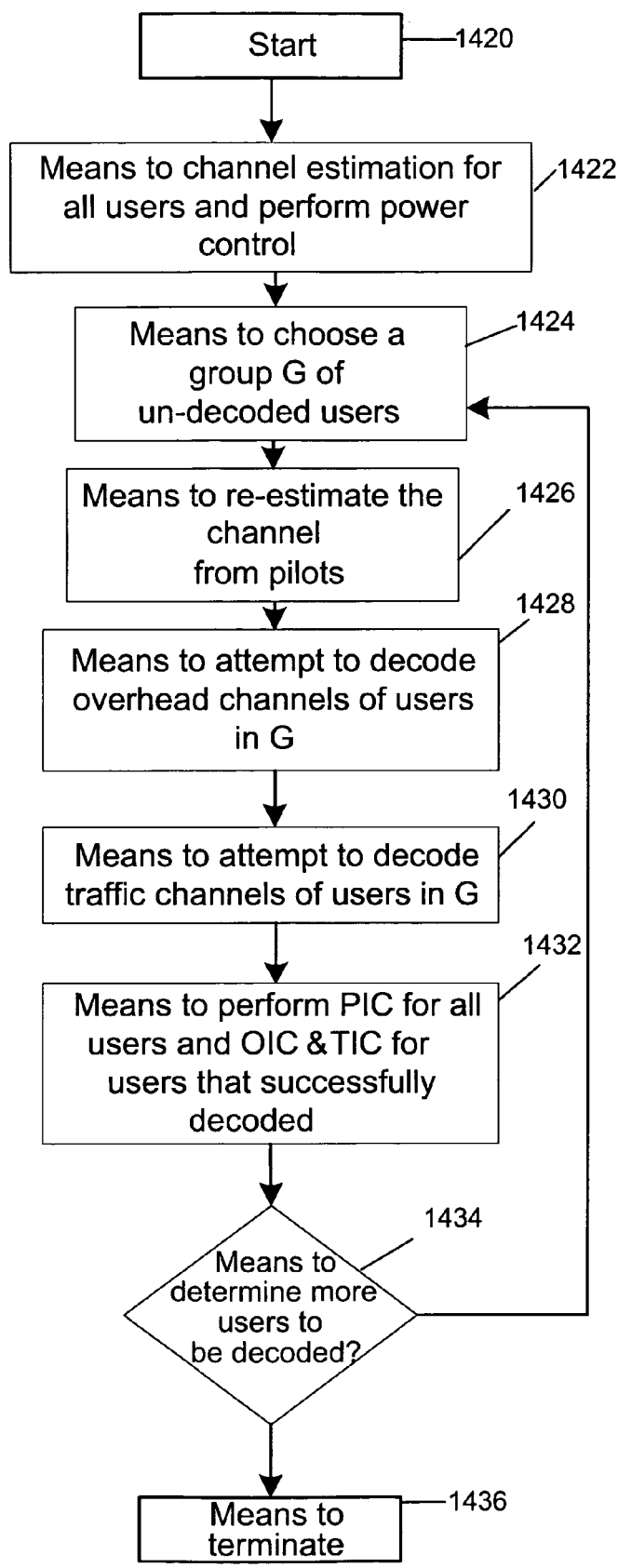
FIG. 14B illustrates an apparatus to perform the method of FIG. 14A.

FIG. 14B illustrates an apparatus comprising means 1420-1436 to perform the method of FIG. 14A. The means 1420-1436 in FIG. 14B may be implemented in hardware, software or a combination of hardware and software.

Figure 15A:
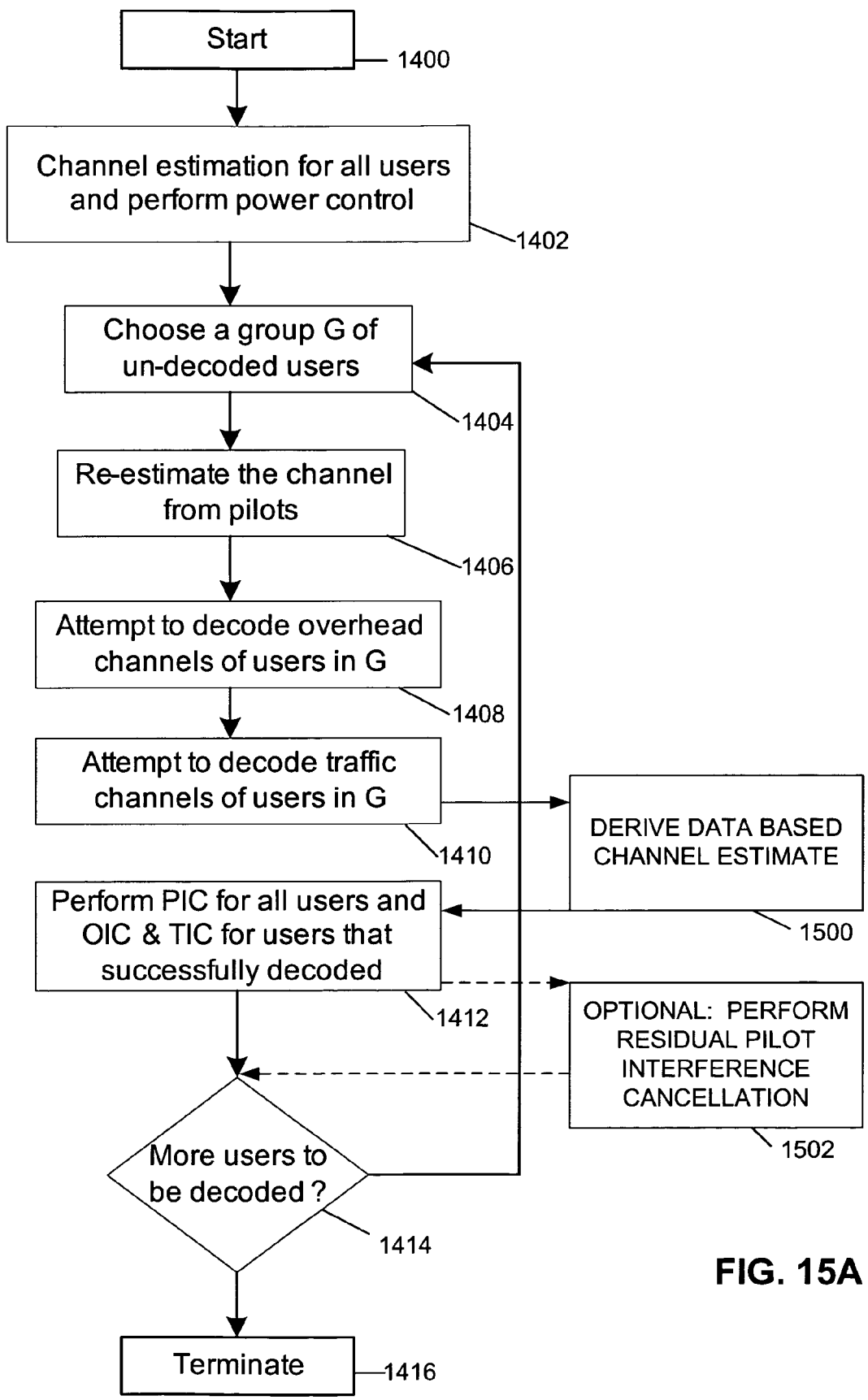
FIG. 15A illustrates a variation of the method in FIG. 14A.

FIG. 15A illustrates a variation of the method in FIG. 14A. Block 1500 derives data-based channel estimates. Block 1502 performs an optional residual PIC as in FIG. 13A.

Figure 15B:
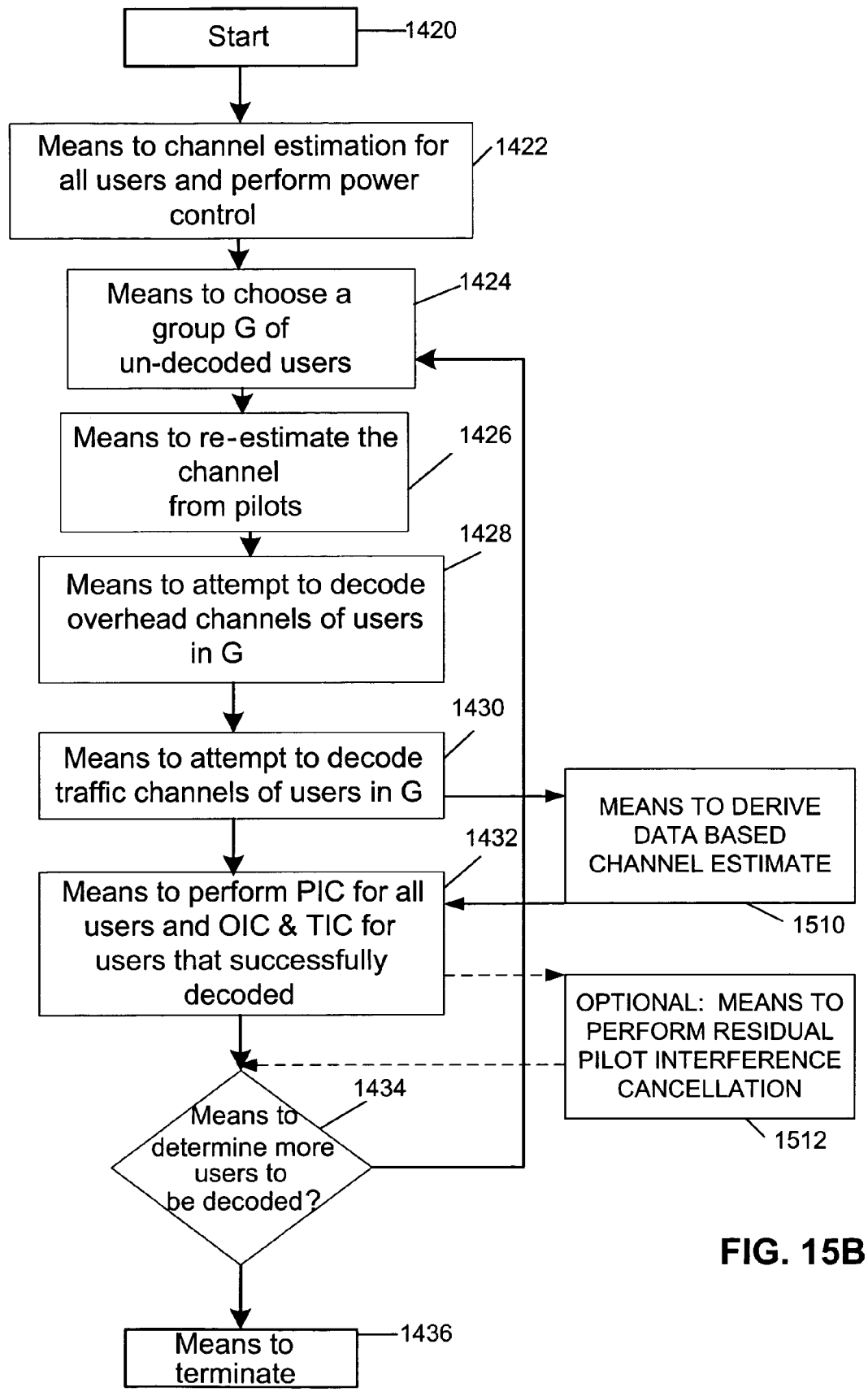
FIG. 15B illustrates an apparatus to perform the method of FIG. 15A.

FIG. 15B illustrates an apparatus comprising means 1420-1436, 1510, 1512 to perform the method of FIG. 15A. The means 1420-1436, 1510, 1512 in FIG. 15B may be implemented in hardware, software or a combination of hardware and software.

Tradeoffs Between the First and Third Schemes

It may appear that first scheme should have superior performance compared to the third scheme since the pilot signals are known at the BTS and it makes sense to cancel them in front. If both schemes are assumed to have the same cancellation quality, the first scheme may outperform the third scheme throughout all data rates. However, for the first scheme, since the pilot channel estimation sees higher interference than the traffic data demodulation, the estimated channel coefficients used for reconstruction purpose (for both pilot and overhead/traffic) may be noisier. However, for the third scheme, since the pilot channel estimation is redone right before the traffic data demodulation/decoding, the interference level seen by this refined channel estimation is the same as the traffic data demodulation. Then, on average, the cancellation quality of the third scheme may be better than the first scheme.

From a hardware design perspective, the third scheme may have a slight edge: the method may sum the pilot and decoded overhead and traffic channel data and cancel them together, therefore, this approach saves memory bandwidth. On the other hand, the re-estimation of pilot may be performed together with either overhead channel demodulation or traffic channel demodulation (in terms of reading samples from memory), and thus, there is no increase on memory bandwidth requirements.

If it is assumed that the first scheme has 80% or 90% cancellation quality of the third scheme, there are tradeoffs between data rate per user verse gain on number of users. In general, it favors the first scheme if all users are in low data rates region and the opposite if all high data rate users. The method may also re-estimate the channel from the traffic channel once one packet of data is decoded. The cancellation quality shall improve since the traffic channel operates at (much) higher SNR compared to the pilot channel.

Overhead channels may be removed (canceled) once they are demodulated successfully, and traffic channels may be removed once they have been demodulated and decoded successfully. It is possible that the base station could successfully demodulate/decode the overhead and traffic channels of all the access terminals at some point in time. If this (PIC, OIC, TIC) occurs, then the FERAM would only contain residual interference and noise. Pilot, overhead and traffic channel data may be canceled in various orders, and canceled for subsets of access terminals.

One approach is to perform interference cancellation (of any combination of PIC, TIC and OIC) for one user at a time from the RAM 312. Another approach is to (a) accumulate reconstructed signals (of any combination of PIC, TIC and OIC) for a group of users and (b) then perform interference cancellation for the group at the same time. These two approaches may be applied to any of the methods, schemes, and processes disclosed herein.

Improving Channel Estimation for Interference Cancellation

The ability to accurately reconstruct received samples may significantly affect system performance of a CDMA receiver that implements interference cancellation by reconstructing and removing various components of transmitted data. In a RAKE receiver, a multipath channel is estimated by PN despreading with respect to the pilot sequence and then pilot filtering (i.e., accumulating) over an appropriate period of time. The length of the pilot filtering is typically chosen as a compromise between increasing the estimation SNR by accumulating more samples, while not accumulating so long that the estimation SNR is degraded by the time variations of the channel. The channel estimate from the pilot filter output is then used to perform data demodulation.

As described above with FIG. 4, one practical method of implementing interference cancellation in a CDMA receiver is to reconstruct the contribution of various transmitted chipx1 streams to the (e.g. chipx2 ) FERAM samples. This involves determining the transmitted chip streams and an estimate of the overall channel between the transmitter chips and the receiver samples. Since the channel estimates from the RAKE fingers represent the multipath channel itself, the overall channel estimate should also account for the presence of transmitter and receiver filtering.

This section discloses several techniques for improving this overall channel estimation for interference cancellation in a CDMA receiver. These techniques may be applicable to CDMA2000, 1×EV-DO, 1×EV-DV, WCDMA.

To perform TIC of a packet that decodes correctly, the receiver in FIG. 4 may take the information bits from the decoder output and reconstruct the transmitted chip stream by re-encoding, re-interleaving, re-modulating, re-applying the data channel gain, and re-spreading. To estimate the received samples for TIC with the pilot channel estimate, the transmit chip stream would be convolved with a model of the transmitter and receiver filters and the RAKE receiver's channel estimate from despreading with the pilot PN sequence.

Instead of using the pilot channel estimate, an improved channel estimate (at each RAKE finger delay) may be obtained by despreading with the reconstructed data chips themselves. This improved channel estimate is not useful for data demodulation of the packet since the packet has already decoded correctly, but is rather used solely for reconstructing the contribution of this packet to the front-end samples. With this technique, for each of the delays of the RAKE fingers (e.g., chipX8 resolution), the method may "despread" the received samples (e.g., interpolated to chipx8 ) with the reconstructed data chip stream and accumulate over an appropriate period of time. This will lead to improved channel estimation since the traffic channel is transmitted at higher power than the pilot channel (this traffic-to-pilot T2P ratio is a function of data rate). Using the data chips to estimate the channel for TIC may result in a more accurate channel estimate for the higher powered users who are the most important to cancel with high accuracy.

Instead of estimating the multipath channel at each of the RAKE finger delays, this section also describes a channel estimation procedure that would explicitly estimate a combined effect of the transmitter filter, multipath channel, and receiver filter. This estimate may be at the same resolution as the oversampled front-end samples (e.g. chipx2 FERAM). The channel estimate may be achieved by despreading the front-end samples with the reconstructed transmit data chips to achieve the T2P gain in channel estimation accuracy. The time span of the uniformly spaced channel estimates may be chosen based on information about the RAKE finger delays and an a priori estimate of a combined response of the transmitter and receiver filters. Furthermore, information from the RAKE fingers may be used to refine the uniformly spaced channel estimates.

Figure 16:
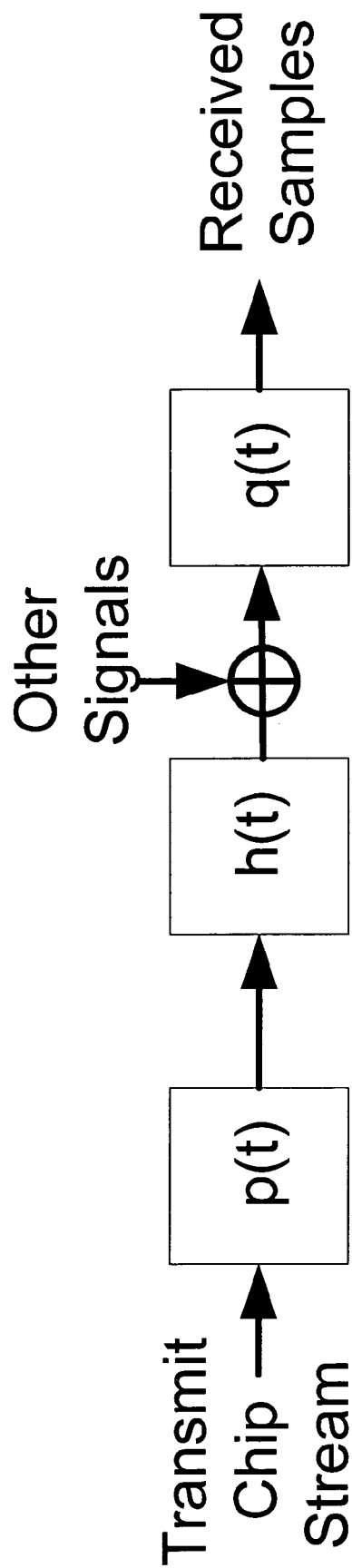
FIG. 16 illustrates a model of transmission system.
Figure 17:
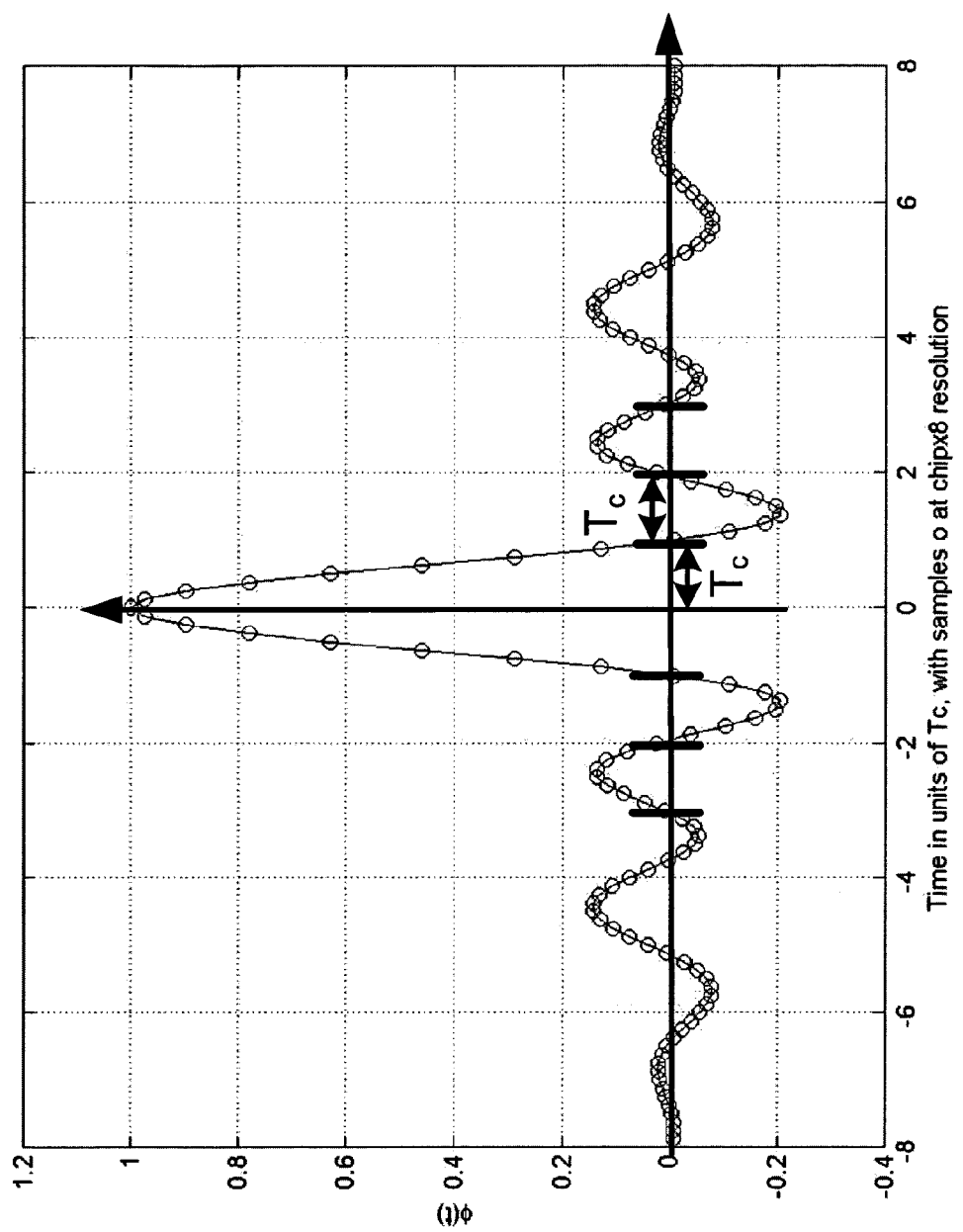
FIG. 17 illustrates an example response of combined transmit and receive filtering.

FIG. 16 illustrates a model of transmission system with a transmit filter p(t), overall/composite channel h(t) (vs. multipath channel g(t) described below), and receiver filter q(t). The digital baseband representation of wireless communications channel may be modeled by L discrete multipath components $$g(t) = \sum_{l=1}^{L} a_l \delta(t - \tau_l)$$ Equation 3 where the complex path amplitudes are $\alpha_l$ with corresponding delays $\tau_l$. The combined effect of the transmitter and receiver filters may be defines as $\phi(t)$, where $$\phi(t) = p(t) \otimes q(t)$$ Equation 4 where $\otimes$ denotes convolution. The combined $\phi(t)$ is often chosen to be similar to a raised cosine response. For example, in CDMA2000 and its derivatives, the response is similar to an example $\phi(t)$ displayed in FIG. 17. The overall channel estimate is given by $$\hat{h}(t) = g(t) \otimes \phi(t) = \sum_{l=1}^{L} a_l \phi(t - \tau_l)$$ Equation 5

Figures 18A, 18B:
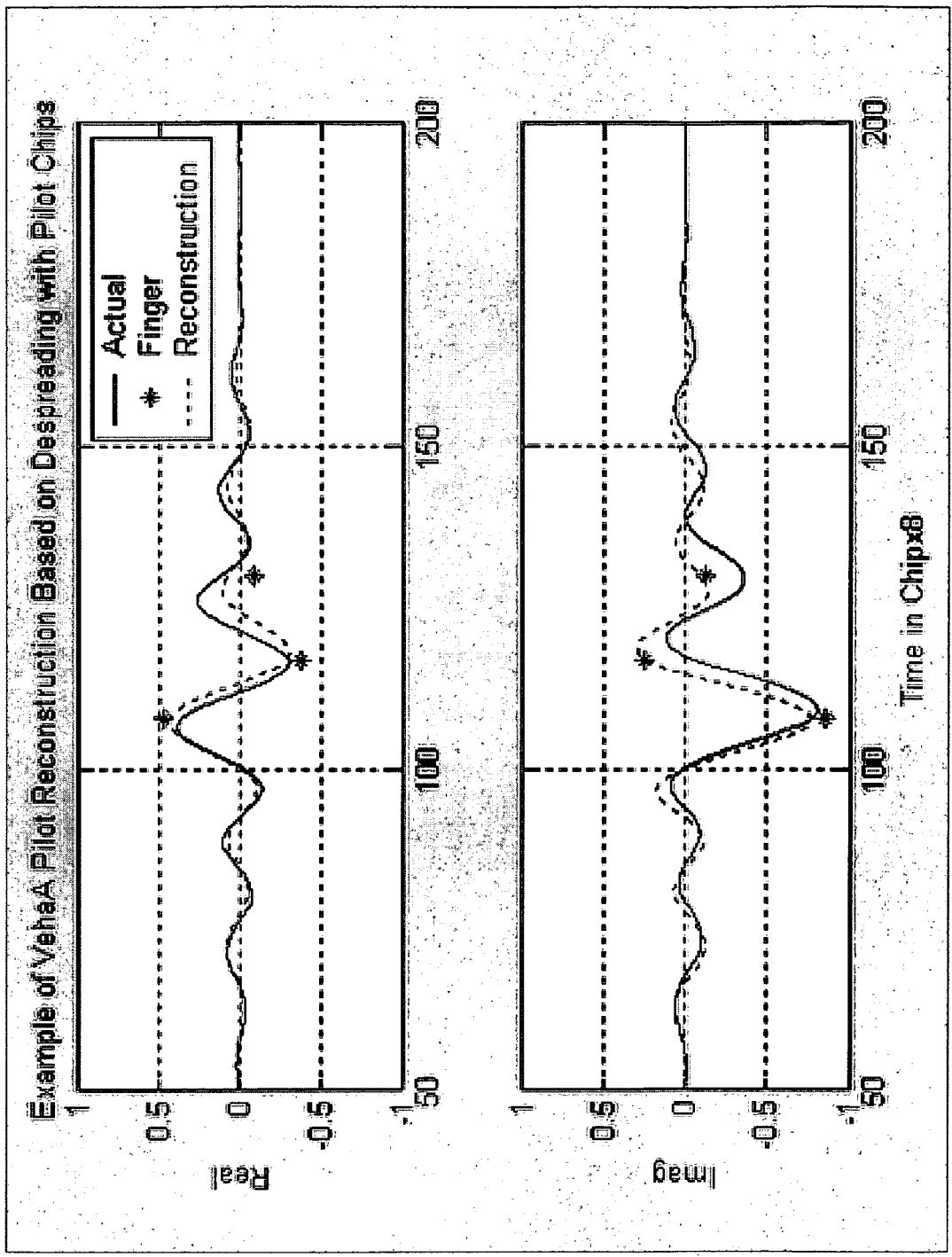
FIGS. 18A and 18B show an example of channel estimation (real and imaginary components) based on the estimated multipath channel at each of three RAKE fingers.

FIGS. 18A and 18B show an example of channel estimation (real and imaginary components) based on the estimated multipath channel at each of three RAKE fingers. In this example, the actual channel is shown as a solid line, and the $\alpha_l$ are given by the stars. The reconstruction (dotted line) is based on using the $\alpha_l$ in Equation 3 above. The RAKE finger channel estimates in FIGS. 18A and 18B are based on despreading with pilot chips (where the overall pilot SNR is −24 dB).

Despreading at RAKE Finger Delays with Regenerated Data Chips Instead of Pilot Chips The quality of channel estimation has a direct impact on the fidelity of reconstructing a user's contribution to the received signal. In order to improve the performance of CDMA systems that implement interference cancellation, it is possible to use a user's reconstructed data chips to determine an improved channel estimate. This will improve the accuracy of the interference subtraction. One technique for CDMA systems may be described as "despreading with respect to a user's transmitted data chips" as opposed to the classical "despreading with respect to a user's transmitted pilot chips."

Figures 19A, 19B:
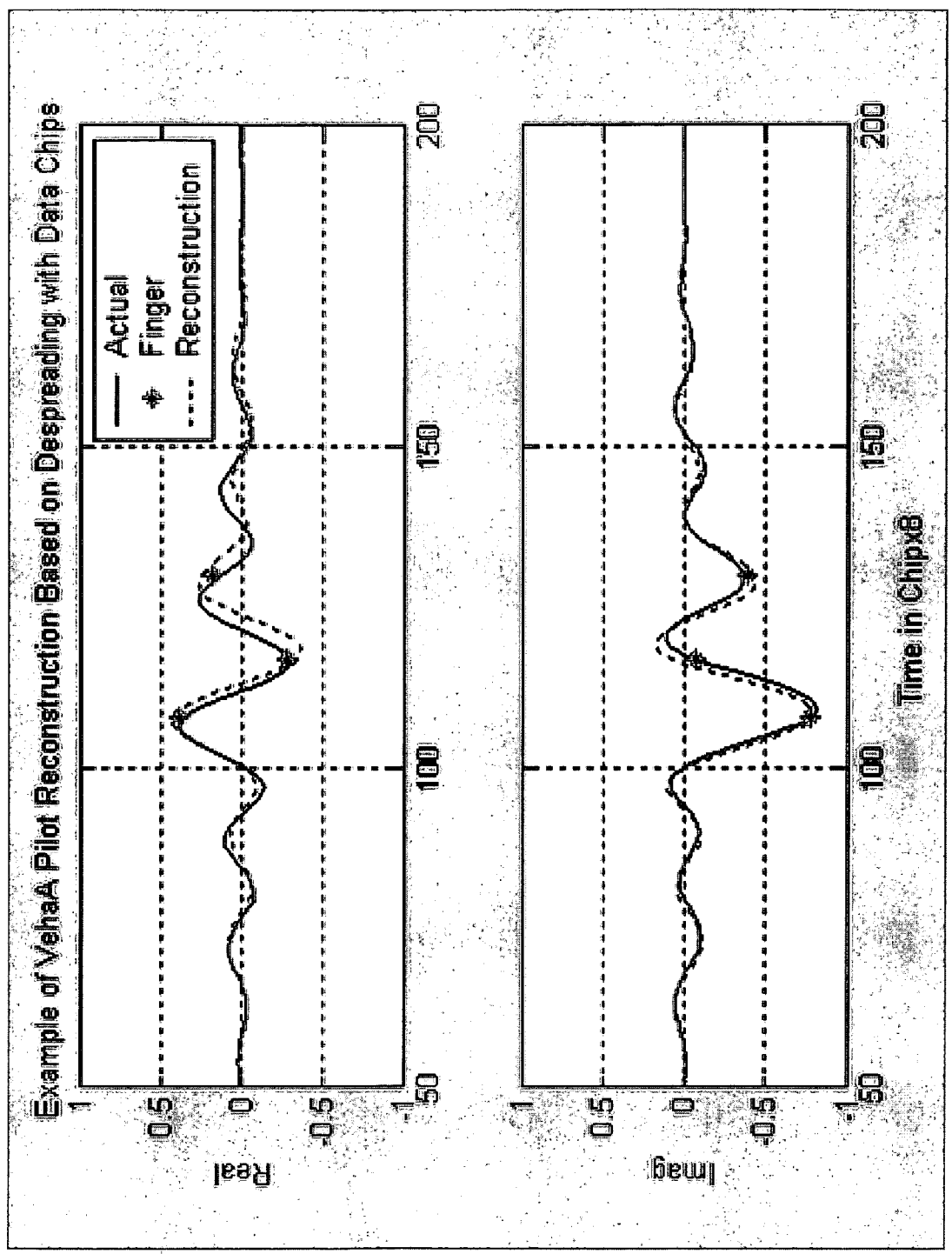
FIGS. 19A-19B show examples of an improved channel estimate based on RAKE fingers and despreading with the data chips.

Recall that the RAKE finger channel estimates in FIGS. 18A-18B are based on despreading with the pilot chips (where the overall pilot SNR is −24 dB). FIGS. 19A-19B show examples of an improved channel estimate based on RAKE fingers and despreading with the data chips, where the data chips are transmitted with 10 dB more power than the pilot chips.

Figure 20A:
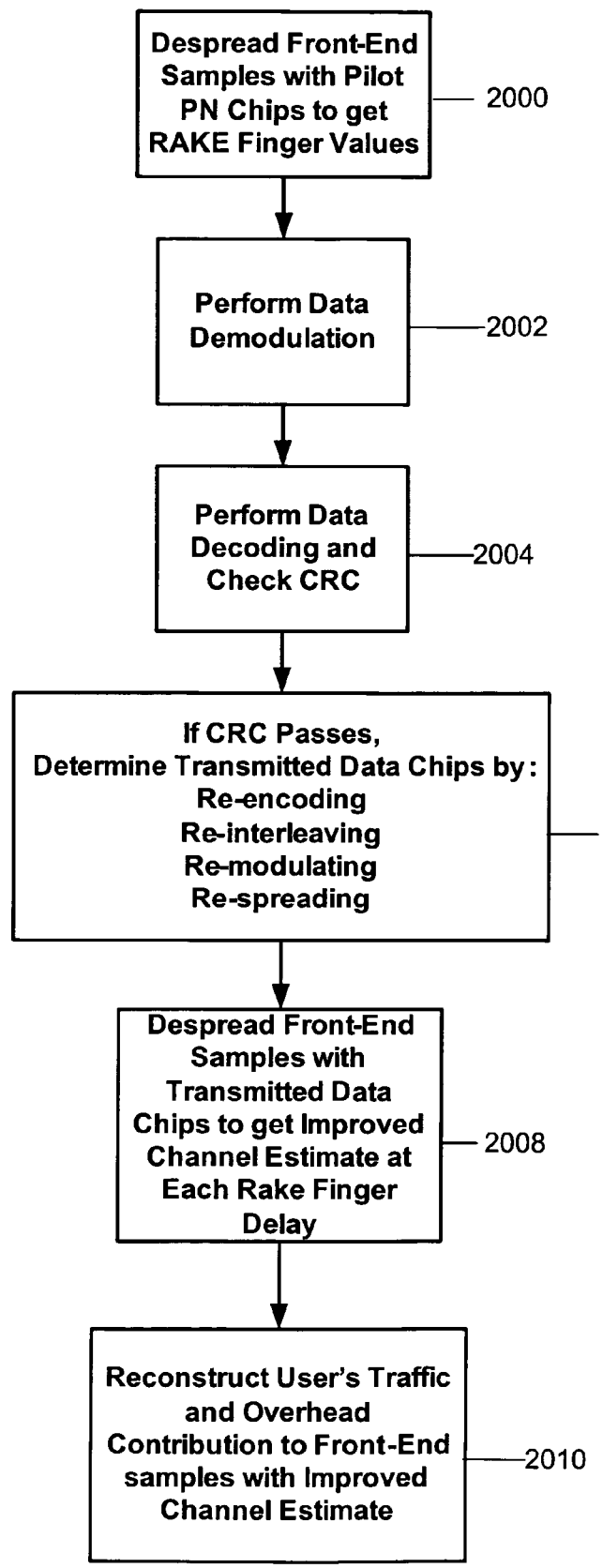
FIG. 20A illustrates a method for despreading at RAKE finger delays with regenerated data chips.

FIG. 20A illustrates a method for despreading at RAKE finger delays with regenerated data chips. In block 2000, rake receiver 314 (FIG. 4) despreads front-end samples with pilot PN chips to get RAKE finger values. In block 2002, demodulator 304 performs data demodulation. In block 2004, decoder 308 performs data decoding and checks CRC. In block 2006, if CRC passes, unit 400 determines transmitted data chips by re-encoding, re-interleaving, re-modulating and re-spreading. In block 2008, unit 400 despreads front-end samples with transmitted data chips to get improved channel estimate at each finger delay. In block 2010, unit 400 reconstructs user's traffic and overhead contribution to front-end samples with improved channel estimate.

Figure 20B:
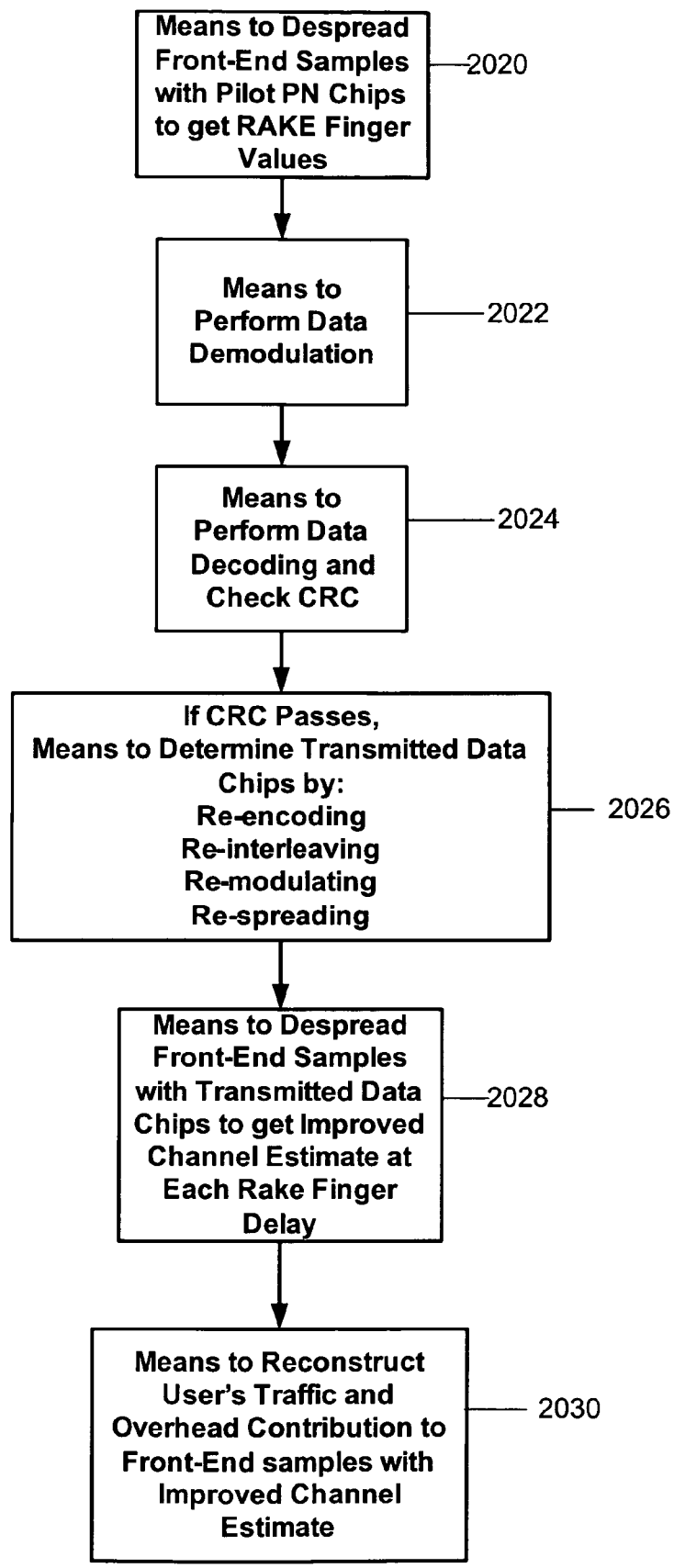
FIG. 20B illustrates an apparatus to perform the method of FIG. 20A.

FIG. 20B illustrates an apparatus comprising means 2020-2030 to perform the method of FIG. 20A. The means 2020-2030 in FIG. 20B may be implemented in hardware, software or a combination of hardware and software.

Estimating the Composite Channel at FERAM Resolution with Regenerated Data Chips Classical CDMA receivers may estimate the complex value of the multipath channel at each of the RAKE finger delays. The receiver front-end prior to the RAKE receiver may include a low pass receiver filter (i.e., q(t)) which is matched to the transmitter filter (i.e., p(t)). Therefore, for the receiver to implement a filter matched to the channel output, the RAKE receiver itself attempts to match to the multipath channel only (i.e., g(t)). The delays of the RAKE fingers are typically driven from independent time-tracking loops within minimum separation requirements (e.g., fingers are at least one chip apart). However, the physical multipath channel itself may often have energy at a continuum of delays. Therefore, one method estimates the composite channel (i.e., h(t)) at the resolution of the front-end samples (e.g., chipx2 FERAM).

With transmit power control on the CDMA reverse link, the combined finger SNR from all multipaths and receiver antennas is typically controlled to lie in a particular range. This range of SNR may result in a composite channel estimate derived from the despread pilot chips that has a relatively large estimation variance. That is why the RAKE receiver attempts to only place fingers at the "peaks" of the energy delay profile. But with the T2P advantage of despreading with reconstructed data chips, the composite channel estimation may result in a better estimate of h(t) than the direct estimate of g(t) combined with a model of φ (t).

A channel estimation procedure described herein explicitly estimates the combined effect of the transmitter filter, multipath channel, and receiver filter. This estimate may be at the same resolution as the oversampled front-end samples (e.g., chipx2 FERAM). The channel estimate may be achieved by despreading the front-end samples with the reconstructed transmit data chips to achieve the T2P gain in channel estimation accuracy. The time span of the uniformly spaced channel estimates may be chosen based on information about the RAKE finger delays and an a priori estimate of the combined response of the transmitter and receiver filters. Furthermore, information from the RAKE fingers may be used to refine the uniformly spaced channel estimates. Note that the technique of estimating the composite channel itself is also useful because it does not require the design to use an a priori estimate of φ (t).

Figures 21A, 21B:
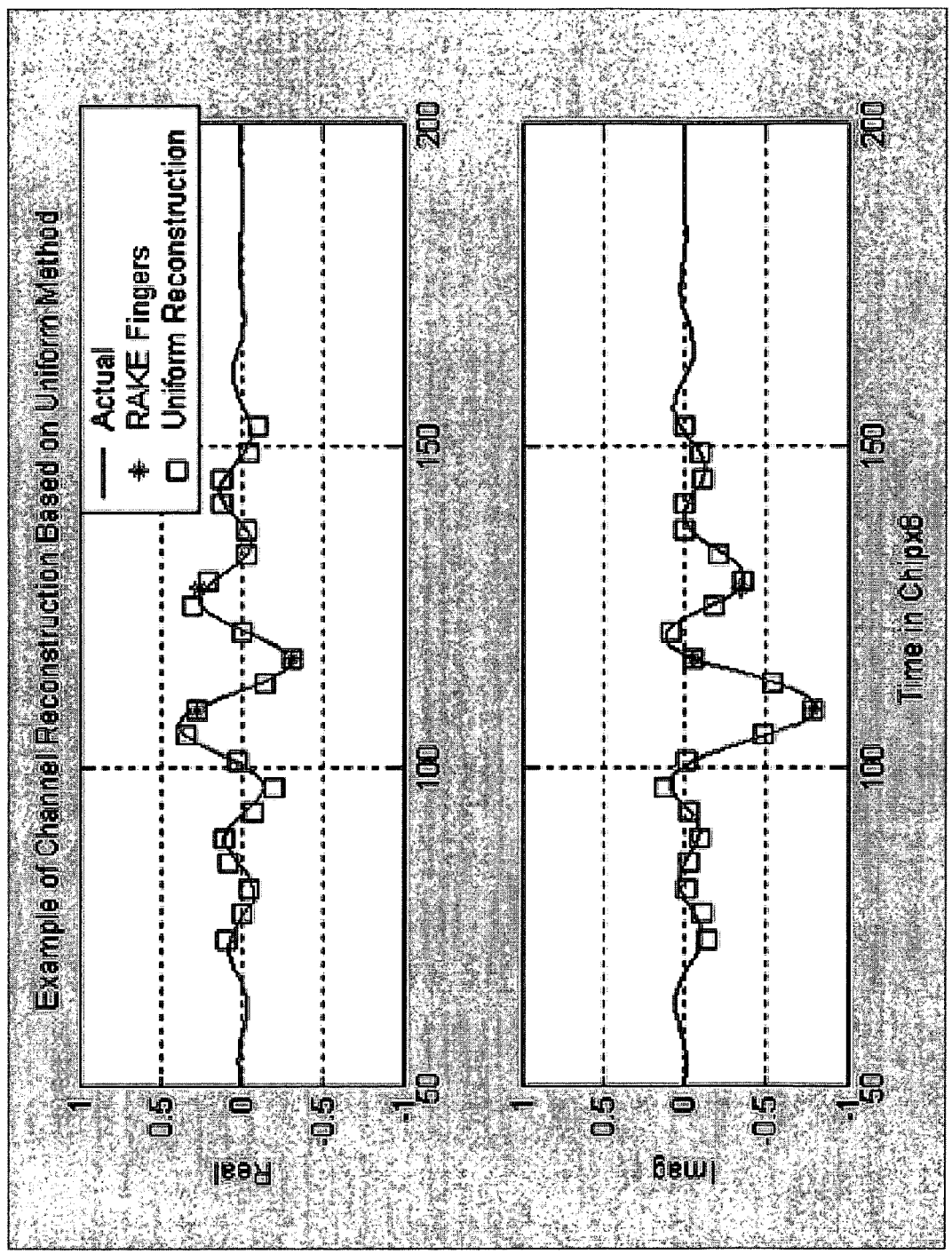
FIGS. 21A and 21B show an example of estimating the composite channel using uniformly spaced samples at chipX2 resolution.

FIGS. 21A, 21B show an example of estimating the composite channel using uniformly spaced samples at chipX2 resolution. In FIGS. 21A, 21B, the data chips SNR is −4 dB, corresponding to a pilot SNR of −24 dB and a T2P of 20 dB. The uniform channel estimate gives a better quality compared with despreading with the data chips only at the RAKE finger locations. At high SNR, the effects of "fatpath" limit the ability to accurately reconstruct the channel using RAKE finger locations. The uniform sampling approach is particularly useful when the estimation SNR is high, corresponding to the case of despreading with data chips for a high T2P. When the T2P is high for a particular user, the channel reconstruction fidelity is important.

Figure 22A:
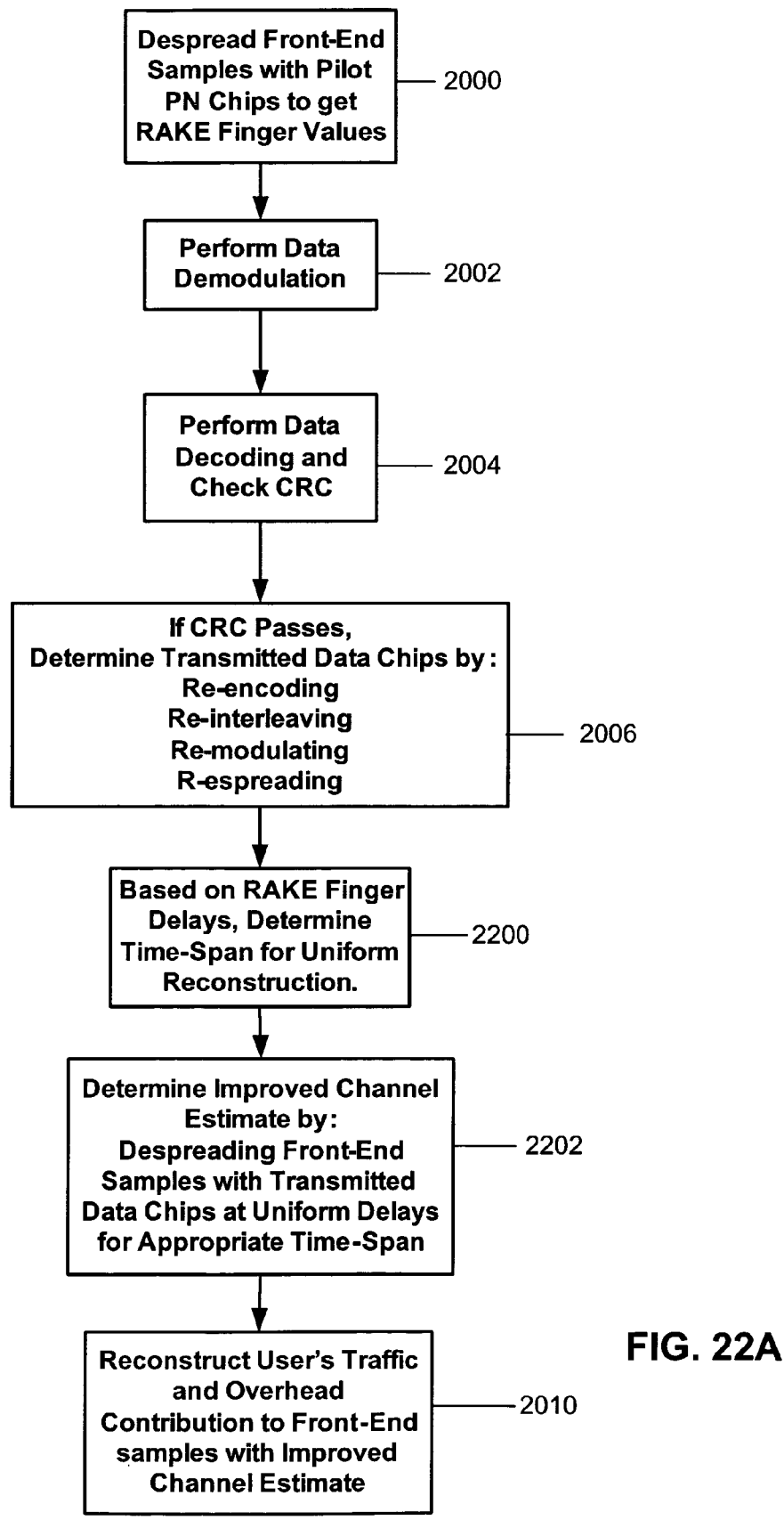
FIG. 22A illustrates a method for estimating composite channel at uniform resolution using regenerated data chips.

FIG. 22A illustrates a method for estimating composite channel at uniform resolution using regenerated data chips. Blocks 2000-2006 and 2010 are similar to FIG. 20A described above. In block 2200, RAKE receiver 314 (FIG. 4) or another component determines time-span for uniform construction based on RAKE finger delays. In block 2202, demodulator 304 or another component determines an improved channel estimate by despreading front-end samples with transmitted data chips at uniform delays for an appropriate time-span.

Figure 22B:
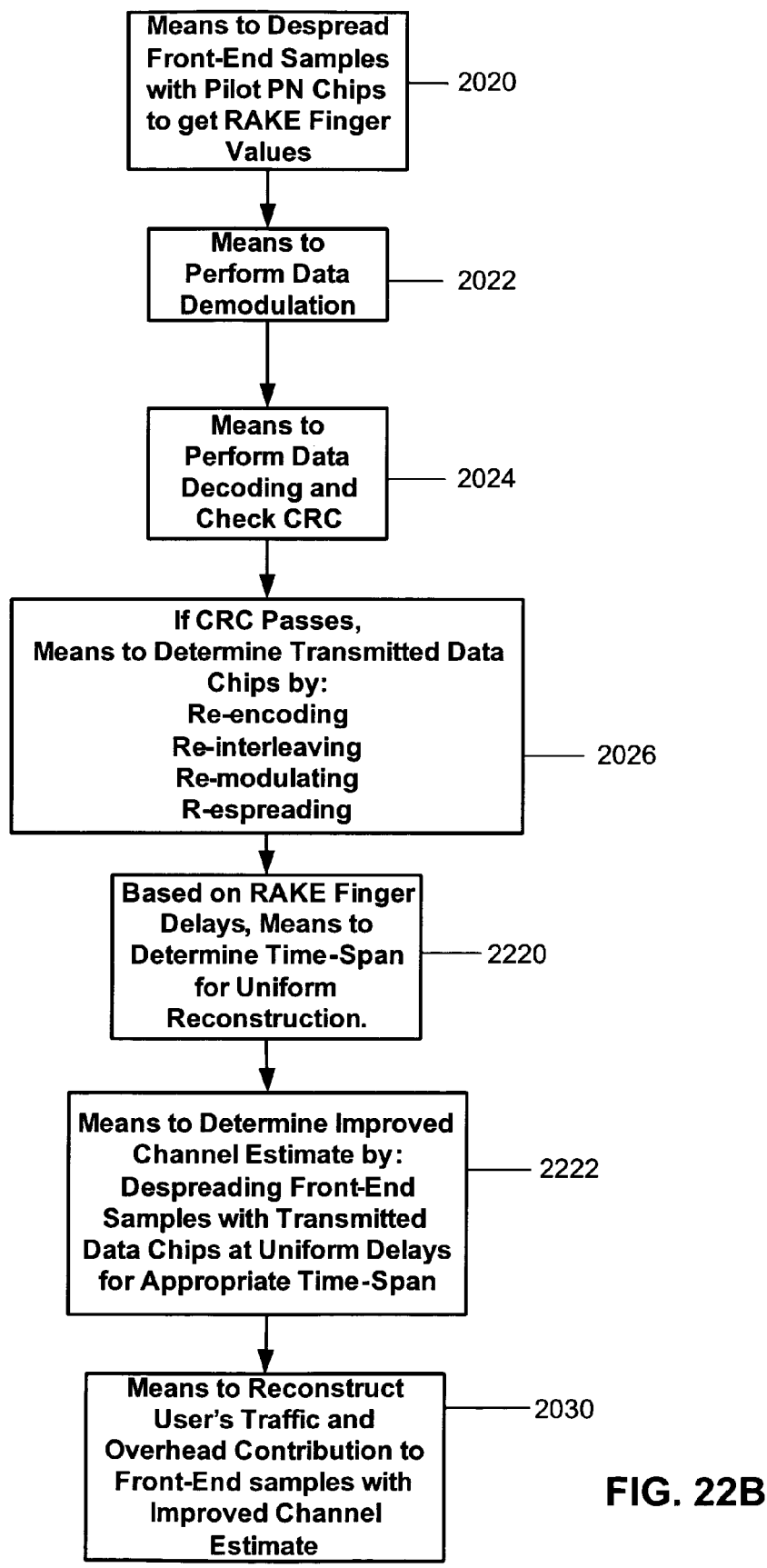
FIG. 22B illustrates an apparatus to perform the method of FIG. 22A.

FIG. 22B illustrates an apparatus comprising means 2020-2030, 2220, 2222 to perform the method of FIG. 22A. The means 2020-2030 in FIG. 22B may be implemented in hardware, software or a combination of hardware and software.

In the description above, g(t) is the wireless multipath channel itself, while h(t) includes the wireless multipath channel as well as the transmitter and receiver filtering: h(t) =g(t) convolved with phi(t).

In the description above, "samples" may be at any arbitrary rate (e.g., twice per chip), but "data chips" are one per chip.

"Regenerated data chips" are formed by re-encoding, re-interleaving, re-modulating, and re-spreading, as shown in block 2006 of FIG. 20A and described above. In principle, "regenerating" is mimicking the process that the information bits went through at the mobile transmitter (access terminal).

"Reconstructed samples" represent the samples stored in FERAM 312 or in a separate memory from FERAM 312 in the receiver (e.g., twice per chip). These reconstructed samples are formed by convolving the (regenerated) transmitted data chips with a channel estimate.

The words "reconstructed" and "regenerated" may be used interchangeably if context is provided to either reforming the transmitted data chips or reforming the received samples. Samples or chips may be reformed, since "chips" are reformed by re-encoding, etc., whereas "samples" are reformed based on using the reformed chips and incorporating the effects of the wireless channel (channel estimate) and the transmitter and receiver filtering. Both words "reconstruct" and "regenerate" essentially mean to rebuild or reform. There is no technical distinction. One embodiment uses "regenerate" for data chips and "reconstruct" for samples exclusively. Then, a receiver may have a data chip regeneration unit and a sample reconstruction unit.

Adaptation of Transmit Subchannel Gains on the Reverse Link of CDMA Systems with Interference Cancellation Multi-user interference is a limiting factor in a CDMA transmission system and any receiver technique that mitigates this interference may allow significant improvements in the achievable throughput. This section describes techniques for adapting the transmit subchannels gains of a system with IC.

In the reverse link transmission, each user transmits pilot, overhead and traffic signals. Pilots provide synchronization and estimation of the transmission channel. Overhead subchannels (such as RRI, DRC, DSC, and ACK) are needed for MAC and traffic decoding set-up. Pilot, overhead and traffic subchannels have different requirements on the signal to interference plus noise ratio (SINR). In a CDMA system, a single power control may adapt the transmit power of pilots, while the power of overhead and traffic subchannels has a fixed gain relative to the pilots. When the BTS is equipped with PIC, OIC and TIC, the various subchannels see different levels of interference depending on the order of ICs and the cancellation capabilities. In this case, a static relation between subchannel gains may hurt the system performance.

This section describes new gain control strategies for the different logical subchannels on a system that implements IC. The techniques are based on CDMA systems such as EV-DO RevA and may be applied to EV-DV Rel D, W-CDMA EUL, and cdma2000.

The described techniques implement power and gain control on different subchannels by adaptively changing the gain of each subchannel according to the measured performance in terms of packet error rate, SINR or interference power. The aim is to provide a reliable power and gain control mechanism that allows fully exploiting the potentials of IC while providing robustness for a transmission on a time-varying dispersive subchannel.

Interference cancellation refers to removing a contribution of logical subchannels to the front-end samples after those subchannels have been decoded, in order to reduce the interference on other signals that will be decoded later. In PIC, the transmitted pilot signal is known at the BTS and the received pilot is reconstructed using the channel estimate. In TIC or OIC, the interference is removed by reconstructing the received subchannel through its decoded version at the BTS.

Current BTS (with no IC) control the power of the pilot subchannel $E_{cp}$ in order to meet the error rate requirements in the traffic channel. The power of the traffic subchannel is related to pilots by a fixed factor T2P, which depends on the payload type and target termination goals. The adaptation of the pilot power is performed by closed loop power control mechanism including an inner and outer loop. The inner loop aims at keeping the SINR of the pilots (Ecp/Nt) at a threshold level T, while the outer-loop power control changes the threshold level T, for example, based on packet error rate (PER).

When IC is performed at the receiver (FIG. 4), the adaptation of the subchannel gains may be beneficial to the system. In fact, since each subchannel sees a different level of interference, their gain with respect to pilots should be adapted accordingly in order to provide the desired performance. This section may solve the problem of gain control for overhead and pilot subchannels, and techniques are described for the adaptation of T2P which increase the throughput of the system by fully exploiting the IC.

Important Parameters in a System with IC

Two parameters that may be adjusted are overhead subchannel gains and traffic to pilot (T2P) gain. When TIC is active, the overhead subchannel gains may be increased (relative to non-TIC), in order to allow a more flexible trade-off between the pilot and overhead performance. By denoting with G the baseline G used in the current system, the new value of the overhead channel gain will be:

$$G' = G \cdot \Delta_G.$$

In no-IC schemes the overhead/pilot subchannels see the same interference level as the traffic channels and a certain ratio T2P/G may give satisfactory performance for both overhead and traffic channels performance as well as pilot channel estimations. When IC is used, the interference level is different for the overhead/pilots and traffic, and T2P may be reduced in order to allow coherent performance of the two types of subchannels. For a given payload, the method may let the T2P decrease by a factor $\Delta_{T2P}$ with respect to the tabulated value, in order to satisfy the requirements. By denoting with T2P the baseline T2P used for a particular payload in the current system, the new value of T2P will be:

$$T2P' = T2P \cdot \Delta_{T2P}$$

The parameter $\Delta_{T2P}$ can be quantized into a set of finite or discrete values (e.g., −0.1 dB to −1.0 dB) and sent to the access terminal 106.

Some quantities that may be kept under control are traffic PER, pilot SINR, and rise over thermal. The pilot SINR should not drop under the minimum level desired for good channel estimation. Rise over thermal (ROT) is important to ensure the stability and the link-budget of the power controlled CDMA reverse link. In non-TIC receivers, ROT is defined on the received signal. In general, ROT should stay within a predetermined range to allow for a good capacity/coverage tradeoff.

Rise Over Thermal Control $I_0$ indicates the power of the signal at the input of the receiver. The cancellation of interference from the received signal yields a reduction of power. $I_0'$ indicates the average power of the signal at input of the demodulator 304 after IC:

$$I_0' \leq I_0.$$

The value of $I_0'$ may be measured from the front-end samples after it has been updated with the IC. When IC is performed, the ROT is still important for the overhead subchannel, and ROT should be controlled with respect to a threshold, i.e. to ensure that $$ROT = \frac{I_0}{N_0} < ROT_{thr},$$

where $N_0$ is the noise power.

However, traffic and some overhead subchannels benefit also from the IC. The decoding performance of these subchannels is related to the rise over thermal, measured after IC. Effective ROT is the ratio between the signal power after IC and the noise power. The effective ROT may be controlled by a threshold, i.e., $$ROT_{eff} = \frac{I_0'}{N_0} < ROT_{thr}^{(eff)}.$$

The constraint on the $ROT_{eff}$ may be equivalently stated as a constraint on $I_0'$, under the assumption that the noise level does not change:

$$I_0' \leq I_0^{(thr)},$$

where $I_0^{(thr)}$ is the signal power threshold corresponding to $ROT_{thr}^{(eff)}$.

Fixed Overhead Gain Techniques

When the ROT increases, the SINR of the pilot and overhead channels (which do not benefit from IC) decreases, leading to a potential increase in the erasure rate. In order to compensate for this effect, the overhead channel gains may be raised, either by a fixed value or by adaptation to the particular system condition.

Techniques are described where the gain of the overhead subchannel is fixed with respect to the pilots. The proposed techniques adapt both the level of pilot subchannel and the $\Delta_{T2P}$ for each user.

Closed Loop Control of T2P with Fixed $\Delta_G=0$ dB

Figure 23:
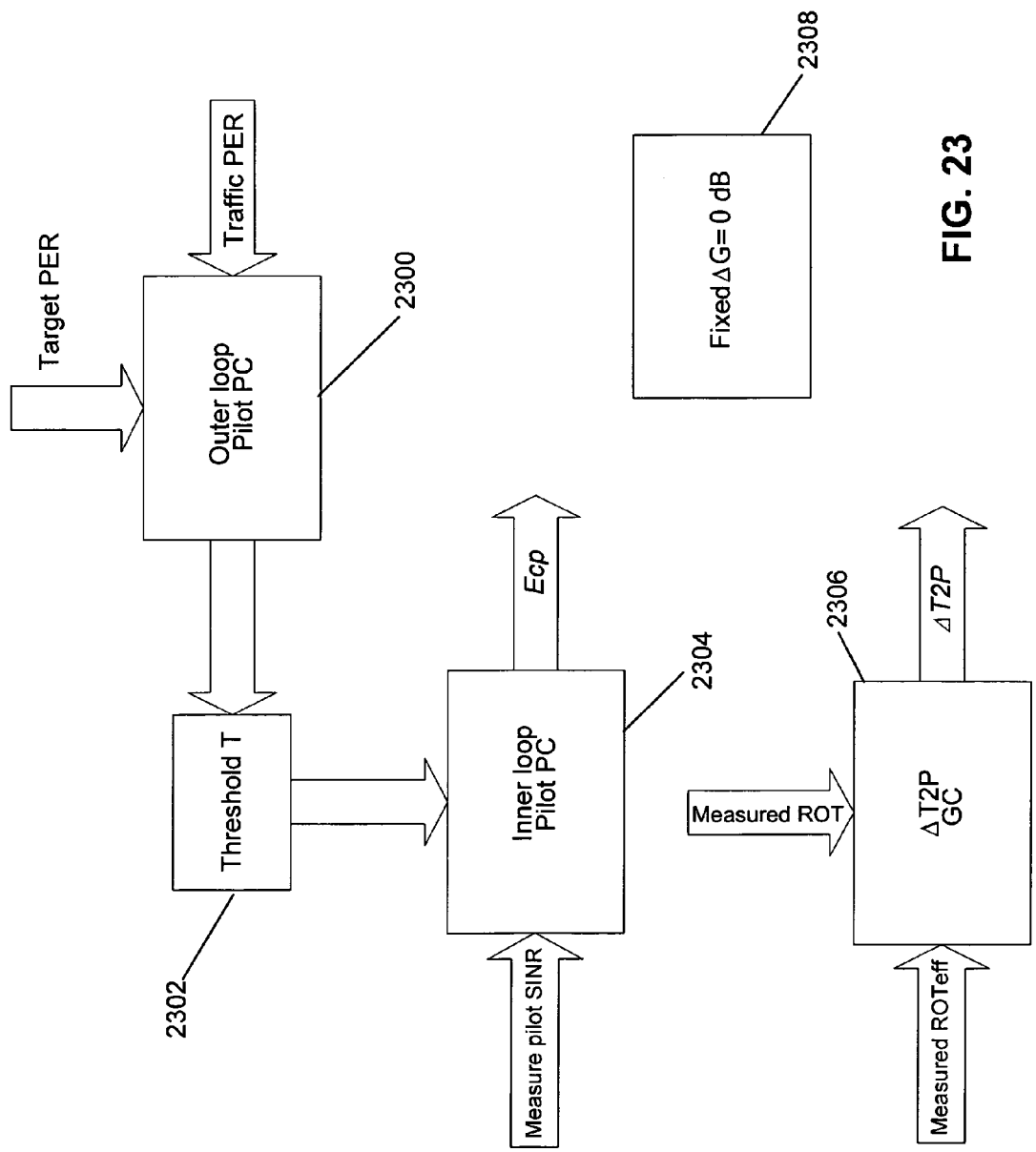
FIG. 23 illustrates a closed loop power control and gain control with fixed overhead subchannel gain.

FIG. 23 illustrates a closed loop power control (PC) for $E_{cp}$ and $\Delta_{T2P}$ and fixed $\Delta_G=0$ dB (block 2308). This first solution for the adaptation of $\Delta_{T2P}$ and $E_{cp}$ comprises:

A. Inner and outer loops 2300, 2302 may perform power control in a conventional manner for the adaptation of $E_{cp}$. Outer loop 2300 receives target PER and traffic PER. Inner loop 2304 receives a threshold T 2302 and a measured pilot SINR and outputs $E_{cp}$.

B. A closed loop gain control (GC) 2306 adapts $\Delta_{T2P}$ based on the measure of the removed interference. The gain control 2306 receives measured ROT and measured ROTeff and outputs $\Delta_{T2P}$. The receiver measures the interference removed by the IC scheme and adapts $\Delta_{T2P}$.

C. $\Delta_{T2P}$ can be sent in a message to all access terminals 106 in a sector periodically.

For the adaptation of $\Delta_{T2P}$, if the interference after IC is reduced from $I_0$ to $I_0'$, the T2P can be consequently reduced of the quantity:

$$\Delta_{T2P} = \frac{I_0'}{I_0} \approx \frac{ROT_{\mathit{eff}}}{ROT}.$$

The $E_{cp}$ will increase (through the PC loop 2304) as:

$$E_{cp}' = \frac{I_0}{I_0^{(thr)}} E_{cp}.$$

The ratio between the total transmit power for the system with and without IC will be:

$$C = \frac{E_{cp}(1 + G + T2P)}{E_{cp}'(1 + G + T2P')},$$

where G is the overhead channel gain. For large values of T2P (with respect to G), the ratio C can be approximated as:

$$C \approx \frac{I_0^{(thr)}}{I_0'}.$$

For the estimation of the effective ROT, the effective ROT changes rapidly due to both PC and changes in channel conditions. Instead, $\Delta_{T2P}$ reflects slow variations of the $ROT_{\mathit{eff}}$. Hence, for the choice of $\Delta_{T2P}$ the effective ROT is measured by means of a long averaging window of the signal after IC. The averaging window may have a length at least twice as long as a power control update period.

Closed Loop Control of T2P with Fixed $\Delta_G>0$ dB

Figure 24:
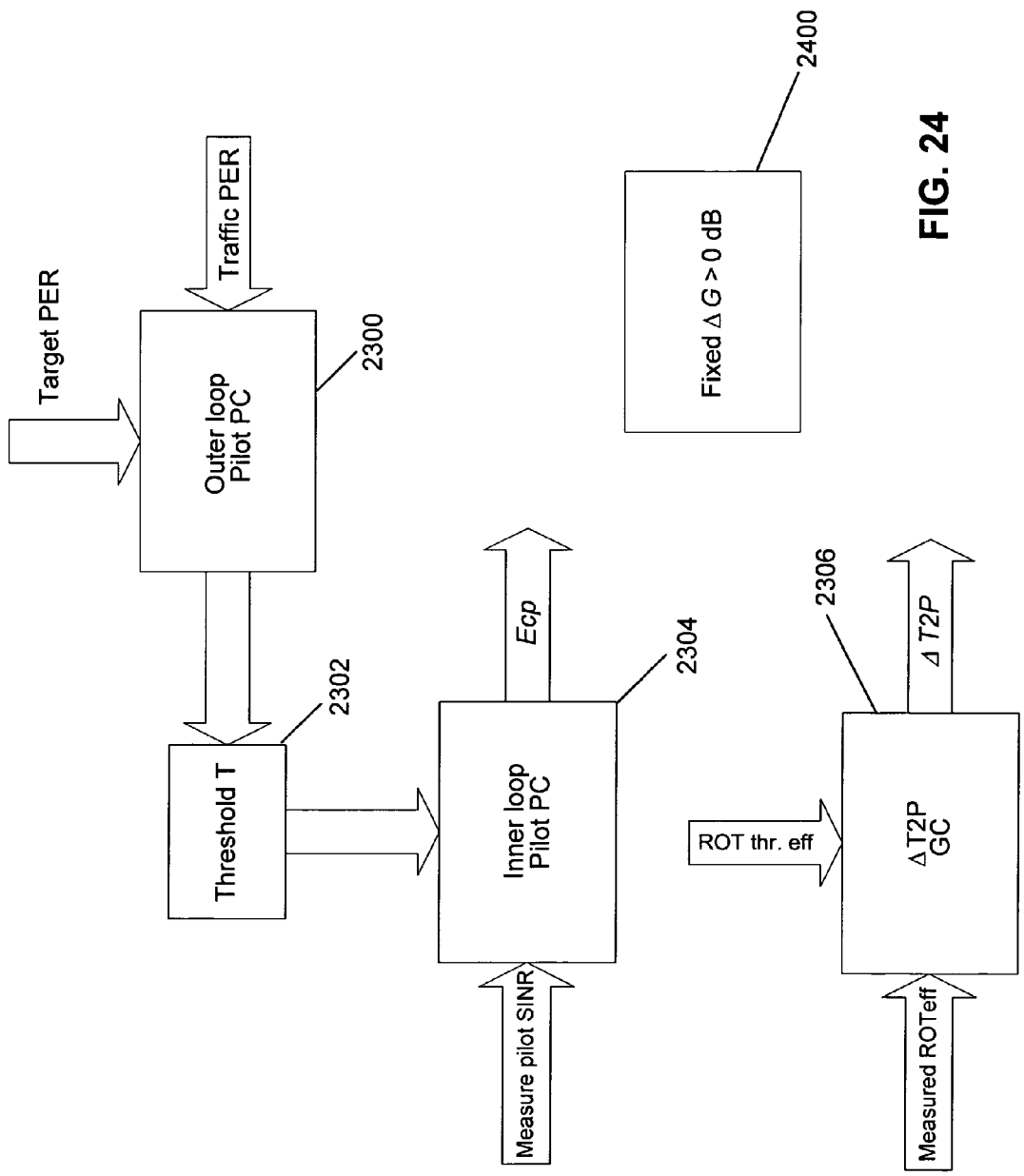
FIG. 24 is a variation of FIG. 23 power control and gain control with fixed overhead subchannel gain.

FIG. 24 is the same as FIG. 23 except the gain control 2306 receives a threshold effective ROT, and $\Delta_G>0$ dB (block 2400). This alternative method for the adaptation of $\Delta_{T2P}$ is based on the request of having the same cell coverage for both IC and no-IC systems. The $E_{cp}$ distribution is the same in both cases. The effect of IC is twofold on a fully loaded system: i) the signal power before IC, $I_0$, will increase with respect to the signal power of the system with no IC; ii) due to closed-loop power control by PER control, $I_0'$ will tend to be similar to the signal power of the system with no IC. $\Delta_{T2P}$ is adapted as follows:

$$\Delta_{T2P} = \frac{I_0^{(thr)}}{I_0'} \approx \frac{ROT_{thr}^{(\mathit{eff})}}{ROT_{\mathit{eff}}}.$$

ACK-Based Control of $\Delta_{T2P}$

Figure 25:
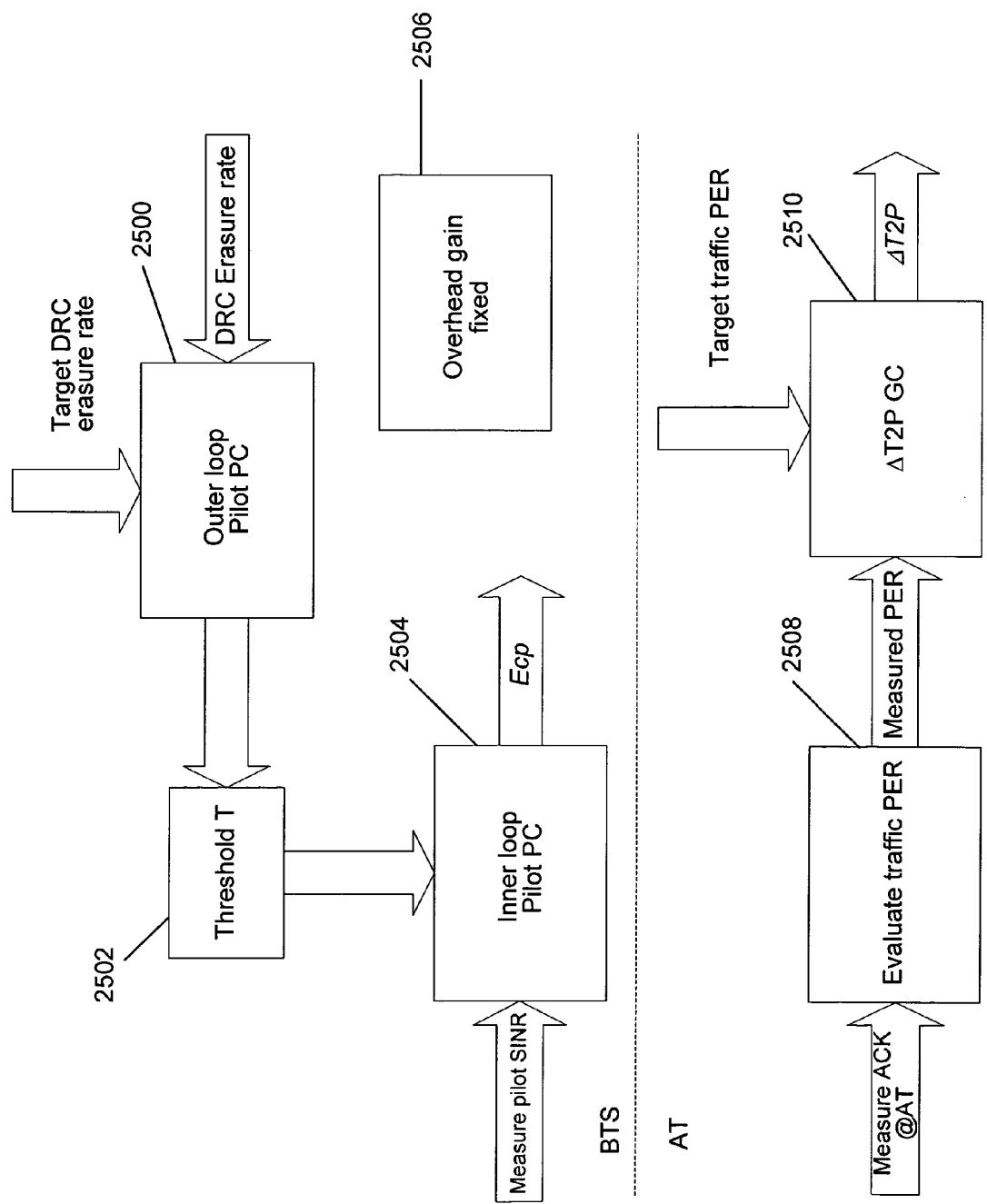
FIG. 25 illustrates an example of power control with fixed overhead subchannel gain.

FIG. 25 illustrates PC for $E_{cp}$ and $\Delta_{T2P}$ based on the ACK subchannel with fixed overhead subchannel gain (block 2506).

The closed loop GC of $\Delta_{T2P}$ requires a feedback signal from the BTS to the AT, where all ATs receive the same broadcast value of $\Delta_{T2P}$ from a BTS. An alternative solution is based on an open-loop GC of $\Delta_{T2P}$ 2510 and a closed loop PC 2500, 2504 for the pilots. The closed loop pilot PC comprises an inner loop 2504, which adjusts the $E_{cp}$ according to a threshold value $T_o$ 2502. The outer loop control 2500 is directed by the erasure rate of the overhead subchannels, e.g., the data rate control (DRC) subchannel error probability or DRC erasure rate. $T_o$ is increased whenever the DRC erasure rate exceeds a threshold, but is gradually decreased when the DRC erasure rate is below the threshold.

The $\Delta_{T2P}$ is adapted through the ACK forward subchannel. In particular, by measuring the statistics of the ACK and NACK, the AT can evaluate the traffic PER (block 2508) at the BTS. A gain control 2510 compares target traffic PER and measured PER. Whenever the PER is higher than a threshold, the $\Delta_{T2P}$ is increased, until T2P' reached the baseline value T2P of the no-IC system. On the other hand, for a lower PER, the $\Delta_{T2P}$ is decreased in order to fully exploit the IC process.

Variable Overhead Gain Techniques

A further optimization of the transceiver can be obtained by adapting not only $\Delta_{T2P}$ but also the overhead subchannel gains (G overhead) to the IC process. In this case, an extra feedback signal is needed. The values of $\Delta_G$ can be quantized from 0 dB to 0.5 dB.

Interference Power-Based Overhead Gain Control

Figure 26:
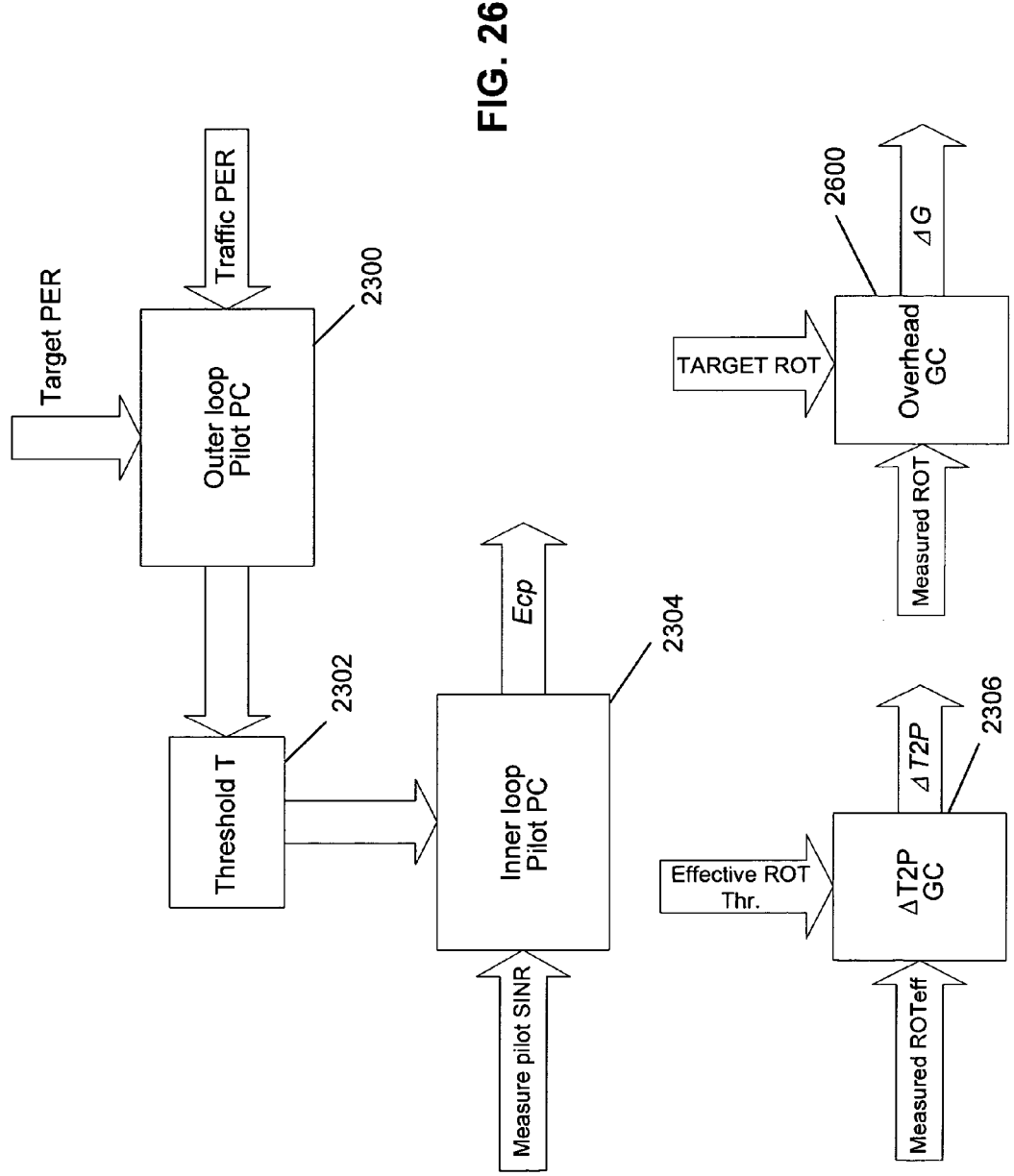
FIG. 26 is similar to FIG. 24 except with overhead gain control.

FIG. 26 is similar to FIG. 24 except with overhead GC 2600. A method for GC of the overhead subchannel 2600 is based on the measured signal power after the IC. In this case, the $E_{cp}$ is assumed in order to provide the same cell converge of a system with no IC. The signal before IC has an increased power $I_0$ and the overhead gain compensates for the increased interference. This implementation adapts the overhead gain by setting:

$$\Delta_G = \frac{I_0}{I_0^{(thr)}} \approx \frac{ROT}{ROT_{thr}}.$$

$\Delta_G$ may be controlled to not go under 0 dB since this would correspond to decrease the overhead subchannel power which is unlikely to be helpful.

The gain and power control scheme may include an inner and outer loop PC 2304, 2300 for $E_{cp}$, as in FIG. 23, a GC loop 2600 for $\Delta_G$ as described above, an open-loop GC 2306 for $\Delta_{T2P}$, where $\Delta_{T2P}$ is increased whenever the PER is above a target value, and is decreased when the PER is below the target. A maximum level of $\Delta_{T2P}$ is allowed, corresponding to the level of the no-IC receiver.

DRC-Only Overhead Gain Control

Figure 27:
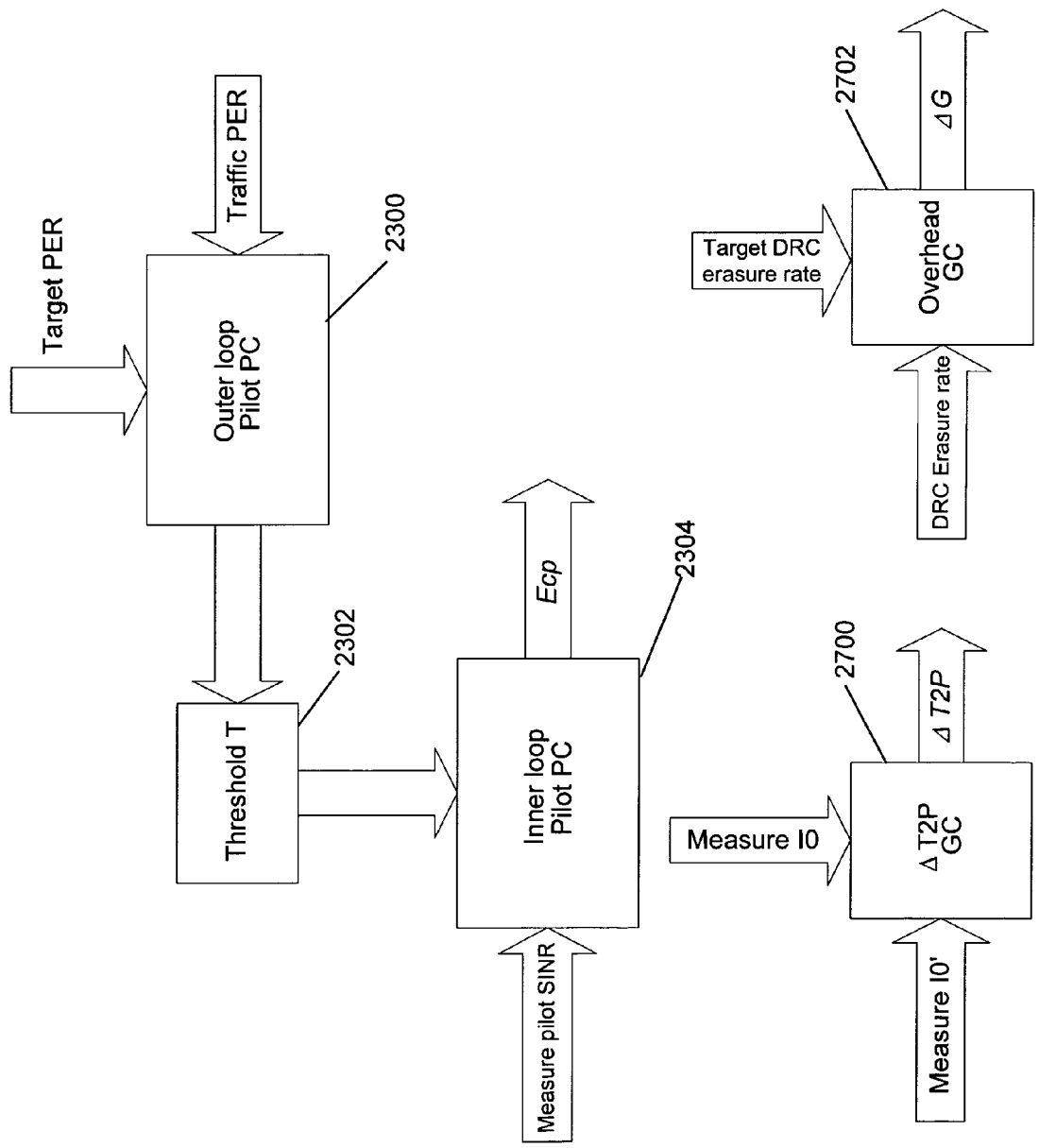
FIG. 27 illustrates a variation of FIG. 26 with DRC-only overhead gain control.

FIG. 27 illustrates a variation of FIG. 26 with DRC-only overhead gain control 2702.

Even when the overhead subchannel gain is adapted, the gain control of $\Delta_{T2P}$ 2700 can be performed with a closed loop, as described above. In this case, the $E_{cp}$ and $\Delta_{T2P}$ are controlled as in the scheme of FIG. 23, while the adaptation of the overhead subchannel gain 2702 is performed through the DRC erasure rate. In particular, if the DRC erasure is above a threshold, the overhead subchannel gain 2702 is increased. When the DRC erasure rate is below a threshold, the overhead gain 2702 is gradually decreased.

Control of T2P in a Multi-Sector Multi-Cell Network

Since the GC of $\Delta_{T2P}$ is performed on a cell level, and an AT 106 may be in softer hand-off, the various sectors may generate different requests of adaptation. In this case various options may be considered for the choice of the $\Delta_{T2P}$ request to be sent to the AT. At a cell level, a method may choose the minimum reduction of T2P, among those requested by fully loaded sectors, i.e., $$\Delta_{T2P}^{(cell)} = \max_{s \in \{loaded\ sectors\}} \{\Delta_{T2P}^{(s)}\}$$

where $\Delta_{T2P}^{(s)}$ is the $\Delta_{T2P}$ required by the sector s. The AT may receive different requests from various cells, and also in this case, various criteria can be adopted. A method may choose the $\Delta_{T2P}$ corresponding to the serving sector in order to ensure the most reliable communication with it.

For the choice of $\Delta_{T2P}$ both at a cell and at the AT, other choices may be considered, including the minimum, maximum or mean among the requested values.

One important aspect is for the mobiles to use T2P'=T2P×$\Delta_{T2P}$, where $\Delta_{T2P}$ is calculated at the BTS based on measurements of Io and Io' (and possibly also knowledge of $I_o^{thr}$), and G'=G×$\Delta_G$, where $\Delta_G$ is also calculated at the BTS. With these delta_factors calculated at the BTS, they are broadcast by each BTS to all the access terminals, who react accordingly.

The concepts disclosed herein may be applied to a WCDMA system, which uses overhead channels such as a dedicated physical control channel (DPCCH), an enhanced dedicated physical control channel (E-DPCCH), or a high-speed dedicated physical control channel (HS-DPCCH). The WCDMA system may use a dedicated physical data channel (DPDCH) format and/or an enhanced dedicated physical data channel (E-DPDCH) format.

The disclosed herein may be applied to WCDMA systems with two different interlace structures, e.g., a 2-ms transmit time interval and 10-ms transmit time interval. thus, a front-end memory, demodulator, and subtractor may be configured to span one or more subpackets of packets that have different transmit time intervals.

For TIC, the traffic data may be sent by one or more users in at least one of an EV-DO Release 0 format or an EV-DO Revision A format.

Specific decoding orders described herein may correspond to an order for demodulating and decoding. Re-decoding a packet should be from re-demodulation because the process of demodulating a packet from the FERAM 312 translates the interference cancellation into a better decoder input.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, comprising:
   receiving samples of signals transmitted from a plurality of access terminals;
   comparing demodulated outputs of an overhead channel with a threshold, wherein the overhead channel comprises at least one of a Reverse Rate Indicator (RRI) channel, Data Request Control (DRC) channel, and Data Source Control (DSC) channel;

if the demodulated outputs of the overhead channel are above the threshold, decoding the overhead channel with a symbol-based maximum-likelihood detector;

using decoded overhead channel bits to reconstruct the overhead channel;

canceling overhead channel data from the received samples; and after canceling the overhead channel data, processing the samples to obtain traffic data sent by at least one of the access terminals.

2. The method of claim 1, wherein the signals comprise Code Division Multiple Access (CDMA) signals.

3. The method of claim 1, further comprising storing the received samples in a buffer and canceling the overhead channel data from the stored, received samples.

4. The method of claim 1, wherein the overhead channel comprises an Acknowledge (ACK) channel.

5. The method of claim 1, wherein the overhead channel comprises at least one of at least one of a dedicated physical control channel (DPCCH), an enhanced dedicated physical control channel (E-DPCCH), or a high-speed dedicated physical control channel (HS-DPCCH).

6. The method of claim 1, wherein the traffic data is sent by one or more users in at least one of an EV-DO Release 0 format or an EV-DO Revision A format.

7. The method of claim 1, wherein the traffic data is sent by one or more users in at least one of a dedicated physical data channel (DPDCH) format or an enhanced dedicated physical data channel (E-DPDCH) format.

8. The method of claim 1, wherein the overhead channel comprises an auxiliary pilot channel, the method further comprising reconstructing the auxiliary pilot channel based on a channel estimate.

9. A method, comprising:
receiving samples of signals transmitted from a plurality of access terminals;
reconstructing an overhead channel by:
scaling each decoded overhead signal by a gain;
covering the scaled, decoded overhead signal by a Walsh code;
summing a plurality of covered, scaled, decoded overhead signals;
spreading the summed, covered, scaled, decoded overhead signals by a pseudo-random noise (PN) sequence; and
filtering the spread, summed, covered, scaled, and decoded overhead signals through a channel-scaled filter;
canceling overhead channel data from the received samples; and
after canceling the overhead channel data, processing the samples to obtain traffic data sent by at least one of the access terminals.

10. The method of claim 9, wherein the signals comprise Code Division Multiple Access (CDMA) signals.

11. The method of claim 9, further comprising storing the received samples in a buffer and canceling the overhead channel data from the stored, received samples.

12. The method of claim 9, wherein the overhead channel comprises an Acknowledge (ACK) channel.

13. The method of claim 9, wherein the overhead channel comprises at least one of at least one of a dedicated physical control channel (DPCCH), an enhanced dedicated physical control channel (E-DPCCH), or a high-speed dedicated physical control channel (HS-DPCCH).

14. The method of claim 9, wherein the traffic data is sent by one or more users in at least one of an EV-DO Release 0 format or an EV-DO Revision A format.

15. The method of claim 9, wherein the traffic data is sent by one or more users in at least one of a dedicated physical data channel (DPDCH) format or an enhanced dedicated physical data channel (E-DPDCH) format.

16. The method of claim 9, wherein the overhead channel comprises an auxiliary pilot channel, the method further comprising reconstructing the auxiliary pilot channel based on a channel estimate.

17. A method, comprising:
receiving samples of signals transmitted from a plurality of access terminals, the samples comprising pilot channel data, overhead channel data and traffic channel data; and
canceling at least a portion of the pilot channel data, overhead channel data and traffic channel data in the samples by:
determining channel estimates for the plurality of access terminals;
using the channel estimates to cancel pilot channel data in the samples from all access terminals;
selecting a set of one or more access terminals from the plurality of access terminals;
for the set of one or more access terminals, demodulating and decoding overhead channel data and traffic channel data;
determining which overhead channel data and traffic channel data decoded correctly;
for the correctly decoded overhead channel data and traffic channel data, reconstructing overhead channel data and traffic channel data; and
canceling at least a portion of the reconstructed overhead channel data and traffic channel data in the samples.

18. The method of claim 17, wherein the signals comprise Code Division Multiple Access (CDMA) signals.

19. The method of claim 17, further comprising storing the received samples in a buffer and canceling the portion of pilot channel data, overhead channel data and traffic channel data in the stored, received samples.

20. The method of claim 17, wherein the decoding, reconstructing and canceling occurs in a sequential manner for one access terminal then another access terminal.

21. The method of claim 17, further comprising selecting another set of one or more access terminals from the plurality of access terminals and repeating said demodulating, decoding, reconstructing and canceling.

22. The method of claim 17, further comprising controlling transmit power of the access terminals based on the determined channel estimates.

23. The method of claim 17, wherein the selected set of one or more access terminals have a packet terminate at a current slot boundary.

24. The method of claim 17, further comprising storing the received samples in a buffer and canceling at least a portion of the pilot channel data, overhead channel data and traffic channel data in the stored, received samples.

25. The method of claim 17, further comprising:
deriving a refined channel estimate; and
based on the refined channel estimate, removing a revised estimate of interference from at least one of the pilot channel data, overhead channel data and traffic channel data.

26. The method of claim 17, further comprising removing a residual pilot based on a refined channel estimate.

27. A method, comprising:
receiving samples of signals transmitted from a plurality of access terminals, the samples comprising pilot channel data, overhead channel data and traffic channel data; and
canceling at least a portion of the pilot channel data, overhead channel data and traffic channel data in the samples by:
determining channel estimates for the plurality of access terminals;
selecting a set of one or more access terminals from the plurality of access terminals;
for the set of one or more access terminals, re-estimating channel estimates from the pilot channel data;
for the set of one or more access terminals, demodulating and decoding overhead channel data;
for the set of one or more access terminals, demodulating and decoding traffic channel data;
determining which overhead channel data and traffic channel data decoded correctly;
for access terminals whose traffic channel data was successfully decoded, reconstructing pilot channel data, overhead channel data and traffic channel data; and
canceling at least a portion of the reconstructed pilot channel data, overhead channel data and traffic channel data in the samples.

28. The method of claim 27, further comprising storing the received samples in a buffer and canceling at least a portion of the pilot channel data, overhead channel data and traffic channel data in the stored, received samples.

29. The method of claim 27, further comprising selecting another set of one or more access terminals from the plurality of access terminals and repeating said demodulating, decoding, reconstructing and canceling.

30. The method of claim 27, wherein the decoding, reconstructing and canceling occurs in a sequential manner for one access terminal then another access terminal.

31. The method of claim 27, further comprising controlling transmit power of the access terminals based on the determined channel estimates.

32. The method of claim 27, wherein the selected set of one or more access terminals have a packet terminate at a current slot boundary.

33. The method of claim 27, further comprising:
deriving a refined channel estimate; and
based on the refined channel estimate, removing a revised estimate of interference from at least one of the pilot channel data, overhead channel data and traffic channel data.

34. The method of claim 27, further comprising removing a residual pilot based on a refined channel estimate.

35. A base station comprising:
a memory configured to store data samples of signals received from a plurality of access terminals, the samples comprising pilot channel data, overhead channel data and traffic channel data;
a channel estimator configured to determine channel estimates for the plurality of access terminals;
a selector configured to select a set of one or more access terminals from the plurality of access terminals;
a demodulator configured to demodulate overhead channel data and traffic channel data for the selected set of one or more access terminals;
a decoder configured to decode demodulated overhead channel data and traffic channel data and determine which overhead channel data and traffic channel data decoded correctly;
a reconstruction unit configured to reconstruct overhead channel data and traffic channel data for the correctly decoded overhead channel data and traffic channel data, the reconstruction unit being further configured to reconstruct pilot channel data using the channel estimates; and
a subtractor configured to subtract at least a portion of the reconstructed pilot channel data, reconstructed overhead channel data, and reconstructed traffic channel data from the samples stored in the memory.

36. The base station of claim 35, wherein the demodulator comprises a rake receiver with a plurality of finger processing units to process multipath signals, each finger processing unit having a unique delay to process samples from the memory.

37. The base station of claim 35, wherein the reconstruction unit is configured to reconstruct data by at least one of re-encoding, re-interleaving, re-modulating, re-applying a data channel gain, and re-spreading.

38. A computer-readable medium storing a software program executable by one or more processors, comprising:
means for receiving samples of signals transmitted from a plurality of access terminals;
means for comparing demodulated outputs of an overhead channel with a threshold, wherein the overhead channel comprises at least one of a Reverse Rate Indicator (RRI) channel, Data Request Control (DRC) channel, and Data Source Control (DSC) channel;
means for decoding the overhead channel with a symbol-based maximum-likelihood detector, if the demodulated outputs of the overhead channel are above the threshold;
means for using decoded overhead channel bits to reconstruct the overhead channel;
means for canceling overhead channel data from the received samples; and
means for processing the samples to obtain traffic data sent by at least one of the access terminals, after canceling the overhead channel data.

39. The computer-readable medium of claim 38, wherein the signals comprise Code Division Multiple Access (CDMA) signals.

40. The computer-readable medium of claim 38, further comprising means for storing the received samples in a buffer and means for canceling the overhead channel data from the stored, received samples.

41. The computer-readable medium of claim 38, wherein the overhead channel comprises an Acknowledge (ACK) channel.

42. The computer-readable medium of claim 38, wherein the overhead channel comprises at least one of at least one of a dedicated physical control channel (DPCCH), an enhanced dedicated physical control channel (E-DPCCH), or a high-speed dedicated physical control channel (HS-DPCCH).

43. The computer-readable medium of claim 38, wherein the traffic data is sent by one or more users in at least one of an EV-DO Release 0 format or an EV-DO Revision A format.

44. The computer-readable medium of claim 38, wherein the traffic data is sent by one or more users in at least one of a dedicated physical data channel (DPDCH) format or an enhanced dedicated physical data channel (E-DPDCH) format.

45. The computer-readable medium of claim 38, wherein the overhead channel comprises an auxiliary pilot channel, the computer-readable medium further comprising means for reconstructing the auxiliary pilot channel based on a channel estimate.

46. A system, comprising:

means for receiving samples of signals transmitted from a plurality of access terminals;

means for comparing demodulated outputs of an overhead channel with a threshold, wherein the overhead channel comprises at least one of a Reverse Rate Indicator (RRI) channel, Data Request Control (DRC) channel, and Data Source Control (DSC) channel;

means for decoding the overhead channel with a symbol-based maximum-likelihood detector, if the demodulated outputs of the overhead channel are above the threshold;

means for using decoded overhead channel bits to reconstruct the overhead channel;

means for canceling overhead channel data from the received samples; and means for processing the samples to obtain traffic data sent by at least one of the access terminals, after canceling the overhead channel data.

47. The system of claim 46, wherein the signals comprise Code Division Multiple Access (CDMA) signals.

48. The system of claim 46, further comprising means for storing the received samples in a buffer and means for canceling the overhead channel data from the stored, received samples.

49. The system of claim 46, wherein the overhead channel comprises an Acknowledge (ACK) channel.

50. The system of claim 46, wherein the overhead channel comprises at least one of at least one of a dedicated physical control channel (DPCCH), an enhanced dedicated physical control channel (E-DPCCH), or a high-speed dedicated physical control channel (HS-DPCCH).

51. The system of claim 46, wherein the traffic data is sent by one or more users in at least one of an EV-DO Release 0 format or an EV-DO Revision A format.

52. The system of claim 46, wherein the traffic data is sent by one or more users in at least one of a dedicated physical data channel (DPDCH) format or an enhanced dedicated physical data channel (E-DPDCH) format.

53. The system of claim 46, wherein the overhead channel comprises an auxiliary pilot channel, the system further comprising means for reconstructing the auxiliary pilot channel based on a channel estimate.

* * * * *